United States Patent
Alqasimi et al.

(10) Patent No.: US 9,783,977 B2
(45) Date of Patent: Oct. 10, 2017

(54) SHAPE-MORPHING SPACE FRAME APPARATUS USING UNIT CELL BISTABLE ELEMENTS

(71) Applicants: Ahmad Alqasimi, Tampa, FL (US); Craig Lusk, Lutz, FL (US)

(72) Inventors: Ahmad Alqasimi, Tampa, FL (US); Craig Lusk, Lutz, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/197,203

(22) Filed: Jun. 29, 2016

(65) Prior Publication Data

US 2017/0145681 A1    May 25, 2017

Related U.S. Application Data

(60) Provisional application No. 62/258,142, filed on Nov. 20, 2015.

(51) Int. Cl.
| | |
|---|---|
| *E04B 1/34* | (2006.01) |
| *E04B 1/344* | (2006.01) |
| *E04B 1/19* | (2006.01) |
| *E04B 1/343* | (2006.01) |

(52) U.S. Cl.
CPC .......... *E04B 1/3441* (2013.01); *E04B 1/1903* (2013.01); *E04B 1/34384* (2013.01); *E04B 2001/1957* (2013.01)

(58) Field of Classification Search
CPC .. E04B 1/3441; E04B 1/1903; E04B 1/34384; E04B 1/02

USPC .................................................. 52/633, 646
See application file for complete search history.

(56) References Cited

U.S. PATENT DOCUMENTS

| | | | | |
|---|---|---|---|---|
| 4,864,796 A | * | 9/1989 | Diamond | E04B 1/19 52/640 |
| 4,869,041 A | * | 9/1989 | Chu | B64G 9/00 403/171 |
| 5,448,868 A | * | 9/1995 | Lalvani | A63B 9/00 52/648.1 |

(Continued)

FOREIGN PATENT DOCUMENTS

GB         2452089         2/2009

OTHER PUBLICATIONS

Bowen, C. R., et al., 2007, "Morphing and Shape Control using Unsymmetrical Composites," Journal of Intelligent Material Systems and Structures, Jan. 2007, vol 18, pp. 89-98.

(Continued)

*Primary Examiner* — Paola Agudelo
(74) *Attorney, Agent, or Firm* — Nilay J. Choksi; Smith & Hopen, P.A.

(57) ABSTRACT

Unit cell bistable elements, and particular arrangements thereof, that can transform or morph a structure from one shape to another. In certain embodiments, the current invention includes unit cell bistable elements, and particular arrangements and uses thereof, that can transform or morph a structure from one shape to another. In an embodiment, the current invention provides a method/ability to transform any four-bar compliant mechanism into a bistable compliant mechanism. It is an object of the current invention to facilitate structures morphing from one specific shape to another specific shape using unit cell bistable elements.

26 Claims, 74 Drawing Sheets

(56) References Cited

U.S. PATENT DOCUMENTS

| | | | | |
|---|---|---|---|---|
| 5,761,871 | A | * | 6/1998 | Atake .................... E04B 1/32 52/109 |
| 7,582,349 | B1 | | 9/2009 | Herrera et al. |
| 8,746,626 | B1 | | 6/2014 | Henry et al. |
| 8,826,602 | B1 | * | 9/2014 | Lipscomb .............. E04B 1/19 52/648.1 |
| 8,991,769 | B2 | | 3/2015 | Gandhi |
| D752,245 | S | * | 3/2016 | Klemer ................... D25/138 |
| 9,546,478 | B2 | * | 1/2017 | Nadeau .................. E04B 1/34 |
| 2006/0053726 | A1 | * | 3/2006 | Reynolds ............... E04B 1/19 52/633 |
| 2007/0011983 | A1 | * | 1/2007 | Reynolds ............... E04B 1/19 52/633 |
| 2008/0040984 | A1 | * | 2/2008 | Lanahan ................ E02B 3/04 52/79.9 |
| 2015/0101645 | A1 | * | 4/2015 | Neville ................. E04B 1/3211 135/125 |

OTHER PUBLICATIONS

Milojevic, A. P., et al., 2015, "Development of a new adaptive shape morphing compliant structure with embedded actuators," Journal of Intelligent Material Systems and Structures, pp. 1-23.

Hoetmer, K., Herder, J. L., and Kim, C. J., 2009, "A Building Block Approach for the Design of Statically Balanced Compliant Mechanisms," International Design Engineering Technical Conference San Diego, California, USA. vols. DETC2009 87451.

Howell, L. L., Midha, A., and Norton, T. W., 1996, "Evaluation of Equivalent Spring Stiffness for Use in a Pseudo-Rigid-Body Model of Large-Deflection Compliant Mechanisms," ASME Journal of Mechanical Design, 118(1):126-131.

Lusk, C., 2011, "Quantifying Uncertainty for Planar Pseudo-Rigid Body Models" in Proceedings of the 2011 Design Engineering Technical Conferences & Computers and Information in Engineering Conference, Washington, DC, Aug. 29-31, 2011. DETC2011-47456.

Lusk, C., and Montalbano, P., 2011, "Design Concepts for Shape-Shifting Surfaces" in Proceedings of the 2011 Design Engineering Technical Conferences & Computers and Information in Engineering Conference, Washington, DC, Aug. 29-31, 2011. DETC2011-47402.

Alqasimi, A., Lusk, C., and Chimento, J., "Design of a Linear Bi-stable Compliant Crank-Slider-Mechanism (LBCCSM)" in Proceedings of the 2014 Design Engineering Technical Conferences & Computers and Information in Engineering Conference, Buffalo, NY, Aug. 17-20, 2014. DETC2014-34285.

Alqasimi, A., and Lusk, C., "Shape-Morphing Space Frame (SMSF) Using Linear Bistable Elements" in Proceedings of the 2015 Design Engineering Technical Conferences & Computers and Information in Engineering Conference, Boston, MA, Aug. 2-5, 2015. DETC2015-47526.

Howell, L. L. and Midha, A., "Parametric Deflection Approximations for End-Loaded, Large-Deflection Beams in compliant Mechanisms", ASME, Mar. 1995, Journal of Mechanical Design, vol. 117, pp 156-165.

Saxena, A. and Kramer, S.N., 1998, "A Simple and Accurate Method for Determining Large Deflections in Compliant Mechanisms Subjected to End Forces and Moments," Journal of Mechanical Design, Trans. ASME, vol. 120, No. 3, pp. 392-400, erratum, vol. 121, No. 2, p. 194.

Howell, L.L. and Midha, A., 1994b, "The Development of Force-Deflection Relationships for Compliant Mechanisms," Machine Elements and Machine Dynamics, DE—vol 71, 23rd ASME Biennial Mechanisms Conference, pp 501-508.

Dado M. H, 2001 "Variable Parametric Pseudo-Rigid Body Model for Large Deflection Beams with End Loads" International Journal of Non-linear Mechanics, 2001.

Howell, L.L. and Midha, A., 1995b, "Determination of the Degrees of Freedom of Compliant Mechanisms Using the Pseudo-Rigid-Body Model Concept," Proceedings of the Ninth World Congress on the Theory of Machines and Mechanisms, Milano, Italy, vol. 2, pp. 1537-1541.

Chimento, J., Lusk,C., and Alqasimi, A., "A 3-D Pseudo-Rigid Body Model for Rectangular Cantilever Beams with an Arbitrary Force End-Load" in Proceedings of the 2014 Design Engineering Technical Conferences & Computers and Information in Engineering Conference, Buffalo, NY, Aug. 17-20, 2014. DETC2014-34292.

Logan, P., and Lusk, C., "Pseudo-Rigid-Body Models for End-Loaded Heavy Cantilever Beams" in Proceedings of the 2015 Design Engineering Technical Conferences & Computers and Information in Engineering Conference, Boston, MA, Aug. 2-5, 2015. DETC2015-47526.

Kota, S., and Ananthasuresh, G. K., "Designing compliant mechanisms", Mechanical Engineering—CIME, vII7 (II):93-96, 1995.

Chen, G., Gou, Y. and Zhang, A., "Synthesis of Compliant Multistable Mechanisms through Use of a Single Bistable Mechanism", Journal of Mechanical Design, 133(8), 081007 (Aug. 10, 2011) doi:10.1115/1.4004543.

Ishii, H. and Ting, K. L., "SMA Actuated Compliant Bistable Mechanisms", Mechatronics, vol. 14, Issue 4, May 2004, pp. 421-437.

Opdahl, P. G., Jensen, B. D., and Howell, L. L., 1998, "An Investigation Into Compliant Bistable Mechanisms," in Proc. 1998 ASME Design Engineering Technical Conferences, DETC98/MECH-5914.

Smith, C. and Lusk, C., 2011, "Modeling and Parameter Study of Bistable Spherical Compliant Mechanisms" in Proceedings of the 2011 Design Engineering Technical Conferences & Computers and Information in Engineering Conference, Washington, DC, Aug. 29-31, 2011. DETC2011-47397.

Kociecki, M., Adeli, H., "Shape optimization of free-form steel space-frame roof structures with complex geometries using evolutionary computing" Engineering Application of Artificial Intelligence, vol. 38, Feb. 2015, pp. 168-182.

Chen, G. and Howell, L. L., "Two General Solutions of Torsional Compliance for Variable Rectangular Cross-Section Hinges in Compliant Mechanisms", Journal of the International Societies for Precision Engineering and Nanotechnology, vol. 33, Issue 3, pp. 268-274, DOI: 10.1016/j.precisioneng.2008.08.001.

Jensen, B. D. and Howell, L. L., "Identification of Compliant Pseudo-Rigid-Body Four-Link Mechanism Configurations Resulting in Bistable Behavior", ASME. J. Mech. Des. 2004; 125(4):101-708. doi:10.1115/1.1625399.

Schulze, E.F., 1955, "Designing Snap-Action Toggles," Product Engineering, Nov. 1955, pp. 168-170.

Jensen, B. and Howell, L. L., "Bistable Configurations of Compliant Mechanisms Modeled Using Four Link and Translational Joints," Journal of Mechanical Design, vol. 126, Issue 4, pp. 657-666.

Ceccarelli M., Koetsier, T., "Burmester and Allievi: A Theory and Its Application for Mechanism Design at the End of 19th Century," ASME. J. Mech. Des. 2008;130(7):072301-072301-16. doi:10.1115/1.2918911.

Jensen, B. D., Howell, L. L. and Salmon, L. G., "Design of Two-Link, In-Plane, Bistable Compliant Micro-Mechanisms," Proceedings of DETC' 1998 ASME Design Engineering Technical Conferences, Sep. 13-16, 1998, Atlanta, GA, DETC98JMECH-5837.

Luharuka, R. and Hesketh, P. J., "Design of fully compliant, in-plane rotary, bistable micromechanisms for MEMS applications," Sensors and Actuators A: Physical, vol. 134, Issue 1, pp. 231-238 DOI:10.1016/j.sna.2006.04.030.

Masters, N. D. and Howell, L. L., "A self-retracting fully compliant bistable micromechanism," Journal of Microelectromechanical Systems, vol. 12, Issue 3, pp. 273-280, DOI: 10.1109/JMEMS.2003.811751.

Lusk, C. and Howell, L. L., "Spherical Bistable Micromechanism," ASME. J. Mech. Des. 2008;130(4):045001-045001-6. doi:10.1115/1.2885079.

Sönmez, Ü. and Tutum, C. C., "A Compliant Bistable Mechanism Design Incorporating Elastica Buckling Beam Theory and Pseudo-Rigid-Body Model," ASME. J. Mech. Des. 2008;130(4):042304-042304-14. doi:10.1115/1.2839009.

(56) References Cited

OTHER PUBLICATIONS

Camescasse, B., Fernandes, A. and Pouget, J., "Bistable Buckled Beam: Elastica Modeling and Analysis of Static Actuation," International Journal of Solids and Structures, vol. 50, Issue 19, pp. 2881-2893, DOI: 10.1016/j.jsolstr.2013.05.005.

Vaz, M. A. and Silva, D., "Post-Buckling Analysis of Slender Elastic Rods Subjected to Terminal Forces," International Journal of Non-Linear Mechanics, vol. 38, Issue 4, pp. 483-492, PII S0020-7462(01)00072-5, DOI: 10.1016/S0020-7462(01)00072-5.

Vaz, M. A. and Mascaro, G., "Post-Buckling Analysis of Slender Elastic Vertical Rods Subjected to Terminal Forces and Self-Weight," International Journal of Non-Linear Mechanics, vol. 40, Issue 7, pp. 1049-1056, DOI: 10.1016/j.jnonlinmec.2004.12.002.

Vaz, M. A., and Patel M. H., "Post-Buckling Behaviour of Slender Structures with a Bi-linear Bending Moment-Curvature Relationship," International Journal of Non-Linear Mechanics.

Mazzilli, C., "Buckling and Post-Buckling of Extensible Sods Sevisited: A Sultiple-Scale Solution," International Journal of Non-Linear Mechanics, vol. 44, Issue 2. pp. 200-208, DOI:10.1016/j.ijnonlinmec.2008.11.005.

Khatait, J. P., Mukherjee, S., and Seth, B., "Compliant design for flapping mechanism: A minimum torque approach," Mechanism and Machine Theory, vol 41, Issue 1, pp. 3-16, DOI: 10.1016/j.mechmachtheory.2005.06.002.

Chanthasopeephan, T., Jarakorn, A., Polchankajorn, P. and Maneewarn, T., "Impact reduction mobile robot and the design of the compliant legs," Robotics and Autonomous Systems, vol. 62, Issue 1, pp. 38-45, SI, DOI: 10.1016/j.robot.2012.07.017.

Dunning, A. G., Tolou, N. and Herder, J. L., "A compact low-stiffness six degrees of freedom compliant precision stage," Journal of the International Societies for Precision Engineering and Nanotechnology, vol. 37, Issue 2, pp. 380-388, DOI: 10.1016/j.precisioneng.2012.10.007.

Du, Y. X., Chen, L. P. and Luo, Z., "Topology synthesis of geometrically nonlinear compliant mechanisms using meshless methods," Acta Mechanica Solida Sinica, vol. 21, Issue 1, pp. 51-61,DOI: 10.1007/s10338-008-0808-3.

Deepak, S., Sahu, D., Dinesh, M., Jalan, S. and Ananthasuresh, G. K., "A Comparative Study of the Formulations and Benchmark Problems for the Topology Optimization of Compliant Mechanisms", Proceedings of the 2008 Design Engineering Technical Conferences & Computers and Information in Engineering Conference, New York, NY, Aug. 3-6, 2008.

Su, H. and McCarthy J., "Synthesis of Bistable Compliant Four-Bar Mechanisms Using Polynomial Homotopy", ASME. J. Mech. Des. 2006;129(10):1094-1098, Doi:10.1115/1.2757192.

Limaye, P., Ramu, G., Pamulapati, S. and Ananthasuresh, G. K., "A compliant mechanism kit with flexible beams and connectors along with analysis and optimal synthesis rocedures", Mechanism and Machine Theory, vol. 49, pp. 21-39, DOI: 10.1016/j.mechmachtheory.2011.07.008.

Meng, Q. L., Li, Y. M. and Xu, J., "A novel analytical model for flexure-based proportion compliant mechanisms", Journal of the International Societies for Precision Engineering and Nanotechnology, vol. 38, Issue 3, pp. 449-457, DOI: 10.1016/j.precisioneng.2013.12.001.

Ahuett-Garza, H., Chaides, O., Garcia, P. N. and Urbina, P., "Studies about the use of semicircular beams as hinges in large deflection planar compliant mechanisms", Journal of the International Societies for Precision Engineering and Nanotechnology, vol. 38, Issue 4, pp. 711-727, DOI: 10.1016/j.precisioneng.2014.03.008.

Guo, J. J. and Lee, K. M., "Compliant joint design and flexure finger dynamic analysis using an equivalent pin model", Mechanism and Machine Theory, vol. 70, pp. 338-353,DOI:10.1016/j.mechmachtheory.2013.08.001.

Chen, G. M., Aten, Q. T. and Zirbel, S., "A Tristable Mechanism Configuration Employing Orthogonal Compliant Mechanisms", Journal of Mechanisms and Robotics, vol. 2, Issue 1, 014501, DOI: 10.1115/1.4000529.

Ohsaki, M. and Nishiwaki, S., "Shape design of pin-jointed multistable compliant mechanisms using snapthrough behavior", Structural and Multidisciplinary Optimization, vol. 30, Issue 4, pp. 327-334, DOI: 10.1007/s00158-005-0532-2.

Chen G. and Du, Y., "Double-Young Tristable Mechanisms", ASME. J. Mechanisms Robotics, 2012;5(1):011007-011007-7. doi:10.1115/1.4007941.

Chen, G. M., Wilcox, D. L. and Howell, L. L., "Fully compliant double tensural tristable micromechanisms (DTTM)", Journal of Micromechanics and Microengineering, vol. 19, Issue 2, 025011, DOI: 10.1088/0960-1317/19/2/025011.

Kinzel, E. C., Schmiedeler, J. P. and Pennock, G. R., "Kinematic Synthesis for Finitely Separated Positions Using Geometric Constraint Programming", ASME. J. Mech. Des. 2005;128(5):1070-1079. doi:10.1115/1.2216735.

Schmiedeler, J. P., Clark, B. C. and Kinzel, E. C., "Pennock GR. Kinematic Synthesis for Infinitesimally and Multiply Separated Positions Using Geometric Constraint Programming", ASME. J. Mech. Des. 2014;136(3):034503-034503-7. doi:10.1115/1.4026152.

Norton, R. , "Design of Machinery", McGraw-Hill Education Material, 5 ed. 2011, pp. 49-50. ISBN 9780077421717.

Murray, A. P., Schmiedeler, J. P. and Korte, B. M., "Kinematic Synthesis of Planar, Shape-Changing Rigid-Body Mechanisms", ASME. J. Mech. Des. 2008;130(3):032302-032302-10, doi:10.1115/1.2829892.

Santer, M., Pellegrino, S., "Concept and Design of a Multistable Plate Structure", ASME. J. Mech. Des. 2011;133(8):081001-081001-7. doi:10.1115/1.4004459.

Cooper, J. E., Chekkal, I., Cheung, R. C. M., Wales, C., Allen, N. J., Lawson, S., Peace, A. J., Cook, R., Standen, P., Hancock, S. D. and Carossa, G. M., "Design of a Morphing Wingtip", Journal of Aircraft, vol. 52, No. 5 (2015), pp. 1394-1403, doi: 10.2514/1.0032861.

Saito, K., Tsukahara, A. and Okabe, Y., "New Deployable Structures Based on an Elastic Origami Model", ASME. J. Mech. Des. 2015;137(2):021402-021402-5. doi:10.1115/1.4029228.

Santer, M. and Pellegrino, S., "Compliant multistable structural elements", International Journal of Solids and Structures, vol. 45, Issue 24, pp. 6190-6204, DOI: 10.1016/j.ijsolstr.2008.07.014.

Shaw, L. A. and Hoplins, J. B., "A Shape-controlled Compliant Microarchitecture Material", in Proceedings of the 2015 Design Engineering Technical Conferences & Computers and Information in Engineering Conference, Boston, MA, Aug. 2-5, 2015. DETC2015-46643.

Kociecki, M. and Adeli, H., "Shape optimization of free-form steel space-frame roof structures with complex geometries using evolutionary computing", Engineering Applications of Artificial Intelligence, vol. 38, pp. 168-182, DOI: 10.1016/j.engappai.2014.10.012.

Gallego, J. A. and Herder, J. "classifications for Literature on Compliant Mechanisms: A Design Methodology Based Approach", ASME International Design Engineering Technical Conferences/Computers and Information in Engineering Conference Location: San Diego, CA Date: Aug. 30-Sep. 2, 2009, DETC2009-87334.

International Search Report and Written Opinion issued Sep. 22, 2016 for corresponding International Patent Applicaiton No. PCT/US16/40119 with an international filing date of Jun. 29, 2016.

* cited by examiner

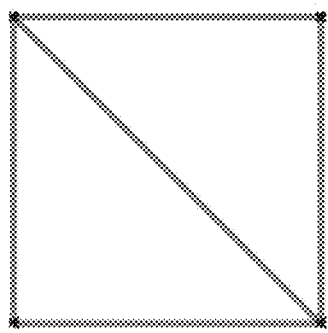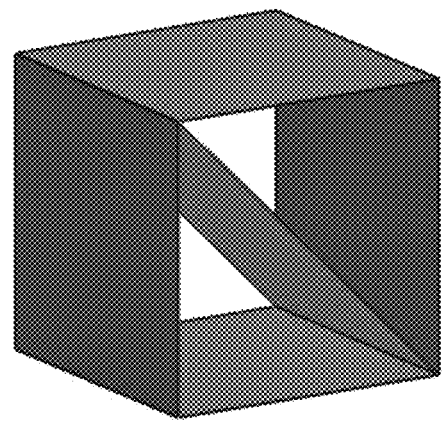
FIG. 6

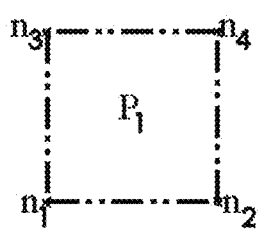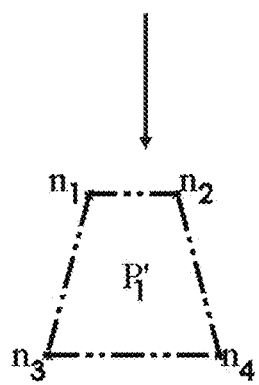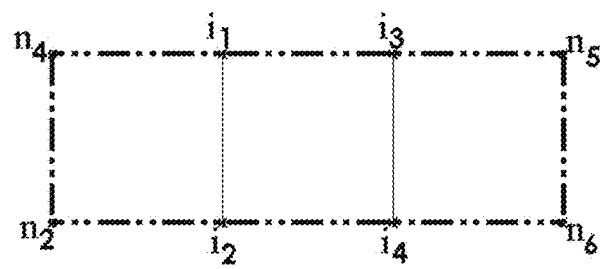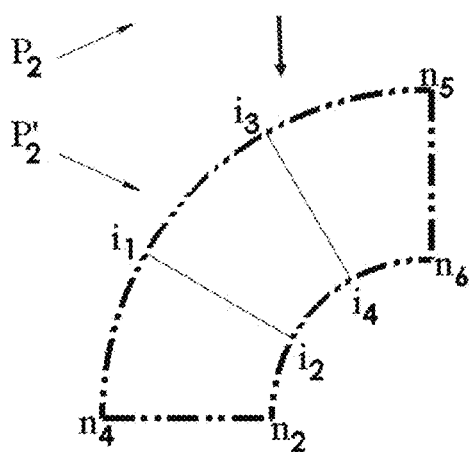
FIG. 10A
FIG. 10B

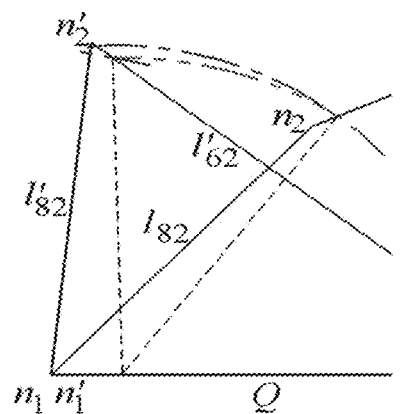
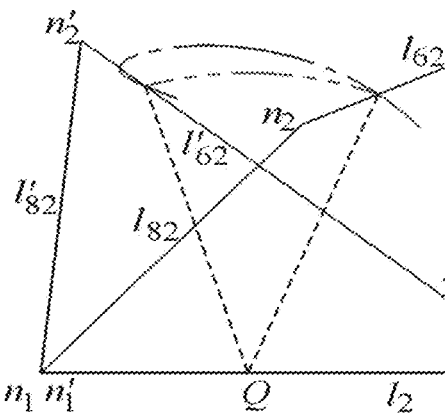
FIG. 50A  　　　　　　FIG. 50B
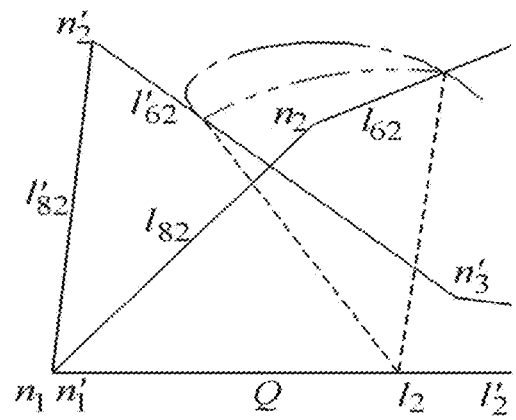
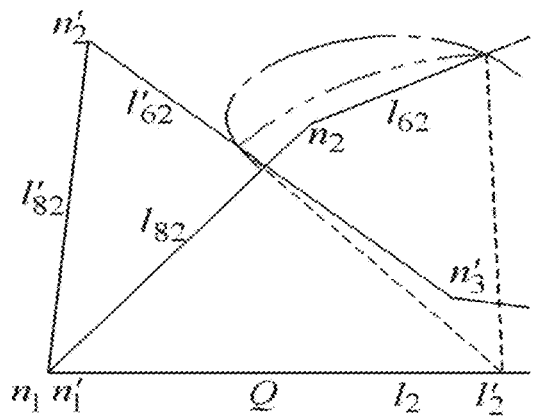
FIG. 50C  　　　　　　FIG. 50D

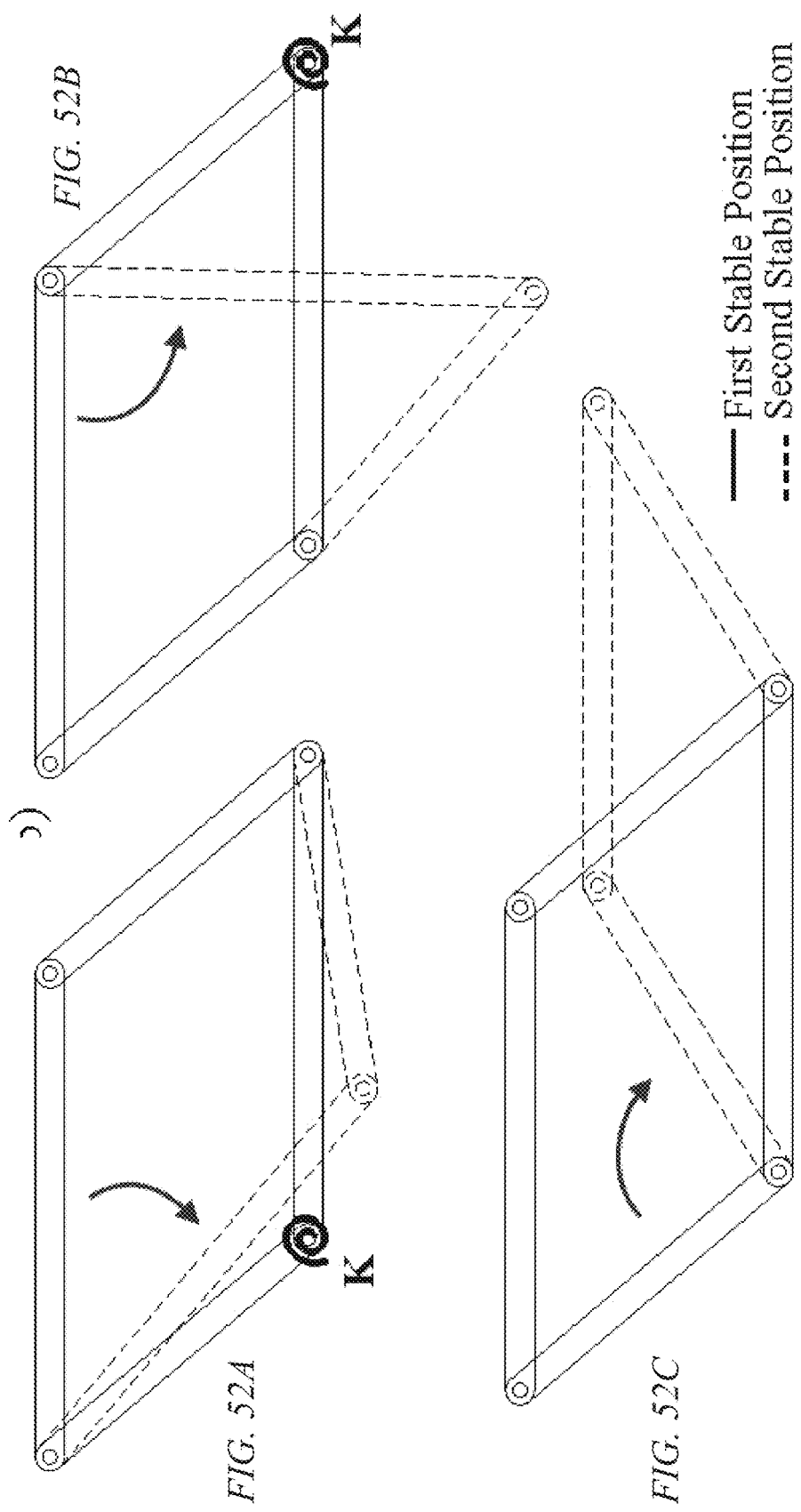

SHAPE-MORPHING SPACE FRAME APPARATUS USING UNIT CELL BISTABLE ELEMENTS

CROSS-REFERENCE TO RELATED APPLICATIONS

This nonprovisional application claims priority to U.S. Provisional application No. 62/258,142, entitled "Shape-Morphing Space Frame (SMSF) Using Unit Cell Bistable Elements", filed Nov. 20, 2015 by the same inventors, the entirety of which is incorporated herein by reference.

FEDERALLY SPONSORED RESEARCH OR DEVELOPMENT

This invention was made with government support under Grant Number 1053956 awarded by the National Science Foundation. The government has certain rights in the invention.

BACKGROUND OF INVENTION

1. Field of the Invention

This invention relates, generally, to space frames. More specifically, it relates to space frames that have the ability to controllably and stably morph between at least two (2) shapes or sizes.

2. Brief Description of the Prior Art

A compliant mechanism is a flexible mechanism that derives some or all its motion (mobility) from the deflection of flexible segments, thereby replacing the need for mechanical joints. It transfers an input force or displacement from one point to another through elastic body deformation. The absence or reduction of mechanical joints impacts both performance and cost. Advantages include reduced friction and wear, increased reliability and precision, and decreased maintenance and weight [Howell, L. L., 2001, "Compliant Mechanisms", Wiley, New York, ISBN 978-0471384786]. Moreover, cost is also affected by reduced assembly time and, in most cases, due to its hingeless design, the fabrication of such mechanisms can be produced from a single piece. Additionally, compliant mechanisms provide the designer with an effective way to achieve mechanical stability.

A compliant bistable mechanism achieves its stability within the designed range of motion, by storing and releasing strain energy in its compliant segments [Hoetmer, Karin, Herder, Just L and Kim, Charles. "A Building Block Approach for the Design of Statically Balanced Compliant Mechanisms". International Design Engineering Technical Conference San Diego, Calif., USA, 2009. Vols. DETC2009 87451]. Such a technique enables the mechanism to stay at its two stable positions without the need of an external power/force to stay there. Energy methods, combined with pseudo-rigid-body models, can be used to analyze such compliant mechanisms [Howell, L. L., Midha A., and Norton, T. W., 1996, "Evaluation of Equivalent Spring Stiffness for Use in a Pseudo-Rigid-Body Model of Large-Deflection Compliant Mechanisms," ASME Journal of Mechanical Design, 118(1):126-131].

These mechanisms are most commonly designed in two ways. One is using pseudo-rigid-body models, and the other is using topology optimization. Both approaches have utility. The design of the compliant portion of the unit cell components is accomplished through compliant mechanism synthesis.

There are three major approaches to the design and synthesis of compliant mechanisms: kinematic approximation methods, computationally intense methods, and linear and higher-order expansions of the governing equations. This disclosure is based primarily upon kinematic approximation methods.

The kinematic approximation or Pseudo-Rigid-Body Model (PRBM) approach works by identifying similarities between compliant mechanisms and rigid-body mechanisms. It has proved effective in identifying numerous compliant analogues to ubiquitous planar rigid-body mechanisms such as four-bar and crank-slider mechanisms. The chief criticisms of this approach are that the models are approximate and have limited, albeit known, accuracy. Moreover, the identification between flexure geometries and rigid-body mechanisms has been limited to a small but versatile set of planar configurations.

Computationally intense approaches typically combine finite element analysis with optimization to calculate optimal geometries in response to load and motion specifications. This approach has been successful, but has also been criticized for producing results identical to those produced more quickly by the PRBM approach, or results that are not physically realizable. As a general rule, this approach is more capable and accurate than the PRBM approach, but also more time consuming.

The third approach, which relies on linear and higher-order expansions of the governing equations, is well-known in precision mechanisms research, and relies heavily on flexures that are small and undergo small, nearly linear, deflections. This approach uses flexures much smaller than the overall mechanism size, so it is not generally applicable to millimeter-scale and smaller mechanisms. These techniques are important but do not have a direct bearing on the invention disclosed herein.

Systems for subdividing surfaces in the development of finite element algorithms using node definition and degrees of freedom are known. These same subdivisions schemes are applicable to the design of the novel shape-shifting surfaces disclosed hereinafter. The prior art includes techniques for node placement in a given shape. For example, in Finite Element models, the behavior between nodes is typically determined by interpolating functions. In the multi-stable shape-shifting system disclosed hereinafter, a kinematic scheme is required to fill the gaps between nodes. Thus, kinematic skeletons are developed which have the same number of nodes (typically revolute joints) and the same number of degrees of freedom. Methods for enumerating all possible kinematic linkages with a given number of degrees of freedom are known. The simplest systems satisfying degree of freedom requirements are preferred. For example, triangular elements with additional nodes along the edges and center-point nodes are known.

Tiling systems, periodic and aperiodic, are methods for subdividing surfaces and as such have been extensively studied by mathematicians and artists since antiquity. The three regular tilings are: 1) equilateral triangles only, 2) squares only, and 3) regular hexagons only. There are eight Archimedian tilings, and there are aperiodic Penrose kite-and-dart tiling systems. The regular tilings are simple and require the fewest different types of unit cells. Some of the Archimedian tilings use polygons with several sides, yielding generous angles and areas to work with, which may be advantageous. Penrose tiles are specifically shaped quadrilaterals that can be assembled in multiple, non-periodic ways.

In 1827, Carl Fredrich Gauss published his 'Theorema Egregium' which is the foundational result in differential geometry. The basic result is that small triangles do not change their shape when bent and that there is a fundamental difference in the shape of triangles that are planar (the sum of the angles is equal to 180 degrees) and the shape of triangles on a sphere (the sum of the angles is always more than 180 degrees) and the shape of triangles on a hyperbolic or saddle-shaped surface (the sum of the angles is always less than 180 degrees). His result means that spheres cannot be made into planes without crumpling or tearing or stretching (distorting) the surface. This fundamental geometric limitation makes the building of certain types of curved surfaces (those with two non-zero principal curvatures) intrinsically more difficult than working with planar surfaces (both principal curvatures equal to zero) or developable surfaces (one principal curvature equal to zero).

A surface is defined as a material layer constituting such a boundary. Examples of this are walls, ceilings, doors, tables, armor, vehicle bodies, etc. However, in some cases, it may be valuable for these surfaces to change shape while still maintaining rigidity in the direction normal to the surface. In addition, having surfaces able to change between two different sizes on demand and stabilize in those sizes may be of even more value. One valuable application of size changing surfaces may be rigid containers, for example milk crates, trash barrels, dumpsters, laundry baskets, suit cases, truck beds, freight trains, trash compactors, etc. Such containers are designed for large volumes, however, when not in use, may become cumbersome. Thus, containers with large volumes when in use and small volumes when empty are of value. This includes the ability for containers to maintain large or small sizes both when in use and when empty.

This leads to a need for innovation that allows conventional surfaces to achieve new functionality, to be constructed more precisely, or at lower cost. More particularly, a low-cost modular building system with customizable DOF and stiffness with stability in multiple positions is needed. In addition to potential savings when a new barrier is erected, an innovative system would provide new methods and functionality to surfaces and objects.

Objects that function as physical barriers or supporting surfaces include walls, table tops, shelves, floors, ceilings, stairs, vehicle bodies, and pipelines. Conventional methods for constructing these barriers can be costly, but even when they are inexpensive, the numbers of these kinds of objects mean that they represent a significant economic investment. Such barriers often incur additional costs when they require modification or removal. Thus there is a need for a surface, and a method for designing such surface, having a shape that may be modified or adjusted without damaging the surface or rebuilding it, and that has stability in multiple positions or shapes.

Space frames are widely used in structures (roof structure for example) with complex geometries that involve heavy computations and optimization using genetic algorithm. However, there is no current ability to provide bistability to space frames in a predictable and controllable manner.

Accordingly, what is needed is an improved structure and methodology for providing predictable and controllable structural change using unit cell bistable elements, thus allowing the morphing of one specific shape into a different specific shape. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved bistable mechanism and method of fabrication thereof is now met by a new, useful, and nonobvious invention.

In an embodiment, the current invention is a shape-morphing space frame apparatus using unit cell bistable elements. The apparatus includes a first structural framework ($P_1$) formed of nodes and links, including at least one bistable link. The $P_1$ framework has two stable positions, a parallelogram-shaped (e.g., rectangular) constraint in one position and a trapezoidal (e.g., isosceles trapezoidal) constraint in the other position. The apparatus further includes a first set of second structural frameworks ($P_2$) and a second set of second structural frameworks ($P_3$). The $P_2$ and $P_3$ frameworks are each formed of nodes and links, including at least one bistable link. The P2 and P3 frameworks each having two stable positions, a parallelogram-shaped (e.g., square-shaped) constraint in one position and a trapezoidal (e.g., isosceles trapezoidal) constraint in the other position. The $P_2$ frameworks are adjacent to each other, as are the $P_3$ frameworks. They are straight or curved in one stable position, and curved in the other stable position. The $P_2$ frameworks are coupled on an end to an end of the $P_1$ framework, and the $P_3$ frameworks are coupled on an end to an opposite end of the $P_1$ framework. The $P_2$ and $P_3$ frameworks are also coupled to each other on their opposite ends, thus forming a straight or curved triangular prism in the first stable position and a curved triangular prism in the second stable position (e.g., without any use of curved links). Bistability is achieved by the bistable links in each of the frameworks and without use of any hard stop. In certain embodiments, the links of each framework can be disposed within in a single plane within each framework, so that none of the links interfere with each other within the framework.

A single rigid links may be positioned between two nodes if a relative displacement between the nodes is zero. On the other hand, two or more rigid links can be positioned between the two nodes if the relative displacement between the two nodes is collinear, where the node disposed between the two rigid links would be a living hinge.

One of the stable positions may be a disk configuration, and the other stable position may be a hemisphere configuration. In this case, the radial lines on the surface of the disk bend but do not stretch, and become the longitude lines on the hemisphere. Additionally, the circumferential lines on the disk compress and become latitude lines on the hemisphere. In a further embodiment, the transition between the stable positions can be accomplished by applying an inward radial force on the $P_2$ and $P_3$ frameworks. In an embodiment, the disk configuration can be formed of ten (10) sectors connected together in a circular pattern as one layer. In this case, the links would not include any curved links.

Alternatively, one of the stable positions can be a two-layered disk configuration, and the other stable position can be a sphere configuration, where the disk has an upper layer that forms an upper hemisphere and a lower layer that forms a lower hemisphere (thus forming the overall sphere, such as a 60-sided polyhedron without any curved links). In an embodiment, the upper and lower layers can each be formed of an odd number of evenly-spaced sectors with a gap formed between each sector. The sectors would window each other to fill the gaps in the two-layered disk. Further, the upper and lower layers can be coupled together using the sectors' vertices located mid-plane, where a flange can be disposed at each vertex with an aperture disposed therein to function as a hinge between the layers.

In a separate embodiment, the current invention is a method of fabricating predictable and controllable length or shape changes in a bistable, shape-morphing mechanism, allowing the morphing from an initial specific shape into a resulting specific shape that is different from the initial shape, without use of a hard stop. The method includes identifying the stable shapes desired and providing a plurality of links and nodes that interconnect the links in the initial shape (the links should not change length between the shapes). The nodes include fixed ground pivots and moving pivots (e.g., torsional springs may be placed at these moving pivots), and the links include fixed links and moving links. A first attachment point of a non-interfering potential energy element (PEE; e.g., a compliant link) is identified to be positioned on a fixed link, and a first attachment point of PEE is identified to be positioned on a moving link. These attachment points are based on a path of travel of the PEE between the stable shapes. The PEE is positioned between two moving pivots to provide a degree-of-freedom during actuation of the mechanism between its stable shapes. The potential energy of the PEE is minimized in these stable shapes, and increases during transition between these shapes. The PEE is capable of generating sufficient potential energy to overcome any restoring torques within the moving pivots when transitioning between the stable shapes. Based on the foregoing steps, the bistable, shape-morphing mechanism can be fabricated, for example by laser cutting or three-dimensional printing.

The methodology may further include over-constraining the mechanism to facilitate behavior of the mechanism as a structure in both stable shapes with sufficient flexibility in the PEE to transition or toggle between the shapes.

The methodology may also include creating a pole point at an intersection between two perpendicular bisectors. The first bisector would originate from a line disposed between a first moving pivot in the initial shape and that same pivot in the resulting shape. The second bisector would originate from a line disposed between a second moving pivot in the initial shape and that same pivot in the resulting shape. These bisecting lines would then intersect each other, and that is where the pole point is created. The pole point also bisects a path of travel of the PEE.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 6 depicts the quadrilateral structure in its 2D and 3D form.

FIG. 10A depicts the initial and final state of a generalized $P_1$ mechanism.

FIG. 10B depicts the initial and final state of a generalized $P_2$ mechanism.

FIG. 50A depicts the superimposed two paths of ($m_Q$) for a selected coupler curves.

FIG. 50B depicts the superimposed two paths of ($m_Q$) for a selected coupler curves.

FIG. 50C depicts the superimposed two paths of ($m_Q$) for a selected coupler curves.

FIG. 50D depicts the superimposed two paths of ($m_Q$) for a selected coupler curves.

FIG. 52A depicts a parallelogram linkage at a toggled position.

FIG. 52B depicts a parallelogram linkage at a toggled position.

FIG. 52C depicts a parallelogram linkage at a toggled position.

DETAILED DESCRIPTION OF THE PREFERRED EMBODIMENT

Figure 1A:
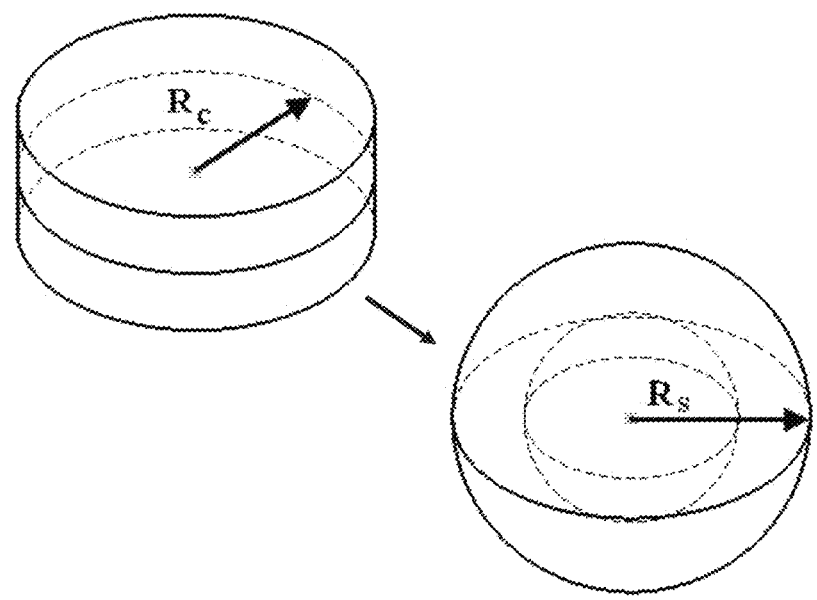
FIG. 1A depicts a general disk-to-sphere geometry.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

In certain embodiments, the current invention includes unit cell bistable elements, and particular arrangements and uses thereof, that can transform or morph a structure from one shape to another. In an embodiment, the current invention provides a method/ability to transform any four-bar compliant mechanism into a bistable compliant mechanism. It is an object of the current invention to facilitate structures morphing from one specific shape to another specific shape using unit cell bistable elements.

EXAMPLE 1

Shape-Morphing Space Frame (SMSF) Using Quadrilateral Bistable Unit Cell Elements As a proof of concept, which is described in the following non-limiting example, a disk-like structure is morphed into a hemisphere or spherical structure. This mechanism can be applied to alternative shapes to provide for structural change from one specific shape to another specific shape.

I. Proof of Concept: Designing and Modeling

An objective of this study was to design a disk like structure with the ability to morph into a sphere. Specifically, the circumference of a disk structure is approximated by a 10-sided polygon that would then morph into a hollow sphere structure that is approximated by a 60-sided polyhedron. However, it is contemplated herein that the circumference of the disk structure can be approximated by any number of sides greater than or equal to three (3) In this 10-sided embodiment, though, the disk-to-sphere structure is tessellated into ten (10) sides for the latitude circles and twelve (12) sides for the longitude circles; the disk's thickness and radius are preset/chosen at the initial design stage. The strategy in morphing the initial shape of the structure (disk) into its final shape (sphere) is that the radial lines on the surface of the disk bend but do not stretch, whereas the circumferential lines compress. Moreover, the radial lines on the disk become longitude lines on the sphere, and the circumferential lines become latitude lines on the sphere. The disk's thickness splits in half, the upper half becoming the thickness of the upper hemisphere and the lower half becoming the thickness of the lower hemisphere. The following discuss the steps used in disk tessellation and the detailed morphing strategies.

A. Disk Tessellation

Because the disk has a given thickness, the projection of it, which is a circle, is tessellated. To better understand the topology involved in morphing the disk into a hemisphere, geometrical analysis was carried out using the known equations of circles and spheres by correlating them to each other using their parameters shown in FIG. 1A.

Figure 1B:
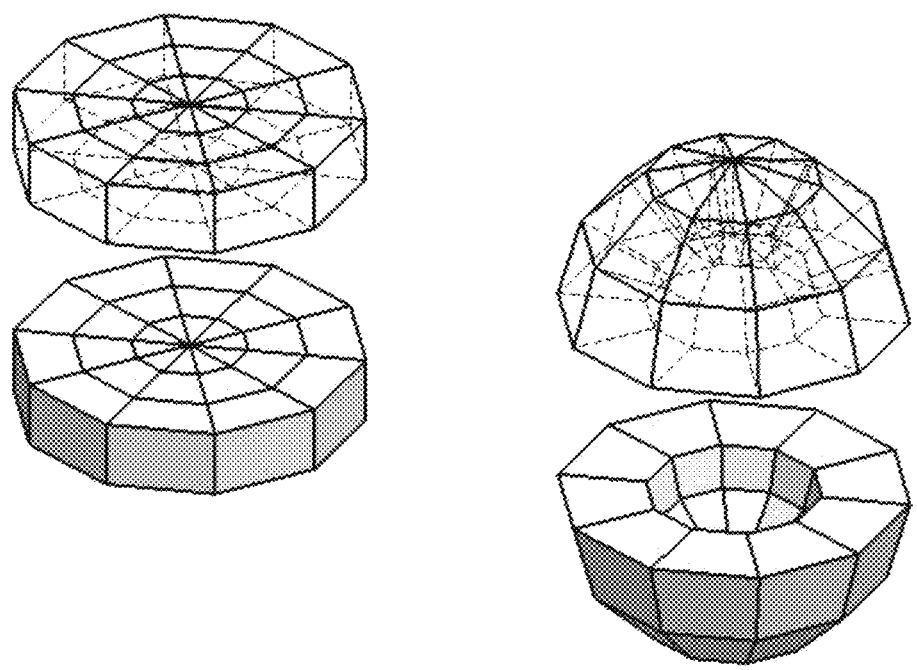
FIG. 1B depicts a more specific disk-to-sphere geometry without use of curved link mechanisms.

As it was stated before and to avoid using curved link mechanisms, polygons will be used to approximate the circles that construct the disk as shown in FIG. 1B. Using polygons to approximate circles allows the use of straight link segments to form the mechanism and provides for a manner of refining the design by increasing the number of sides. Increasing the number of sides (i.e., at least 3 sides) would refine the circle approximation and would also increase the number of unit cells and increase the complexity of the design, and vice versa. The following are the steps used to construct the disk tessellation using the computer aided design software SOLIDWORKS, though other CAD software may be utilized as well; dimensions used are also noted to illustrate how those parameters affect the final design.

Step 1: A regular ten-sided polygon is used with a circumscribed circle radius ($R_c$) of 150 mm was chosen, though any radius length can be used.

Figure 2:
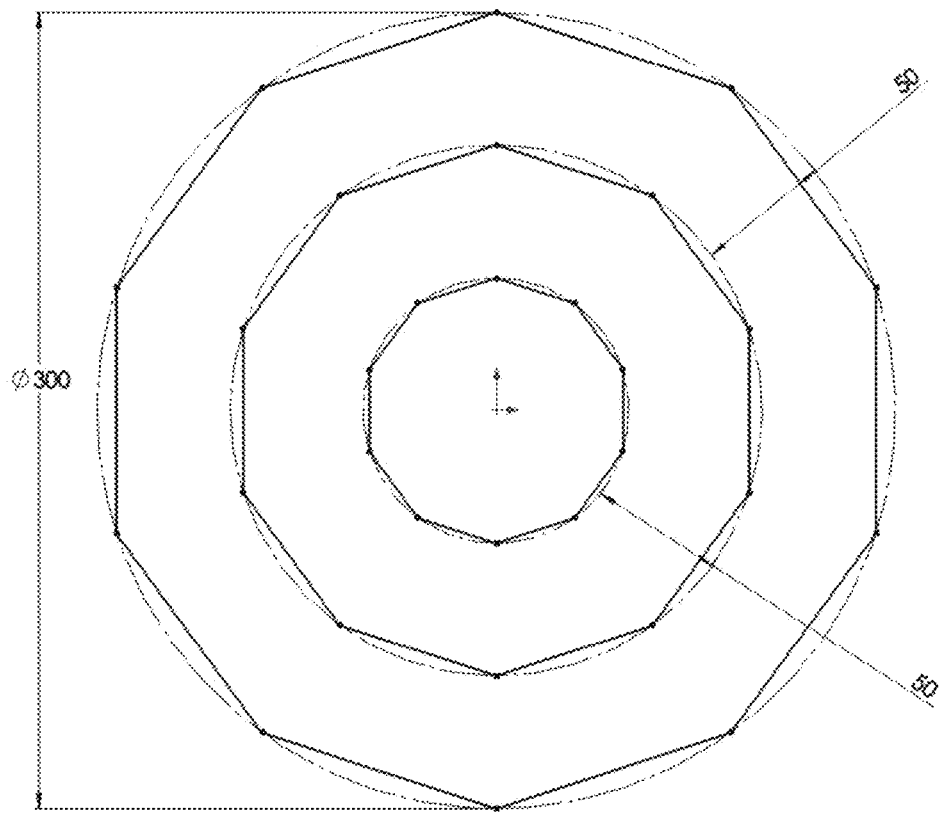
FIG. 2 is a top view of the three ten-sided polygons (lengths are in mm).

Step 2: in order to make the polygon's structure manageable, two smaller ten-sided polygons were constructed inside one another with a difference of 50 mm, as shown in FIG. 2, though any number of polygons, any number of polygonal sides, and any preselected differences therein are contemplated herein as well. Increasing the number of intermediate polygons will refine the hemisphere's outer curvature.

Figure 3:
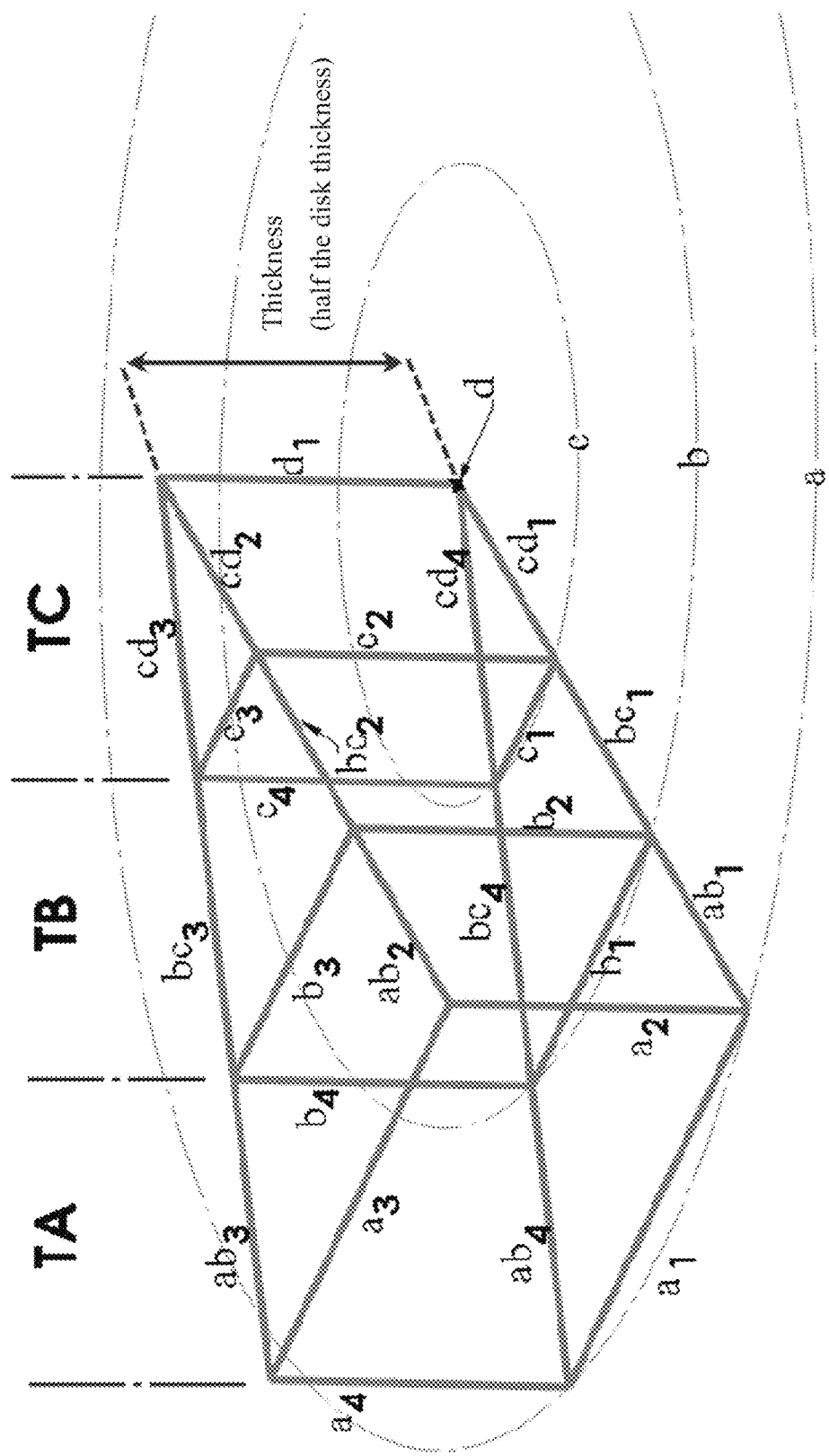
FIG. 3 depicts the constructed wireframe for the polygon's sector with notations.

Step 3: A design choice of 50 mm was given to the disk's half thickness (to be consistent with the three polygons' offset dimension) and, by connecting the nodes (the vertices of the polygons) by straight lines; a polygon sector can be constructed as shown in FIG. 3. Other suitable thicknesses are within the skill of one in the art as well. The polygon can have ten (or at least 3) identical sectors and, for clarity, only one is shown along with lines notation.

Figure 4:
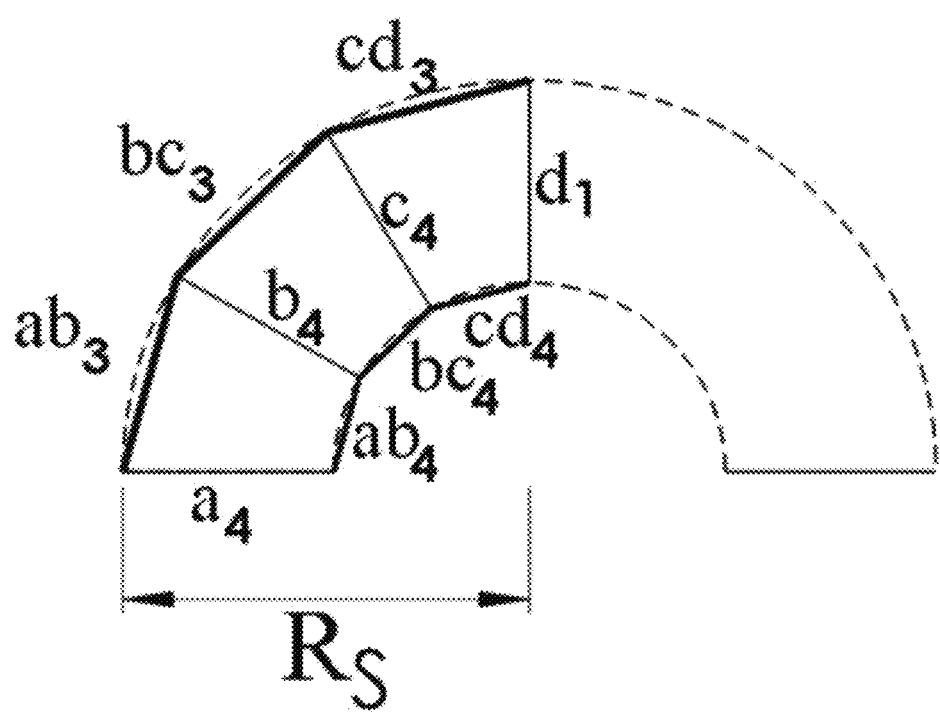
FIG. 4 depicts the sector's wireframe back surface shown from the side view.

Step 4: A design choice at this stage can be made as in which of the lines should be variable and which should be fixed in length. The thickness of the disk-to-sphere structure is considered to be fixed in this design example; thus, the lines $a_2$, $a_4$, $b_2$, $b_4$, $c_2$, $c_4$, and $d_1$, shown in FIG. 3, are equal 50 mm. FIG. 4 shows the side view of the sector's backside wireframe after morphing; the radius of the hemisphere ($R_s$) can be determined geometrically. As mentioned before (the radial lines on the surface of the disk bend and do not stretch), the lines $ab_3$, $bc_3$, and $cd_3$, shown in FIG. 3, would bend to approximate half arc, and lines $ab_2$, $bc_2$, and $cd_2$ would behave similarly. Because those three lines are considered equal to one another and fixed in length (50 mm), the outside radius of the circumscribing hemisphere would be 96.59 mm or other suitable length.

Figure 5:
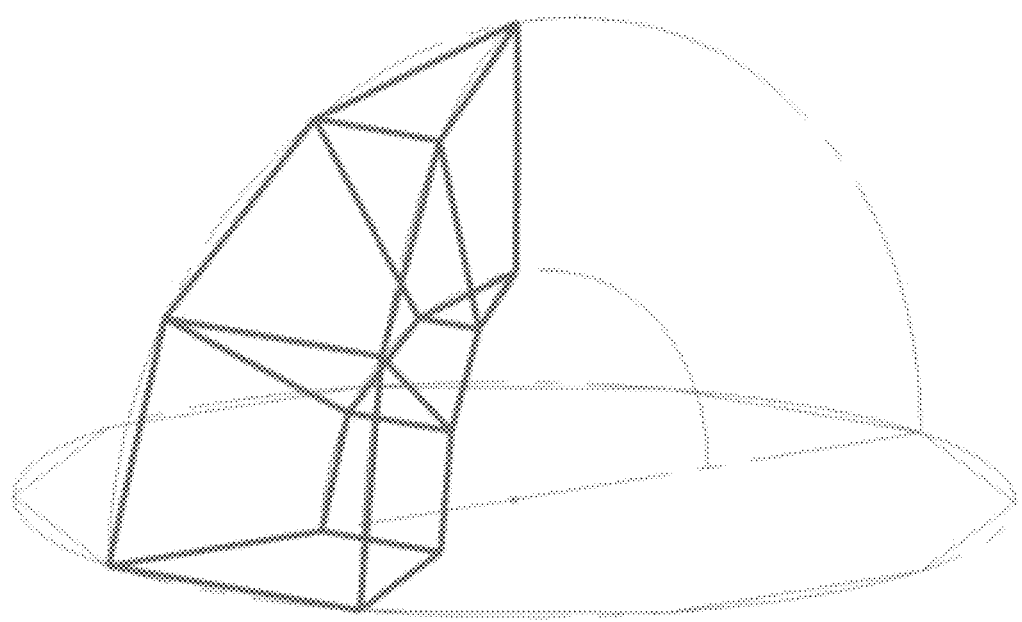
FIG. 5 depicts the morphed sector's wireframe.

Step 5: After the determination of the hemisphere radius, another ten-sided polygon is drawn on the top view that is in FIG. 4 with a circumscribed circle radius ($R_s$) of 95.49 mm or other suitable length. The nodes are then connected together forming the morphed sector as shown in FIG. 5.

Step 6: Having the wireframe's sector in its two positions (before and after morphing), Table 1 is constructed showing the different non-limiting dimensions of each link between the initial and final shape. Moreover, given this data, it can be analyzed how TA and TB (see FIG. 3) can morph from a trapezoidal prism to a quadrilateral-base pyramid; similarly, it can be analyzed how TC (see FIG. 3) can morph from a triangular prism to the triangular-base pyramid. The morphing strategies involved will be discussed as this specification continues.

TABLE 1

The non-limiting wireframe dimensions in the initial and final state of the sector.

| Segment | Link Name | Length (mm) @ Disk | Length (mm) @ Hemisphere |
|---|---|---|---|
| TA | $a_1$ | 92.71 | 28.12 |
|  | $a_2$ | 50 | 50 |
|  | $a_3$ | 92.71 | 59.02 |
|  | $a_4$ | 50 | 50 |
|  | $ab_1$ | 50 | 23.55 |
|  | $ab_2$ | 50 | 50 |
|  | $ab_3$ | 50 | 50 |
|  | $ab_4$ | 50 | 23.55 |
| TA/TB | $b_1$ | 61.8 | 24.35 |
|  | $b_2$ | 50 | 50 |
|  | $b_3$ | 61.8 | 51.11 |
|  | $b_4$ | 50 | 50 |
| TB | $bc_1$ | 50 | 23.55 |
|  | $bc_2$ | 50 | 50 |
|  | $bc_3$ | 50 | 50 |
|  | $bc_4$ | 50 | 23.55 |
| TB/TC | $c_1$ | 30.9 | 14.06 |
|  | $c_2$ | 50 | 50 |
|  | $c_3$ | 30.9 | 29.51 |
|  | $c_4$ | 50 | 50 |
| TC | $cd_1$ | 50 | 23.55 |
|  | $cd_2$ | 50 | 50 |
|  | $cd_3$ | 50 | 50 |
|  | $cd_4$ | 50 | 23.55 |
|  | $d_1$ | 50 | 50 |

B. Morphing Strategies

Herein, analysis is carried out on how a trapezoidal prism can be morphed into a quadrilateral-base pyramid and how a triangular prism can be morphed into a triangular-base pyramid. To understand the problem with clarity, working with a regular three-dimensional wireframe, such as a cube instead of the trapezoidal prism, may provide a general insight on the degrees-of-freedom (DOF) and what parameters are involved to control the movements of each link within the wireframe. Previously, it was explained that a quadrilateral two-dimensional frame formed of six links (four sides and two diagonal) will have (−1) DOF; thus, only five links are needed to fully define the frame, making it a structure with zero DOF and leading to the method of five chose n or $$\binom{5}{n},$$

which was discussed fully in [Alqasimi, A., and Lusk, C., "Shape-Morphing Space Frame (SMSF) Using Linear Bistable Elements" in Proceedings of the 2015 Design Engineering Technical Conferences & Computers and Information in Engineering Conference, Boston, Mass., Aug. 2-5, 2015. DETC2015-47526]. Following the similar method, the same five links are used (four sides and a diagonal) but in this case it extends to the third dimension by giving it a depth as shown in FIG. 6.

The mobility equations will remain the same as the planar case because all the pin joints and links are collinear. The method of five chose n or $$\binom{5}{n}$$

is also applicable in this situation, where n is the number of surfaces that need to change length. The analysis of the cube can be extended to the trapezoidal prism because it is a special case from where two opposite surfaces are inclined inward or outward from one another.

Figure 7:
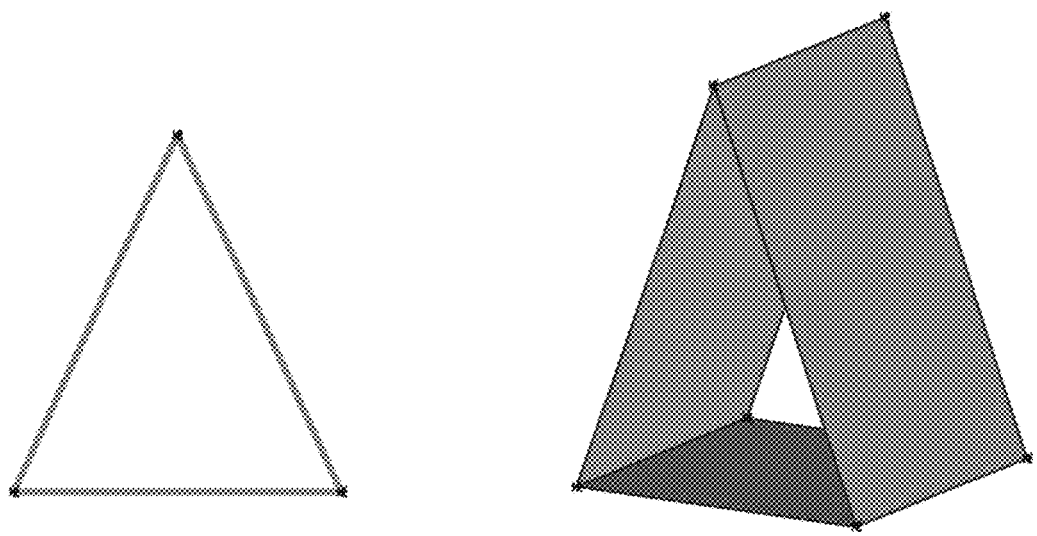
FIG. 7 depicts the triangular structure in its 2D and 3D form.

In the case of the triangular prism, the two-dimensional aspect shows that if three links were connected in a loop with three pin joints between each link, it will result in a structure with zero DOF. Adding a third dimension by giving it a thickness will result in three surfaces connected in a loop with three hinges; it is also a structure as shown in FIG. 7.

Figure 8:
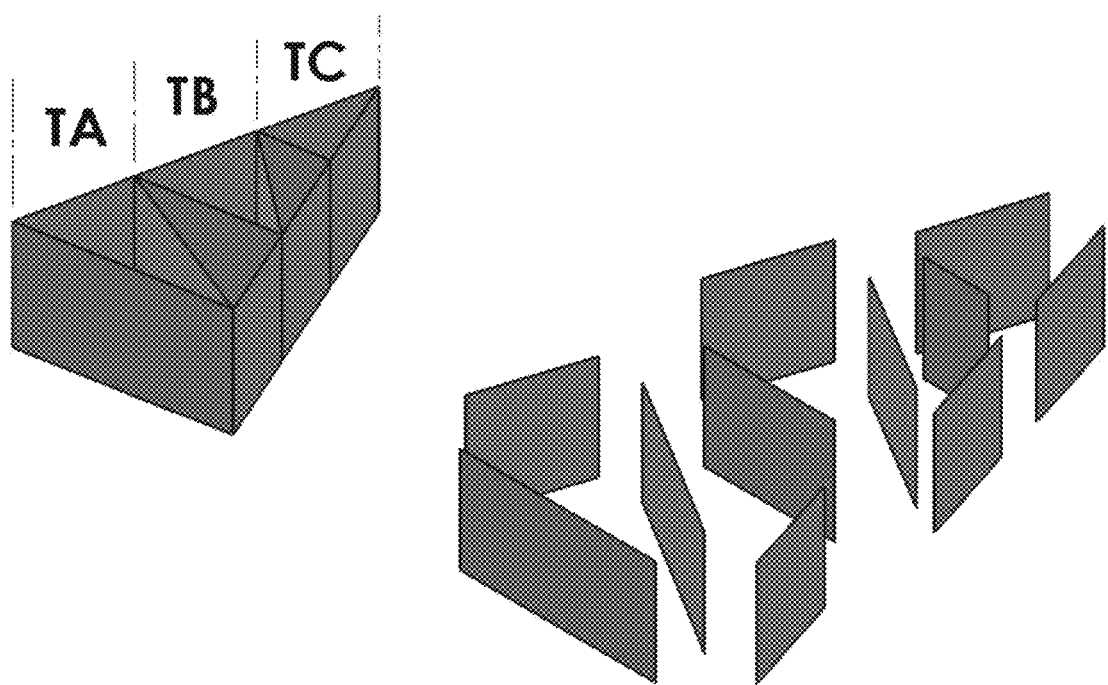
FIG. 8 shows the 11 planes needed to construct the sector's structure.

From FIG. 3, the chosen sector includes three (3) segments in which TA and TB is a trapezoidal prism sharing a surface, and TC is a triangular prism sharing one surface with the TB. FIG. 8 shows the 11 different surfaces needed to construct the sector out of ten sectors.

Figure 9:
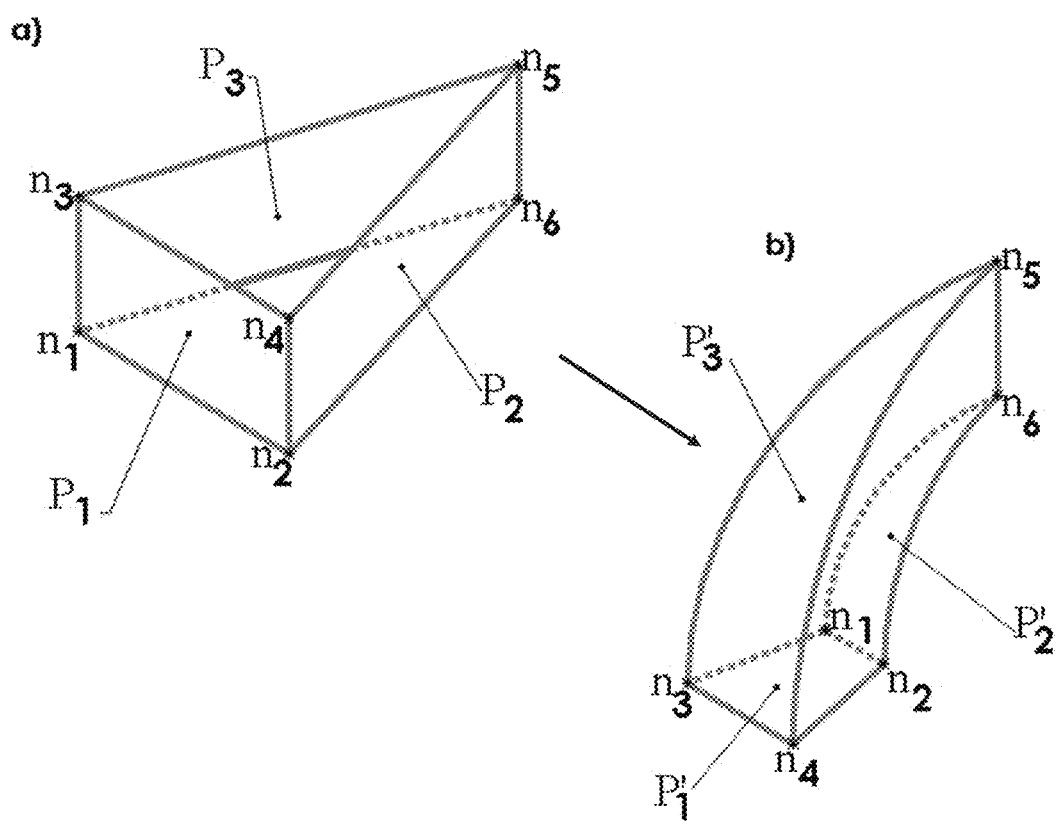
FIG. 9 shows the nodes and planes in (a) sector, (b) wedge.

Analyzing the sector in general, it can be considered as one large triangular prism in which only three surfaces can be used to construct it, eliminating the need for the intermediate surfaces and reducing it from 11 to 3, though any number of surfaces is contemplated herein as long as the surfaces can form a structure. Regardless of whether the surfaces are curved or planar, the triangular prism sector can remain a structure before and after the morph, as shown in FIG. 9. The kinematics involved in constructing the surface on one hand and its compliancy on the other hand, will be analyzed based on each segment's individual morph behavior.

II. Mechanism Synthesis

The mechanism synthesis involved in morphing the planes is investigated using kinematic graphic design. Because the sector in FIG. 9 is composed of three surfaces ($P_1$, $P_2$, and $P_3$), where $P_2$ and $P_3$ are similar in design and behavior, controlling the nodes ($n_1$ to $n_6$) via a compliant mechanism allows the required relative displacement between the nodes, as in the form of length change for each link (see Table 1). It is possible to solve this problem using the linear bistable link elements (LBCCSM), which results in a more complex spatial mechanism with its associated DOF and increases the number of elements needed for assembly. Using the concept of a cell element reduces the number elements needed for the design and assembly. FIGS. 10A-10B illustrate the area of the unit cell in which a mechanism connecting the nodes (vertices) should fit, morphing $P_1$ from a rectangular to a trapezoidal cell element $P'_1$ (FIG. 10A), and $P_2$ from a rectangular to an arched rectangular cell element $P'_2$ (FIG. 10B). A minimum of four (4) extra intermediate nodes are added for $P_2$ and $P_3$ corresponding to the disk tessellation described previously. Four (4) extra nodes are used because two (2) smaller polygons were chosen; as such, as it can be understood that in other embodiments, if three (3) smaller polygons were chosen, for example, then six (6) extra nodes can be used.

III. Type and Dimension Synthesis

Identifying the unit cell's initial and final state was a key step in the mechanism type selection process. Summarizing the information from FIG. 3, FIG. 9, and FIG. 10, along with Table 1 into Table 2, guided the mechanism type selection in terms of design choices and constraints.

TABLE 2

The non-limiting dimensions involved in FIGS. 10A-10B.

| Plane FIG. 9 | Connection between Nodes FIG. 10 | | Link name FIG. 3 | Length (mm) | | Δ Length (mm) |
|---|---|---|---|---|---|---|
| | | | | Initial Table 1 | Final | |
| $P_1$ | $n_1$ | $n_2$ | $a_1$ | 92.71 | 28.12 | 64.59 |
| | $n_2$ | $n_4$ | $a_2$ | 50 | 50 | 0 |
| | $n_4$ | $n_3$ | $a_3$ | 92.71 | 59.02 | 33.69 |
| | $n_3$ | $n_1$ | $a_4$ | 50 | 50 | 0 |
| $P_2$ | $n_2$ | $n_4$ | $a_2$ | 50 | 50 | 0 |
| | $n_4$ | $i_1$ | $ab_2$ | 50 | 50 | 0 |
| | $i_1$ | $i_3$ | $bc_2$ | 50 | 50 | 0 |
| | $i_3$ | $n_5$ | $cd_2$ | 50 | 50 | 0 |
| | $n_5$ | $n_1$ | $d_1$ | 50 | 50 | 0 |
| | $n_6$ | $i_4$ | $cd_1$ | 50 | 23.55 | 26.45 |
| | $i_4$ | $i_2$ | $bc_1$ | 50 | 23.55 | 26.45 |
| | $i_2$ | $n_2$ | $ab_1$ | 50 | 23.55 | 26.45 |
| | $i_1$ | $i_2$ | $b_2$ | 50 | 50 | 0 |
| | $i_3$ | $i_4$ | $c_2$ | 50 | 50 | 0 |

The mechanisms' parameters from Table 2 are written in the form of constraints as follows:

Constraint #1 for $P_1$: The relative displacement between nodes ($n_1$, $n_3$) and ($n_2$, $n_4$) should be zero in this example. However, in other embodiments and based on different $P_1$ designs, the nodes can have relative displacement between each other.

Constraint #2 for $P_1$: The relative displacement between nodes ($n_1$, $n_2$) and ($n_3$, $n_4$) should be collinear and toward each other in this example. However, in other embodiments and based on different $P_1$ designs, the nodes can have relative displacement between each other in any other direction.

Constraint #3 for $P_2$ and $P_3$: The relative displacement between each consecutive node should be zero except between nodes ($n_2$, $i_2$), ($i_2$, $i_4$), and ($i_4$, $n_6$) which should be collinear and toward each other in this example. However, in other embodiments and based on different $P_2$ and $P_3$ designs, the nodes can have relative displacement between each other.

Figure 11B:
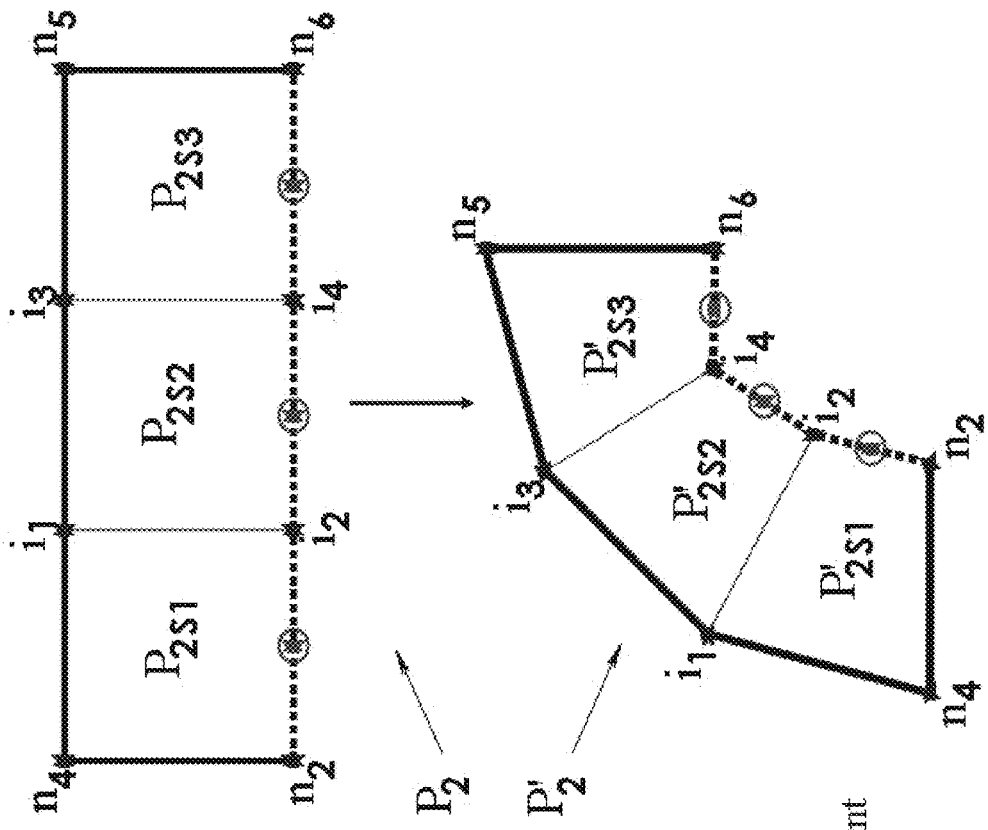
FIG. 11B depicts rigid links and nodes in a generalized $P_2$ mechanism.
Figure 11A:
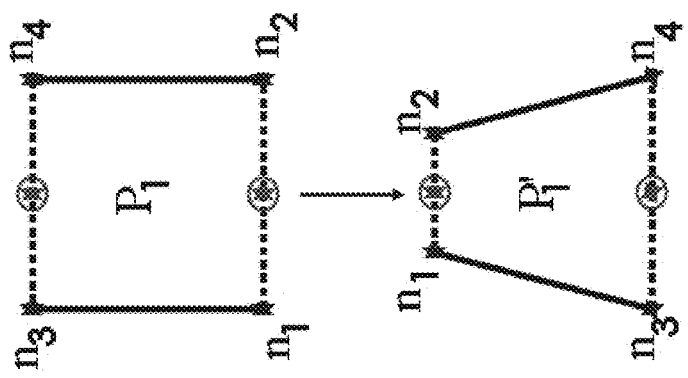
FIG. 11A depicts rigid links and nodes in a generalized $P_1$ mechanism.

Constraint #4 for all the nodes: If the relative displacement between two nodes is zero (no length change), then a single rigid link can be used to connect both nodes. Two or more rigid links can be used to provide a link between nodes that have collinear relative displacement (collinear length change between nodes); therefore, a minimum of one extra node should be introduced between the original two nodes. FIGS. 11A-11B show the rigid links and identifies the minimum number of external nodes for each mechanism within $P_1$ (FIG. 11A) and $P_2$ (FIG. 11B). A minimum of six external nodes for $P_1$ and five external nodes for $P_2$ were used in the mechanism, though the minimum number of external nodes can be different based on different $P_1$ and $P_2$; those nodes are translated to be living hinges connecting the compliant links in this example. However, in other embodiments, the nodes can be understood to be any type of connection.

Constraint #5: The mechanism should be contained within the assigned surfaces ($P_1$, $P_2$ and $P_3$) and its links should not interfere with each other, i.e., links should not cross to enable single plane fully compliant manufacture. However, in other embodiments, such as multi-plane or multi-layer mechanisms, links can cross.

Furthermore, a one-DOF mechanism can be considered because the mechanism is the unit cell, and to reduce the number of actuators required to control the overall design. An optional constraint is the ability to laser cut the mechanism from a single sheet of polymer; this requires the mechanism to be planar and single layer. Solving the kinematic equations for an unknown mechanism, where only the initial and final state of four of its nodes is given, turns the problem into a mechanism synthesis. Furthermore, solving for the links' shape, interferences, overlapping, and the containment of the mechanism within a specific footprint requires extensive formulation and coding.

A. The Synthesis of $P_1$

Figure 12C:
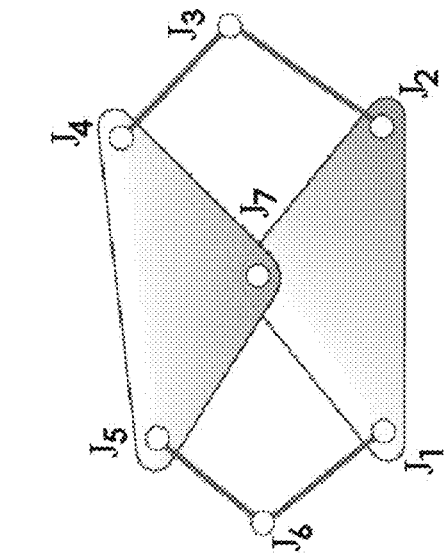
FIG. 12C depicts a conventional six-bar isomer for one-DOF mechanism.
Figure 12B:
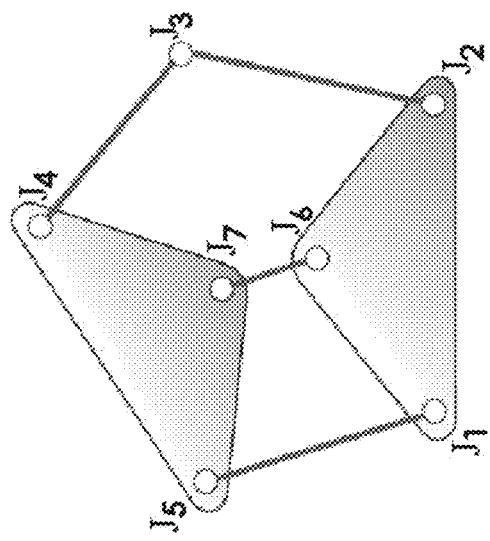
FIG. 12B depicts a conventional six-bar isomer for one-DOF mechanism.
Figure 12A:
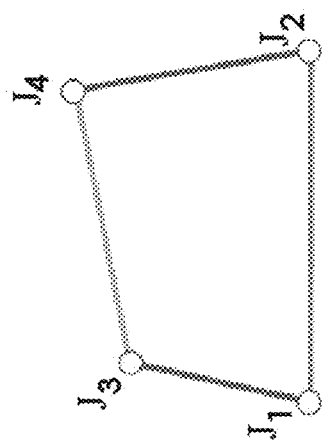
FIG. 12A depicts a conventional four-bar isomer for one-DOF mechanism.

For proof of concept, the approach followed in solving this design problem for $P_1$ was simplified by the use of existing mechanisms and the use of SOLIDWORKS CAD software. From the Design of Machinery [Norton, R., "Design of Machinery", McGraw-Hill Education Material, 5 ed. 2011, ISBN 9780077421717], the number of single-DOF mechanisms and its valid isomers possible for the four-bar, six-bar, eight-bar, ten-bar, and twelve-bar linkages are, respectively, 1, 2, 16, 230, and 6856. Analyzing each isomer as a potential solution was done both deductively and via SOLIDWORKS. FIGS. 12A-12C show the four-bar and six-bar isomers for one-DOF mechanism.

If four of the outside pin joints of the mechanism are considered to be the nodes of $P_1$, then the four-bar mechanism cannot be utilized because its fixed length sides do not allow the change from rectangle to trapezoid (FIG. 12A). In the Stephenson's six-bar isomer, FIG. 12B, there are five outer nodes, which violate constraint #4, which calls for a minimum of six outer nodes for it to satisfy $P_1$ design, as shown in FIG. 11. In Watt's six-bar isomer in FIG. 12C, there are six outer nodes, which satisfy the minimum nodes requirement in constraint #4. There are three ways to arrange those nodes.

The first arrangement involves taking nodes ($J_2$, $J_1$), shown in FIG. 12C, as ($n_1$, $n_3$), shown in FIG. 10, and ($J_4$, $J_5$) as ($n_2$, $n_4$) which does not satisfy constraint #2 due to its scissor type motion between ($J_1$, $J_5$) and ($J_2$, $J_4$), where one moves inward forcing the other to move outward. The second arrangement involves taking nodes ($J_1$, $J_6$) as ($n_1$, $n_3$) and ($J_3$, $J_4$) as ($n_2$, $n_4$), which satisfies constraint #1, #2 and

Figure 13A:
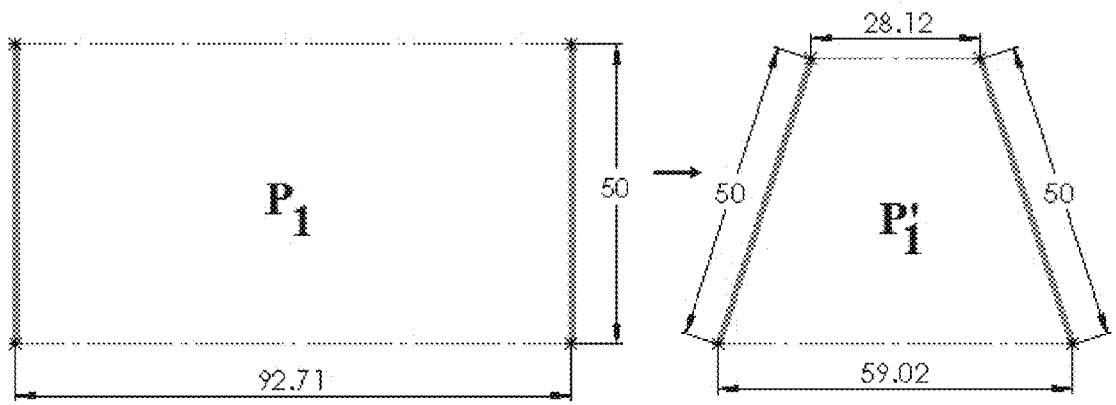
FIG. 13A depicts a boundary of the $P_1$ mechanism, (a) boundary, (b) without constraints, (c) constrained.

4. The satisfaction of the 5$^{th}$ constraint can be verified graphically by means of the CAD software using the following steps:

Step 1: The initial and final state of the mechanism is drawn using the dimensions provided in Table 2, as shown in FIG. 13A. The solid lines represent rigid links, and the broken lines are drawn to represent the area where the mechanism should be contained.

Figure 13B:
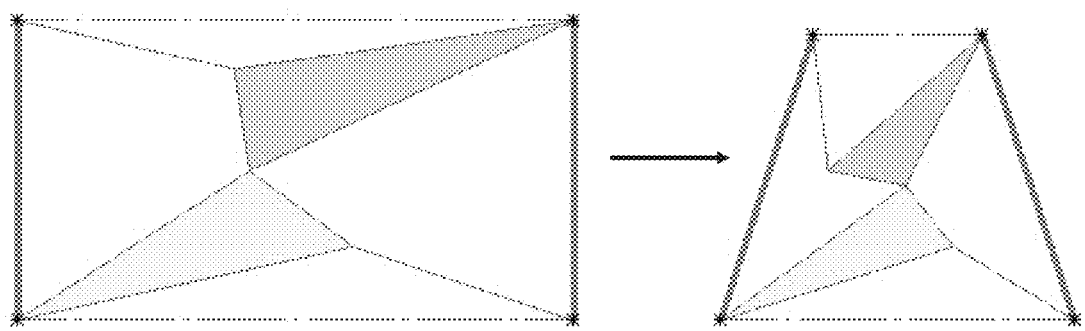
FIG. 13B depicts a $P_1$ mechanism without constraints.

Step 2: Drawing the rest of the links' schematic according to FIG. 12C without any dimensions or constraints on both $P_1$ and $P'_1$, as shown in FIG. 13B.

Figure 13C:
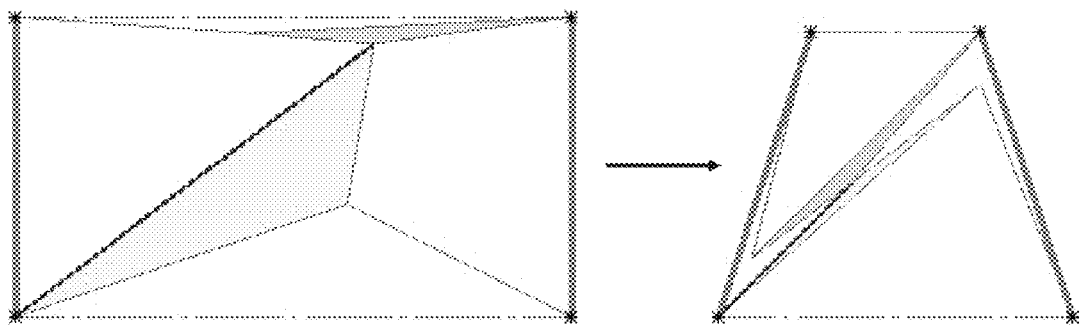
FIG. 13C depicts a constrained $P_1$ mechanism.

Step 3: Using a feature in SOLIDWORKS that allows the selection of two lines and constrain them to be equal is carried out between each link in $P_1$ and the corresponding link in $P'_1$, as shown in FIG. 13C. This is an effective way to figure out the dimensions associated with each link without solving for the kinematic equation.

Step 4: The constructed mechanism is then manipulated in SOLIDWORKS to fit within the assigned area in both states.

The result of this second arrangement violates constraint #5, as shown in FIG. 13C, as the length of the dotted link is not the same between $P_1$ and the corresponding link in $P'_1$. At the current length, the mechanism is contained within the assigned area, but once the final equal link constraint is added, the mechanism is driven out of bound. The third arrangement is a mirror of the second and also violates constraint #5; thus, both isomers of the six-bar mechanism with one DOF were not used in the design of this example. However, in other embodiments and based on different $P_1$ designs, six-bar isomers can be utilized in the design.

Figure 14A:
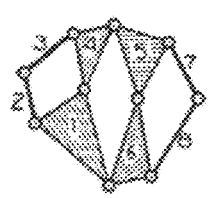
FIG. 14A depicts a conventional isomer of an eight-bar mechanism.
Figure 14B:
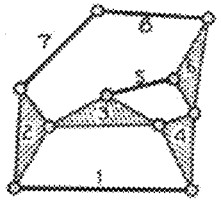
FIG. 14B depicts a conventional isomer of an eight-bar mechanism.
Figure 14C:
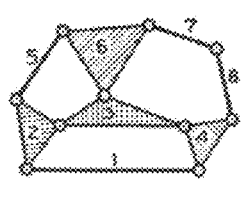
FIG. 14C depicts a conventional isomer of an eight-bar mechanism.
Figure 14D:
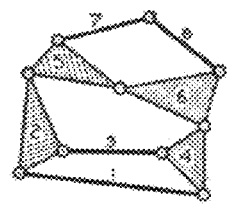
FIG. 14D depicts a conventional isomer of an eight-bar mechanism.
Figure 14E:
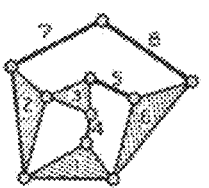
FIG. 14E depicts a conventional isomer of an eight-bar mechanism.
Figure 14F:
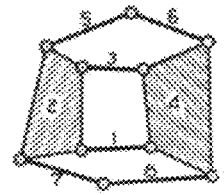
FIG. 14F depicts a conventional isomer of an eight-bar mechanism.
Figure 14G:
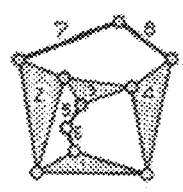
FIG. 14G depicts a conventional isomer of an eight-bar mechanism.
Figure 14H:
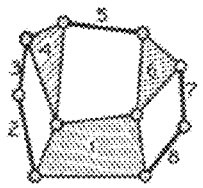
FIG. 14H depicts a conventional isomer of an eight-bar mechanism.
Figure 14I:
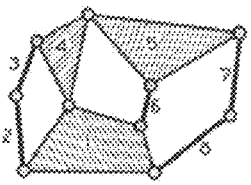
FIG. 14I depicts a conventional isomer of an eight-bar mechanism.
Figure 14J:
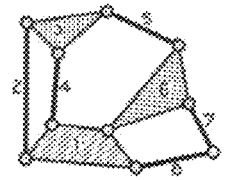
FIG. 14J depicts a conventional isomer of an eight-bar mechanism.
Figure 14K:
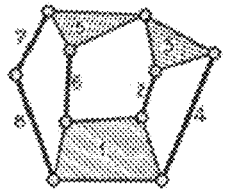
FIG. 14K depicts a conventional isomer of an eight-bar mechanism.
Figure 14L:
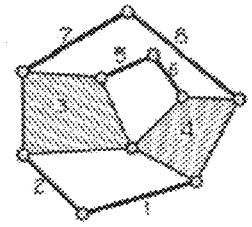
FIG. 14L depicts a conventional isomer of an eight-bar mechanism.
Figure 14M:
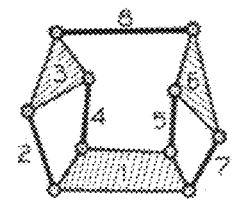
FIG. 14M depicts a conventional isomer of an eight-bar mechanism.
Figure 14N:
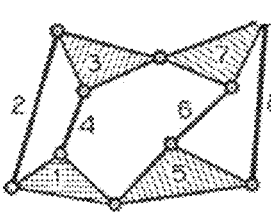
FIG. 14N depicts a conventional isomer of an eight-bar mechanism.
Figure 14O:
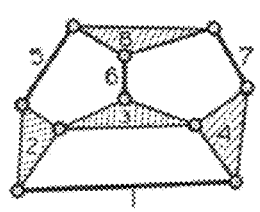
FIG. 14O depicts a conventional isomer of an eight-bar mechanism.
Figure 14P:
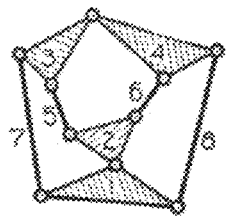
FIG. 14P depicts a conventional isomer of an eight-bar mechanism.

For the reason that neither the four-bar nor the six-bar mechanisms satisfied the required constraints, the eight-bar mechanism with its 16 isomers, shown in FIG. 14A-14P, were analyzed individually using the same methodology and reduced according to the following two observations:

1) Isomers with less than five outer nodes were eliminated in this example, shown in FIGS. 14E, 14G, and 14P. However, in other embodiments and based on different $P_1$ designs, it can be understood that isomers with less than five outer nodes can be utilized in the design.

2) Isomers with quaternary link, which is the link that connects to other links at four nodes, shown in FIGS. 14F, 14H, 14I, 14J, 14K, 14L, and 14M, were eliminated in this design example, due to the extra constraints needed in SOLIDWORKS to match the initial and final state of the mechanism, unlike the ternary link where fixing its three sides fixes the link. However, in other embodiments and based on different $P_1$ designs, these isomers can be utilized in the design.

After studying the remaining isomers shown in FIGS. 14A, 14B, 14C, 14D, 14N, and 14O, it was concluded that the isomer of FIG. 14A can provide the solution to the given problem, of this design example, satisfying all the constraint and dimensions required by the design. This solution will be discussed thoroughly. However, in other embodiments and based on different $P_1$ designs, it should be understood that the remaining isomers can be utilized in the design.

Figure 15:
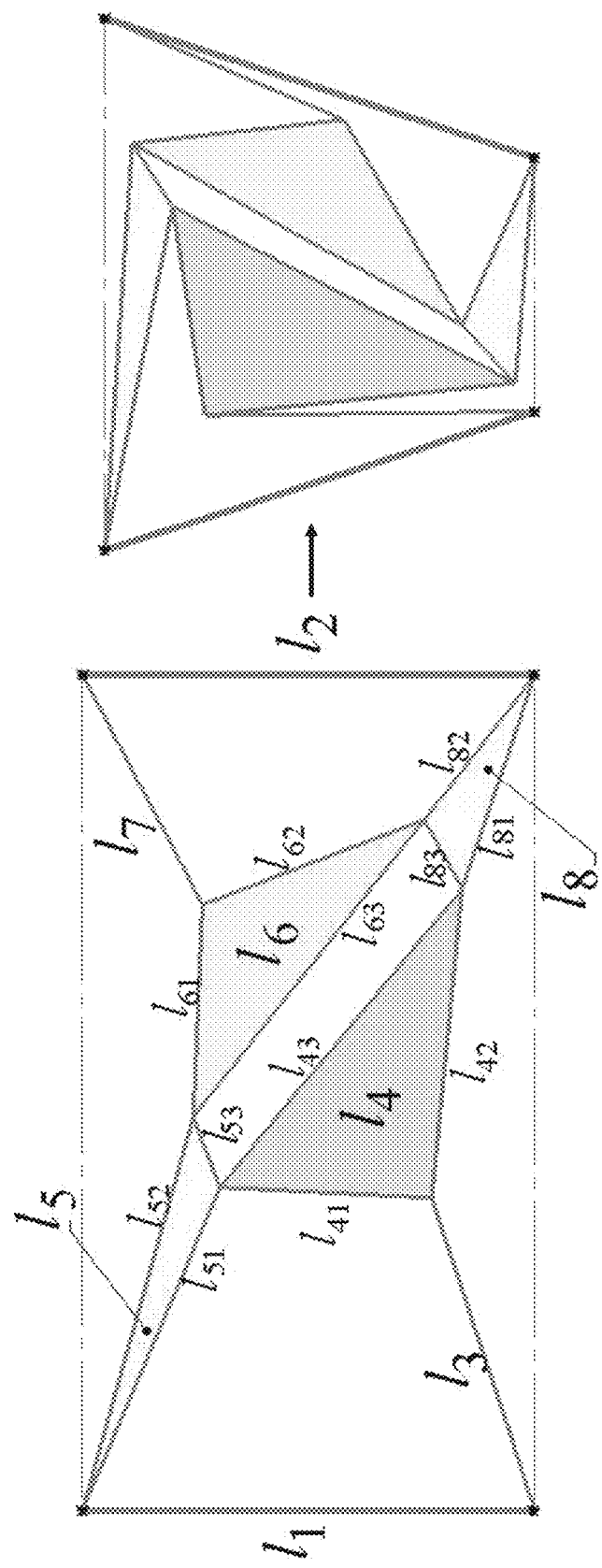
FIG. 15 depicts $P_1$ schematics with eight-bar mechanism and links' notation.

FIG. 15, with reference to FIG. 14A, shows the results after following the four steps involved in the 2$^{nd}$ arrangement of Watt's six-bar isomer, where the five constrains were verified and met in this design arrangement. To fully define the sketch in SOLIDWORKS, Table 3 illustrates the additional non-limiting constraints added to the lines in both $P_1$ and $P'_1$.

TABLE 3

$P_1$ with non-limiting constraints of an eight-bar mechanism.

| Plane Location | Constraint Type | Between Entities | |
|---|---|---|---|
| $P_1$ | Collinear | $l_4$ | $l_7$ |
| | Collinear | $l_{81}$ | $l_{43}$ |
| | Angle = 60° | $l_1$ | $l_{51}$ |
| | Vertical | $l_1$ | |
| | Vertical | $l_2$ | |
| | Equal | $l_{53}$ | $l_{84}$ |
| | Equal | $l_{43}$ | $l_{63}$ |
| $P'_1$ | Horizontal | $l_{52}$ | |
| | Horizontal | $l_{81}$ | |
| | Angle = 60° | $l_1$ | $l_{51}$ |
| | Collinear | $l_{43}$ | $l_{63}$ |
| | Collinear | $l_{84}$ | $l_{43}$ |
| | Collinear | $l_{53}$ | $l_{63}$ |

Figure 16:
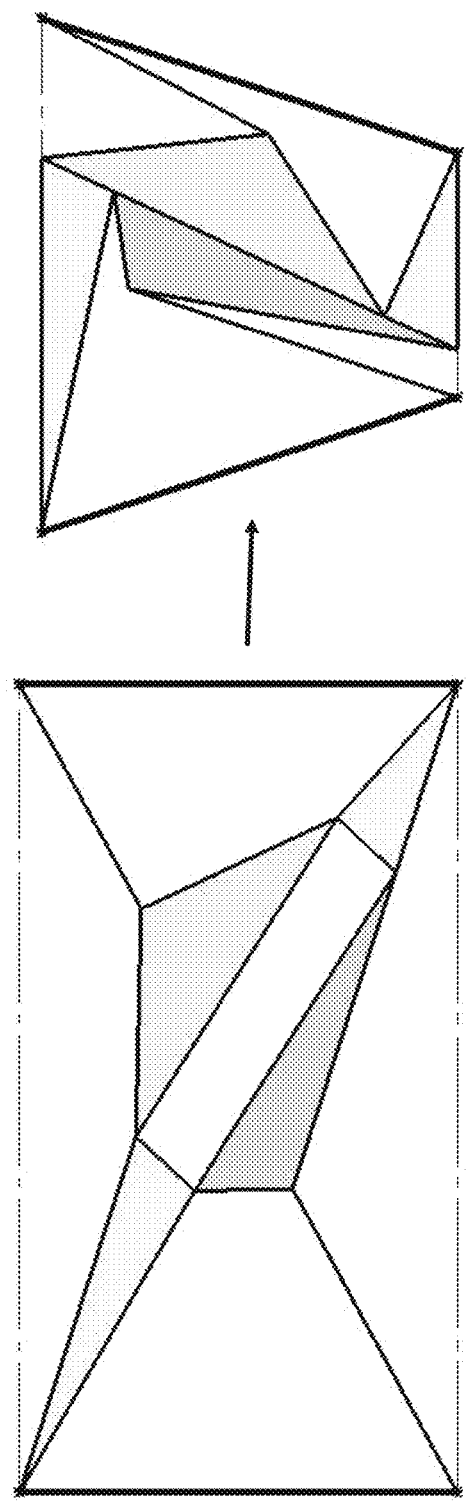
FIG. 16 depicts the $P_1$ final mechanism in its initial and final state.
Figure 17:
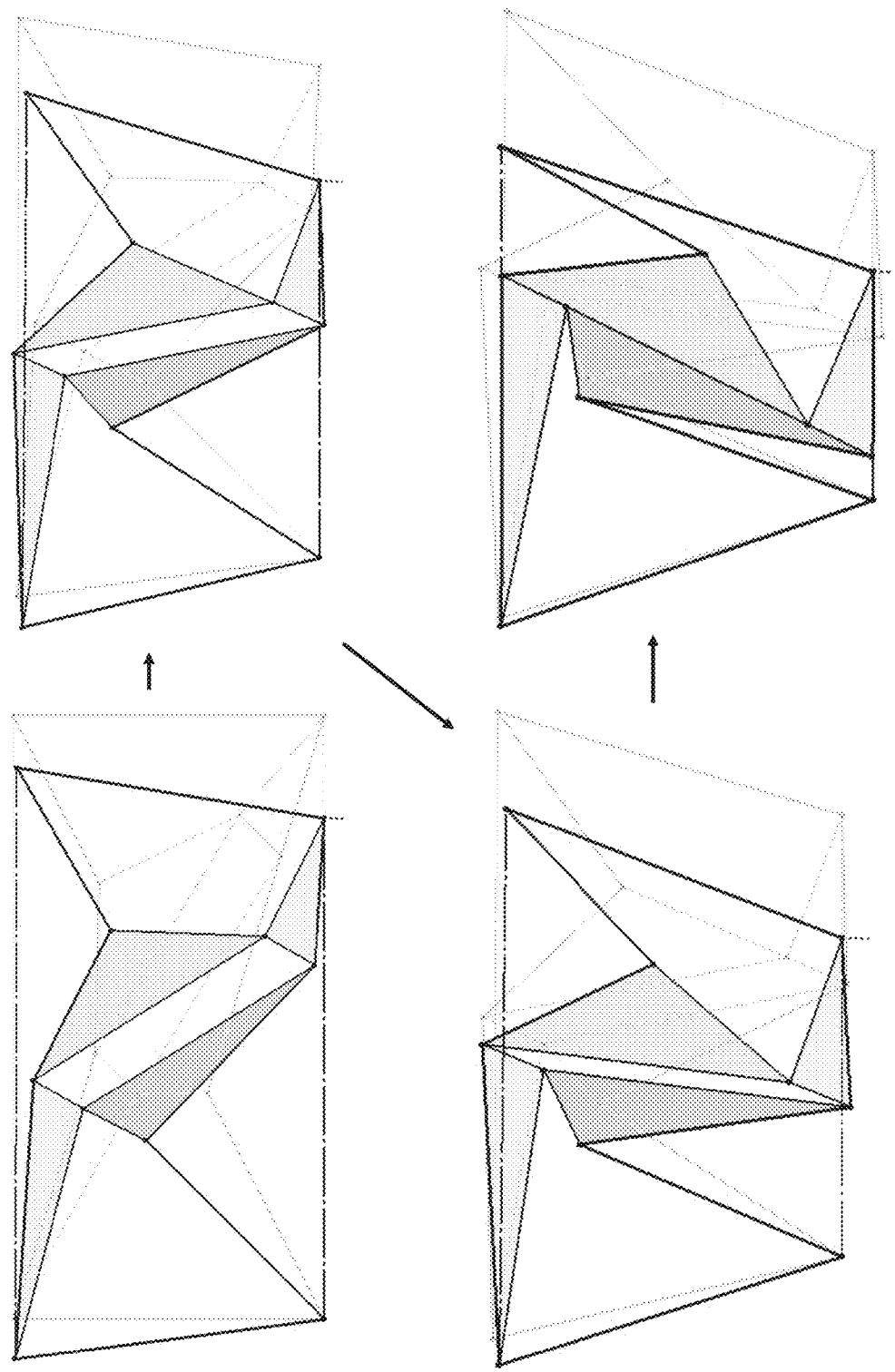
FIG. 17 depicts the $P_1$ mechanism's movement using five different translational positions.

FIG. 16 shows the fully defined mechanism's arrangement, and at this stage of the design, all the lines are considered rigid links and all the nodes are pin joints On that note, FIG. 17 illustrate the mechanism's movement using five different translational positions from its initial state in $P_1$ to its final state in $P'_1$.

Figure 18A:
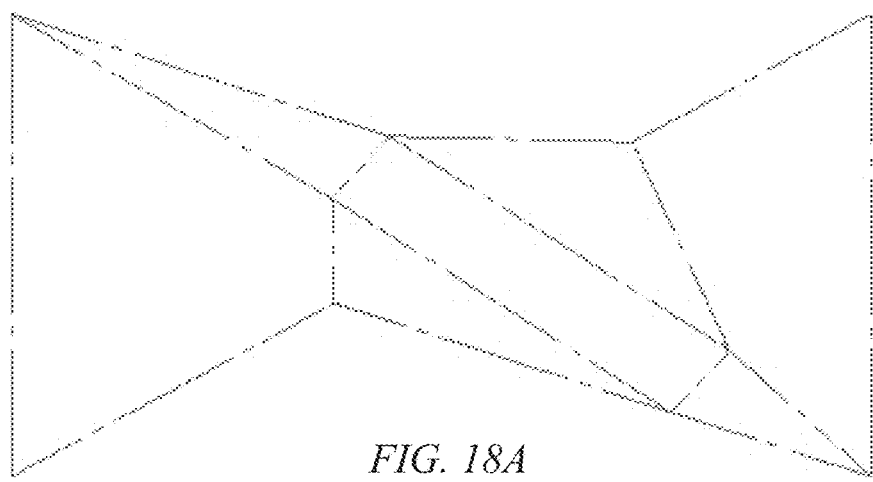
FIG. 18A depicts the $P_1$ mechanism as an outline.
Figure 18B:
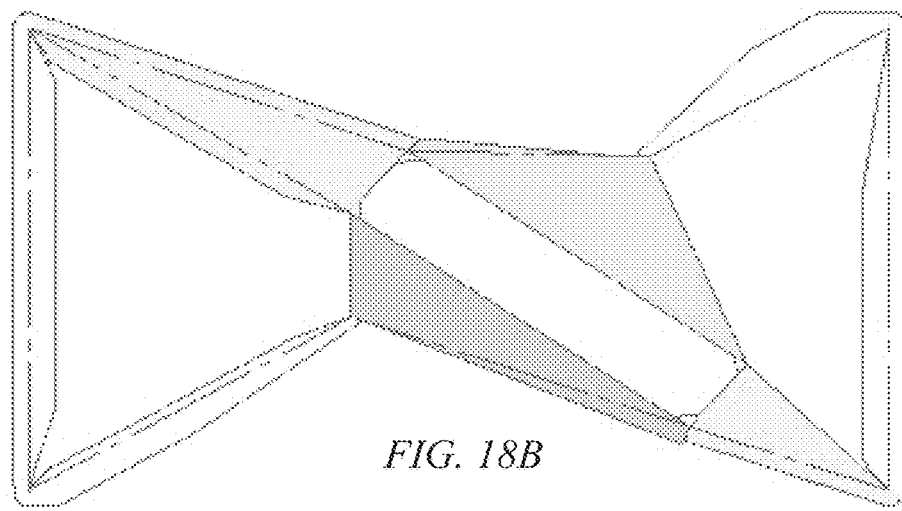
FIG. 18B depicts the $P_1$ mechanism in transition from an outline to a fully compliant mechanism.
Figure 18C:
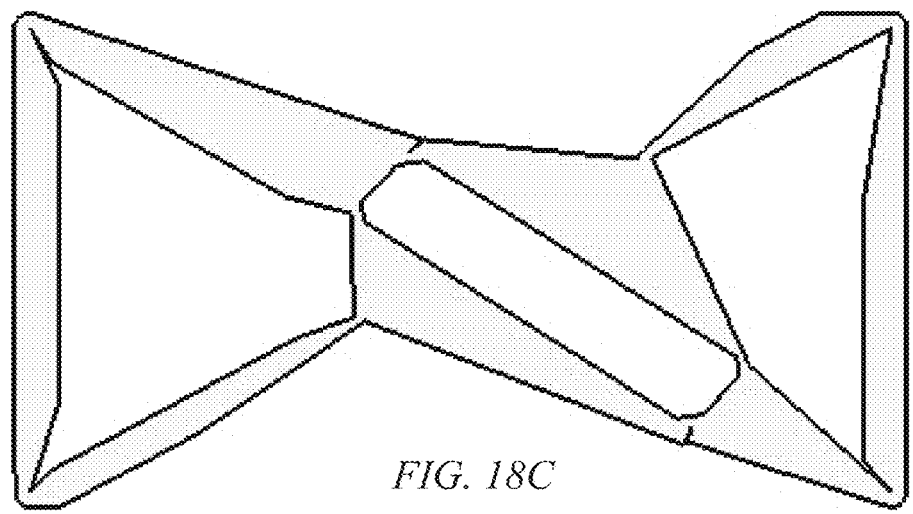
FIG. 18C depicts the $P_1$ mechanism as a fully compliant mechanism.

The final stage of the design involves converting the mechanism's linkages to compliant segments where the pin joints are replaced with flexural pivots. The design of those flexural pivots was done in SOLIDWORKS to meet the laser cutter's limitations. FIGS. 18A-18C show the development of the design from the concluded outline of the mechanism in FIG. 18A to the complete design in a compliant form in FIG. 18C; the full dimension of this design is shown in FIGS. 69-71. The bistability analysis for this design will become clearer as this specification continues.

It should be noted that some of the disqualified isomers can work for small length change between nodes ($n_1$, $n_2$) and ($n_3$, $n_4$), and as such are contemplated by the current invention as well.

B. The Synthesis of $P_2$ and $P_3$

Figure 19:
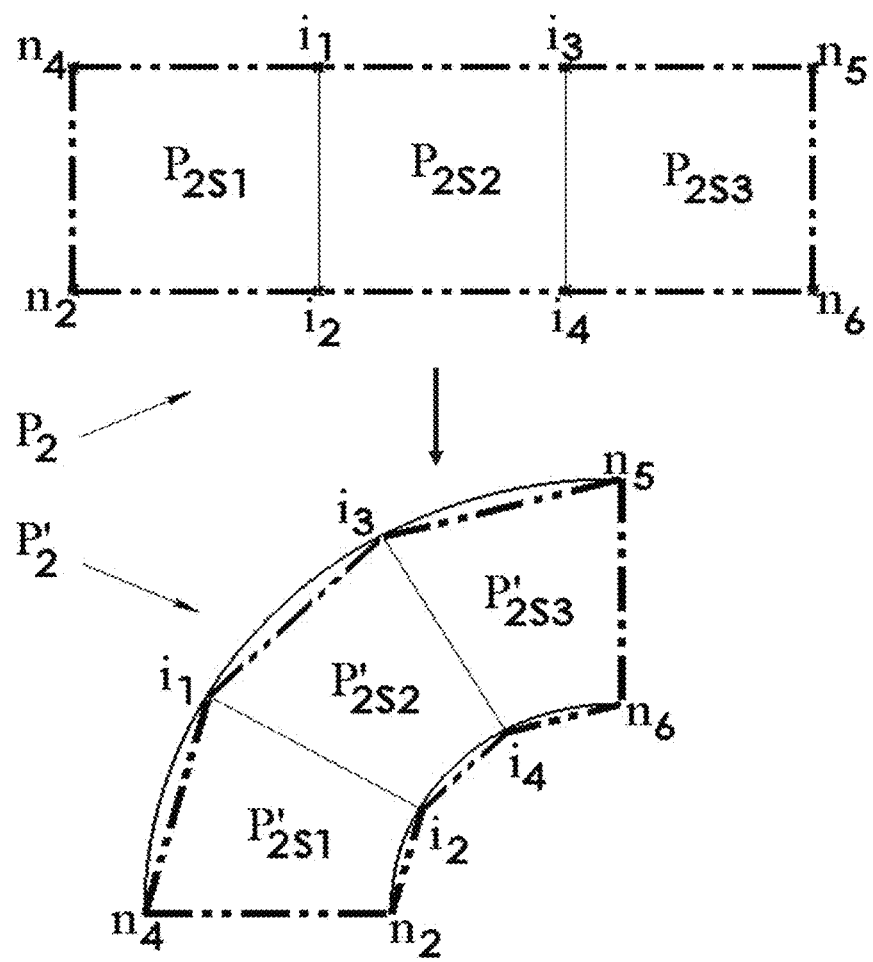
FIG. 19 shows the sub-section of $P_2$ for synthesis.

The synthesis of the remaining two planes $P_2$ and $P_3$ of the sector in FIG. 9 is described herein. Because the planes are identical, the analysis of one plane can be applied to the other without any modification. In order for $P_2$ to change its initial state from rectangular to an arched rectangular cell element $P'_2$, it was divided into three equal parts as per the disk tessellation described previously. Referring to Table 2 and constraint #3 for $P_2$ and $P_3$ that state "the relative displacement between each consecutive node should be zero except between nodes ($n_2$, $i_2$), ($i_2$, $i_4$) and ($i_4$, $n_6$) should be collinear and toward each other", a minimum of one extra node should be placed between the nodes with collinear displacement. The analysis of $P_{2S1}$ section, shown in FIG. 19, is performed as an individual unit cell and can be applied to the rest of the two sections $P_{2S2}$ and $P_{2S3}$.

Figure 20A:
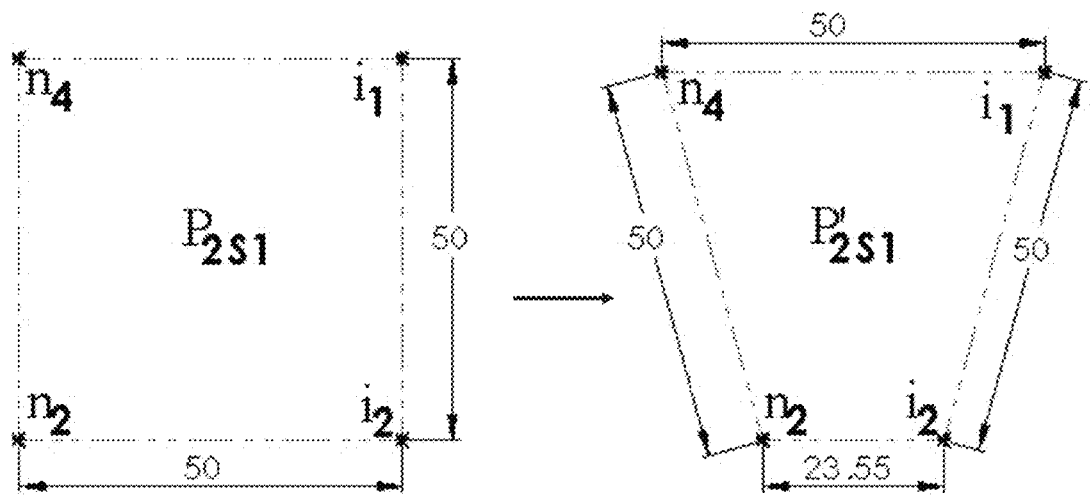
FIG. 20A shows the boundary of a $P_{2S1}$ mechanism.
Figure 20B:
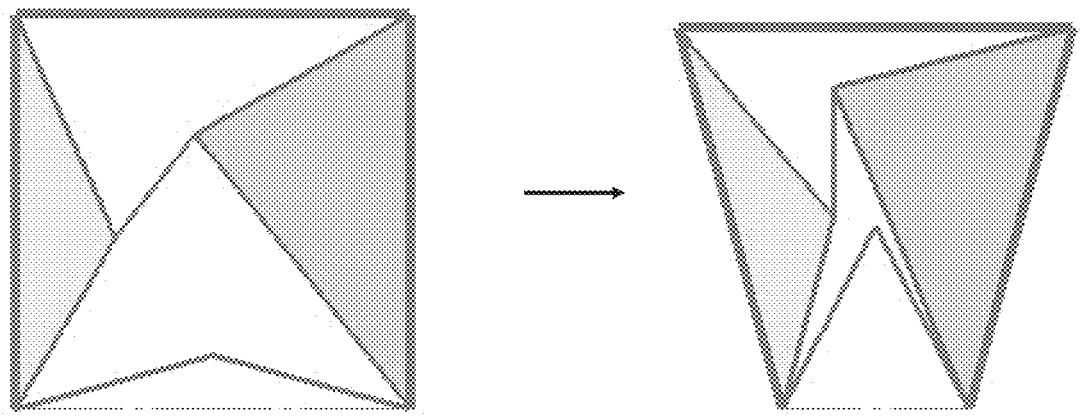
FIG. 20B shows the boundary of the $P_{2S1}$ mechanism fitted Stephenson's six-bar isomer.

The four-bar mechanism cannot be applied due to its four sides being rigid; where in section $P_{2S2}$ one side should have the ability to displace inward. On the other hand, Stephenson's six-bar isomer FIG. 12B satisfies the minimum requirement of five outer nodes along with the constraint #3. FIGS. 20A-20B show the mechanism in SOLIDWORKS in the initial and final state with the inner links constrained to be equal, thus satisfying constraint #4.

Figure 21:
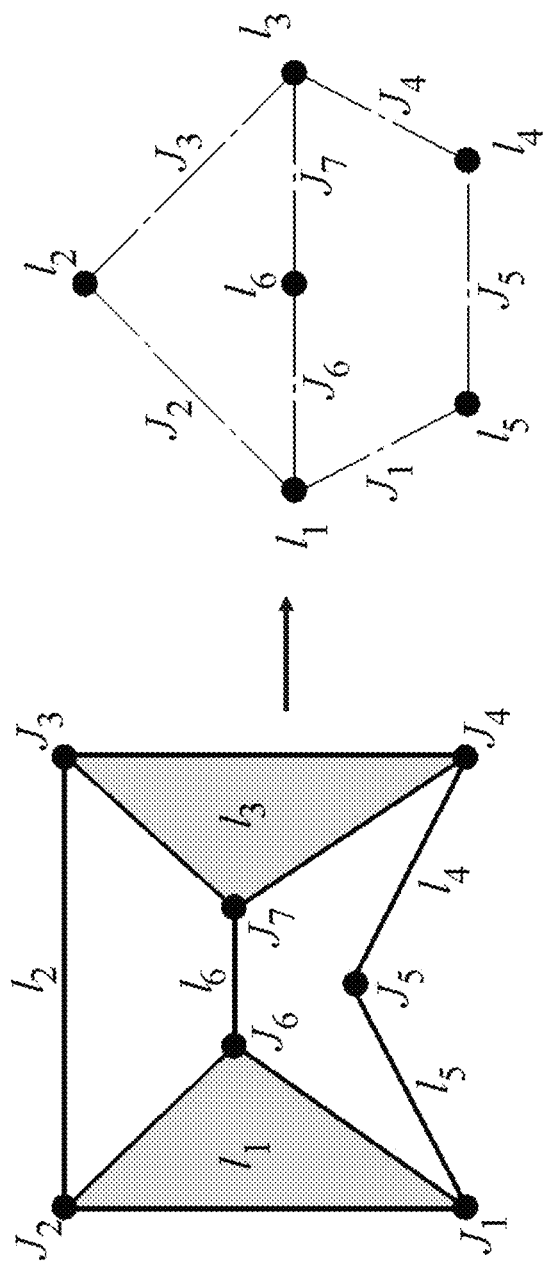
FIG. 21 depicts Stephenson's six-bar isomer in graph theory.

This mechanism has one DOF through its six links and seven joints; and because the design requires the unit cells to be bistable, the mechanism should be a structure with zero DOF in its initial and final state. Analyzing the mechanism using the graph theory where links and joints are represented by points and lines respectively, gives an alternative way to develop mechanisms undergoing certain constraints. FIG. 21 illustrates the example of Stephenson's six-bar isomer using the graph theory.

Figure 22A:
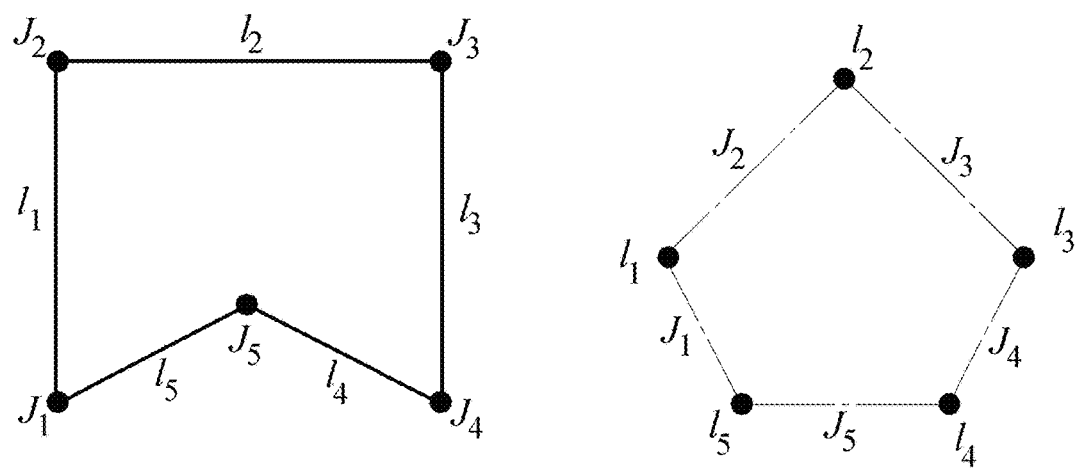
FIG. 22A depicts a step in converting a five-bar mechanism into a zero-mobility mechanism.
Figure 22B:
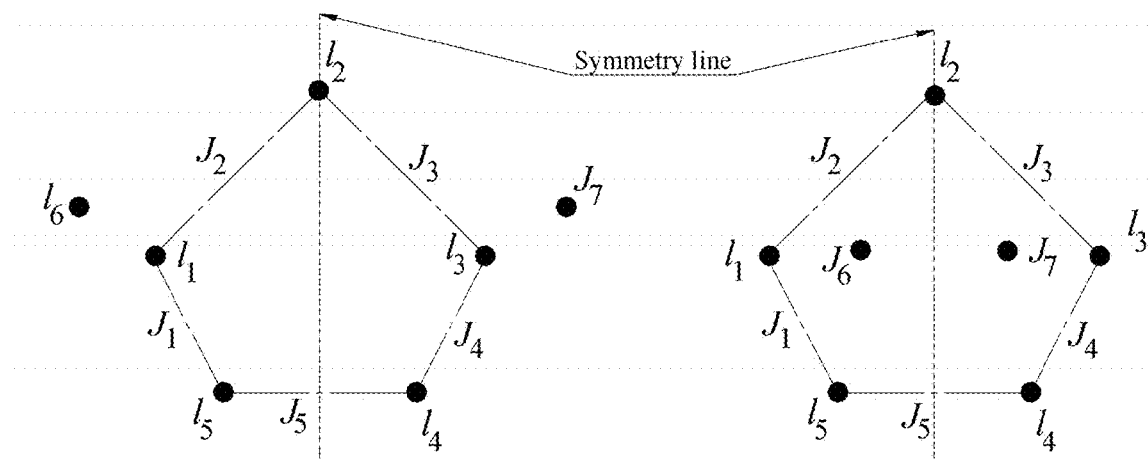
FIG. 22B depicts a step in converting a five-bar mechanism into a zero-mobility mechanism.
Figure 22C:
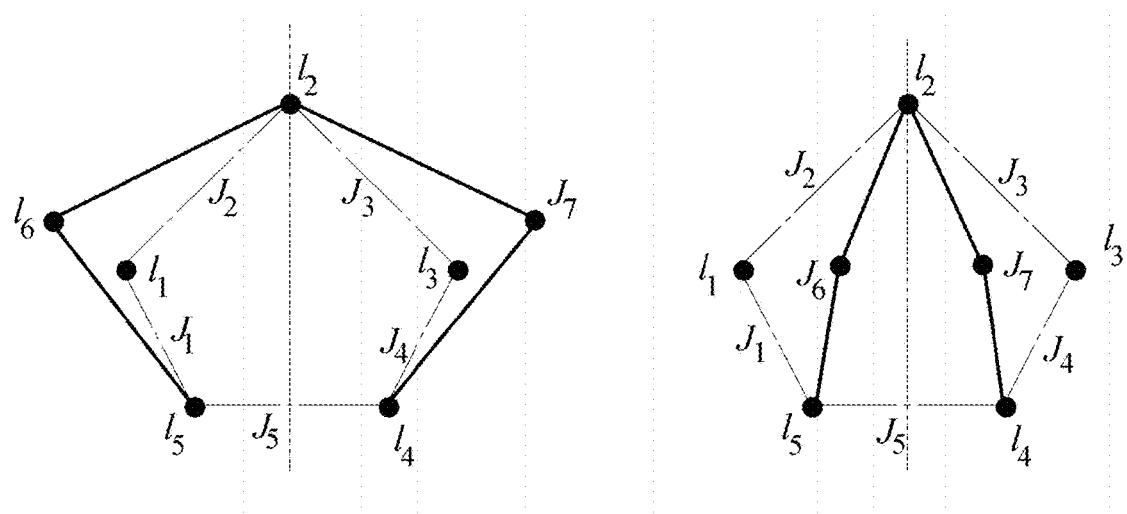
FIG. 22C depicts a step in converting a five-bar mechanism into a zero-mobility mechanism.
Figure 22D:
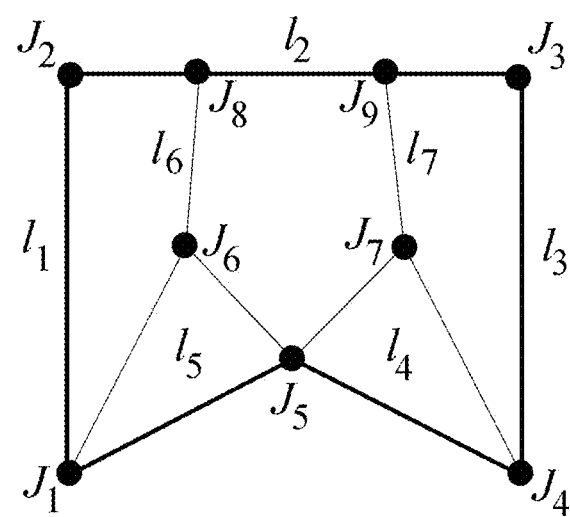
FIG. 22D depicts a step in converting a five-bar mechanism into a zero-mobility mechanism.

A mechanism with five links connected in loop satisfies the minimum of five outer nodes (or joints) but would have two DOF, as shown in FIG. 22A. Adding two links and four joints to the mechanism will reduce the mobility to zero, which in graph theory means two points and four lines respectively need to be added. Considering the symmetry in the design, those two points (or links) can be placed either inside the loop or outside, as shown in FIG. 22B. Similarly, for the four lines (or joints), two lines should be added in either side of the symmetry line and should avoid a three-line loop when connecting. Otherwise, it will result in three links connected in a loop turning it into a single fink. FIG. 22C shows the two possibilities of the mechanism which in fact are identical to one another, where FIG. 22D shows the final mechanism schematics in reference to its graph theory representation.

Figure 23:
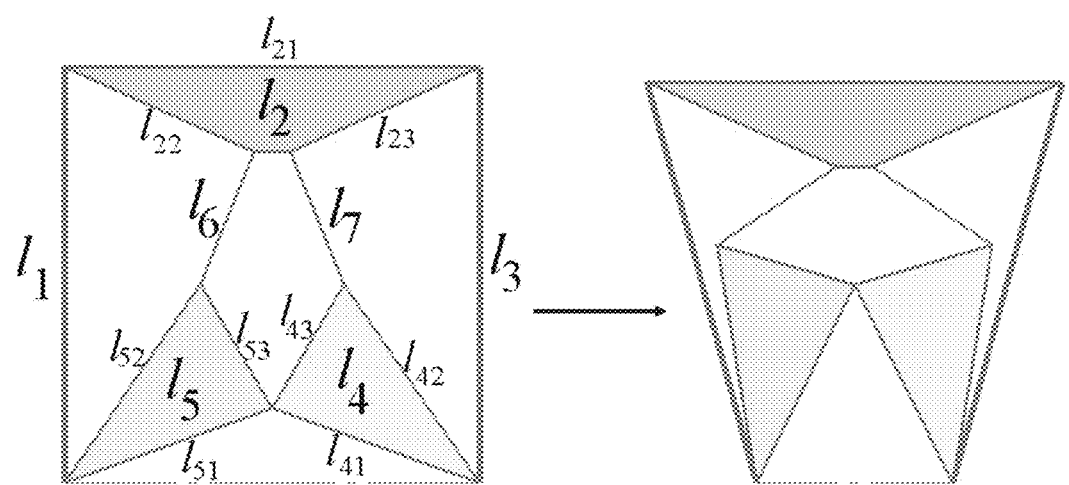
FIG. 23 depicts $P_{2S1}$ schematics with seven-bar mechanism and links' notation.

The new mechanism will have seven links and nine joints resulting in zero DOF, as shown in FIG. 23. To fully define the sketch in SOLIDWORKS, Table 4 illustrates the additional non-limiting constraints added to the lines in both $P_{2S1}$ and $P'_{2S1}$; the broken lines are not those of the mechanism but for constraint purposes.

Figure 24C:
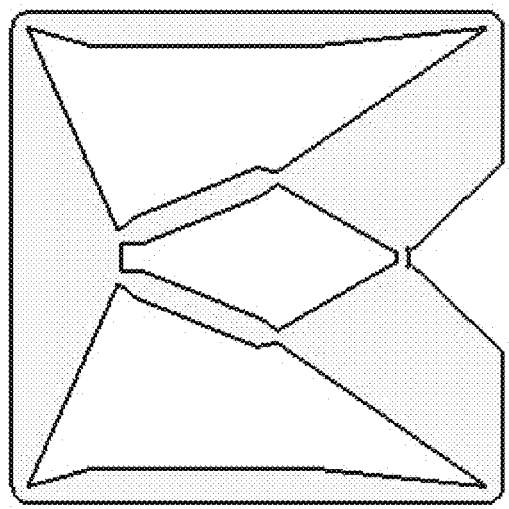
FIG. 24C depicts the $P_{2S1}$ mechanism as a fully compliant mechanism.
Figure 24B:
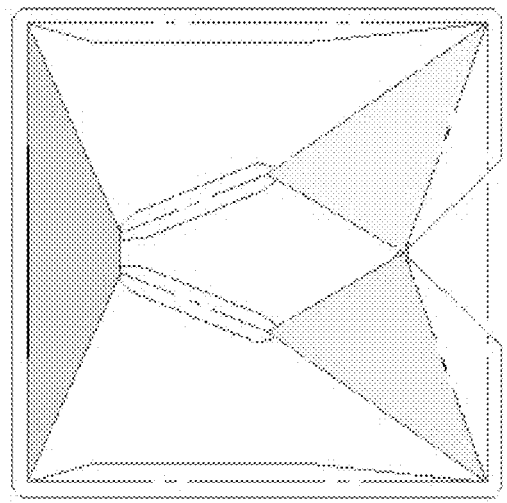
FIG. 24B depicts the $P_{2S1}$ mechanism in transition from an outline to a fully compliant mechanism.
Figure 24A:
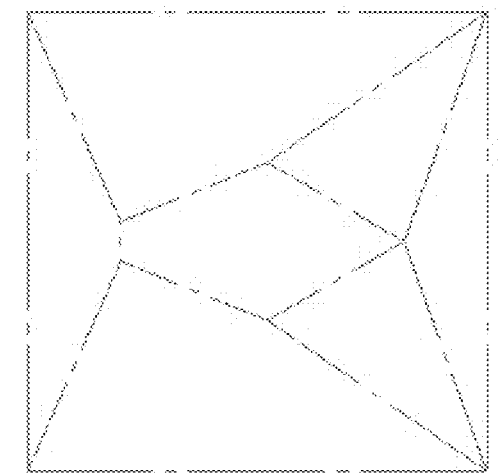
FIG. 24A depicts the $P_{2S1}$ mechanism as an outline.
Figure 61:
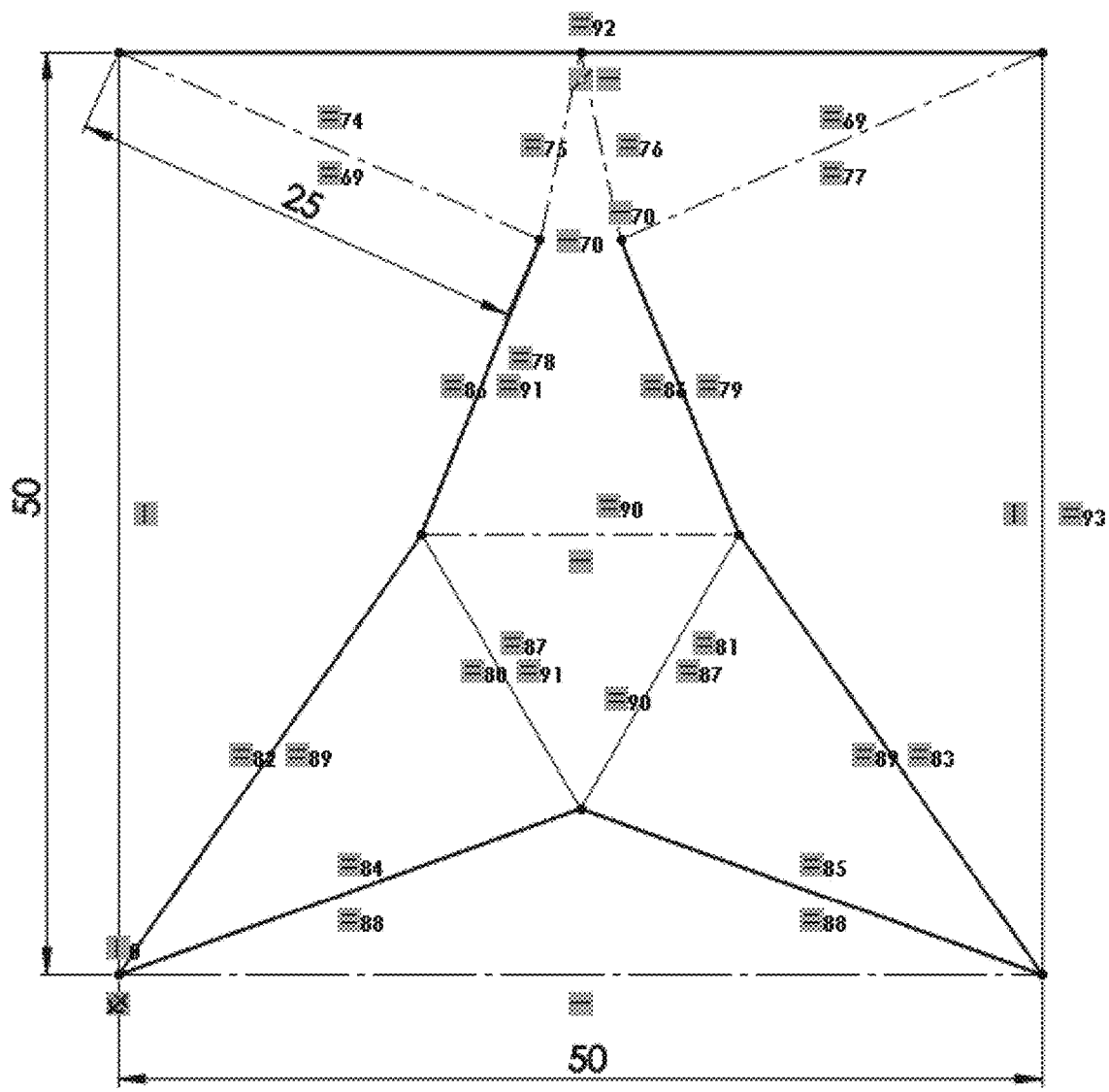
FIG. 61 depicts the initial state mechanism's constraints of $P_2$ SMSF.
Figure 62:
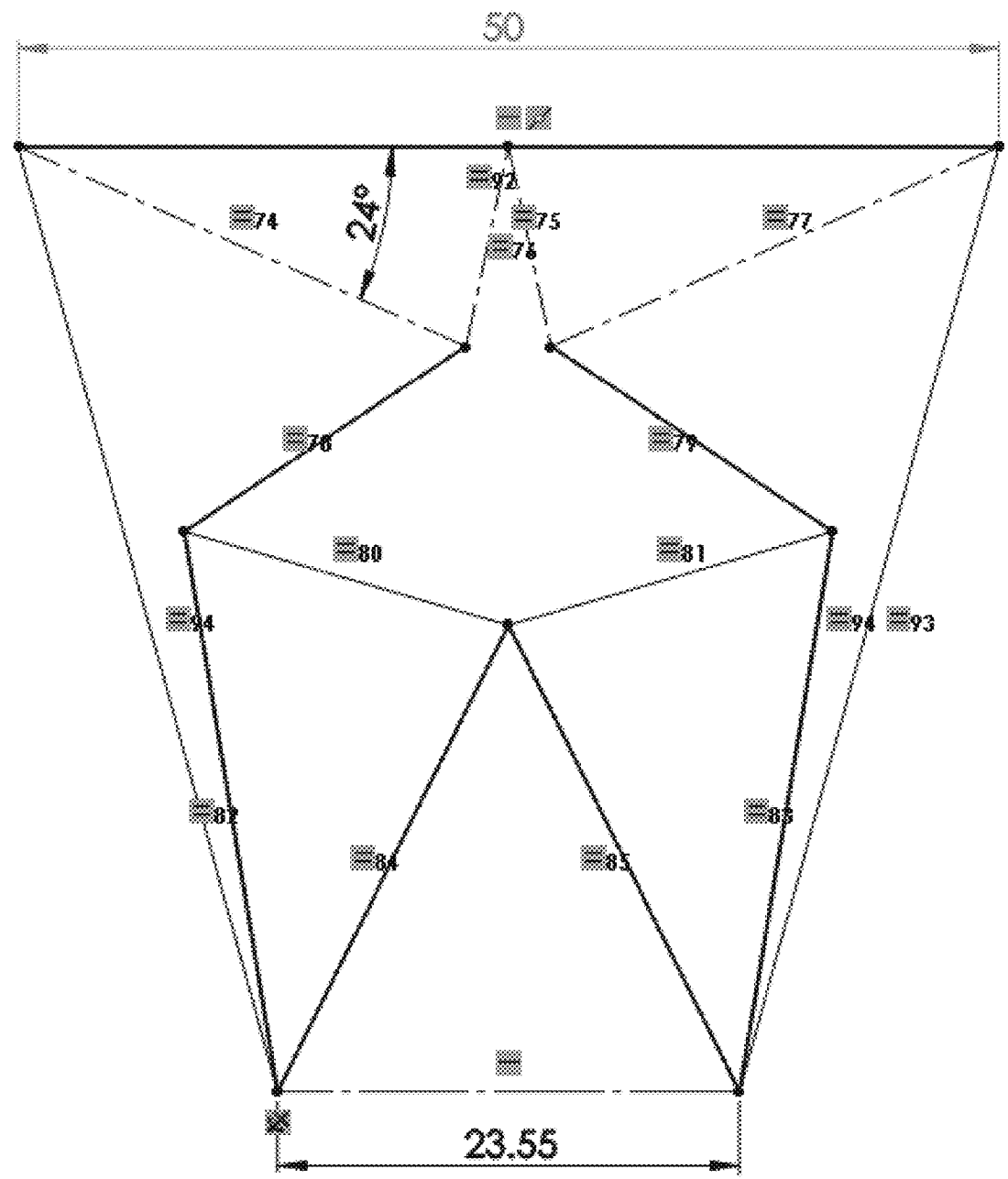
FIG. 62 depicts the final state mechanism's constraints of $P_2$ SMSF.
Figure 63:
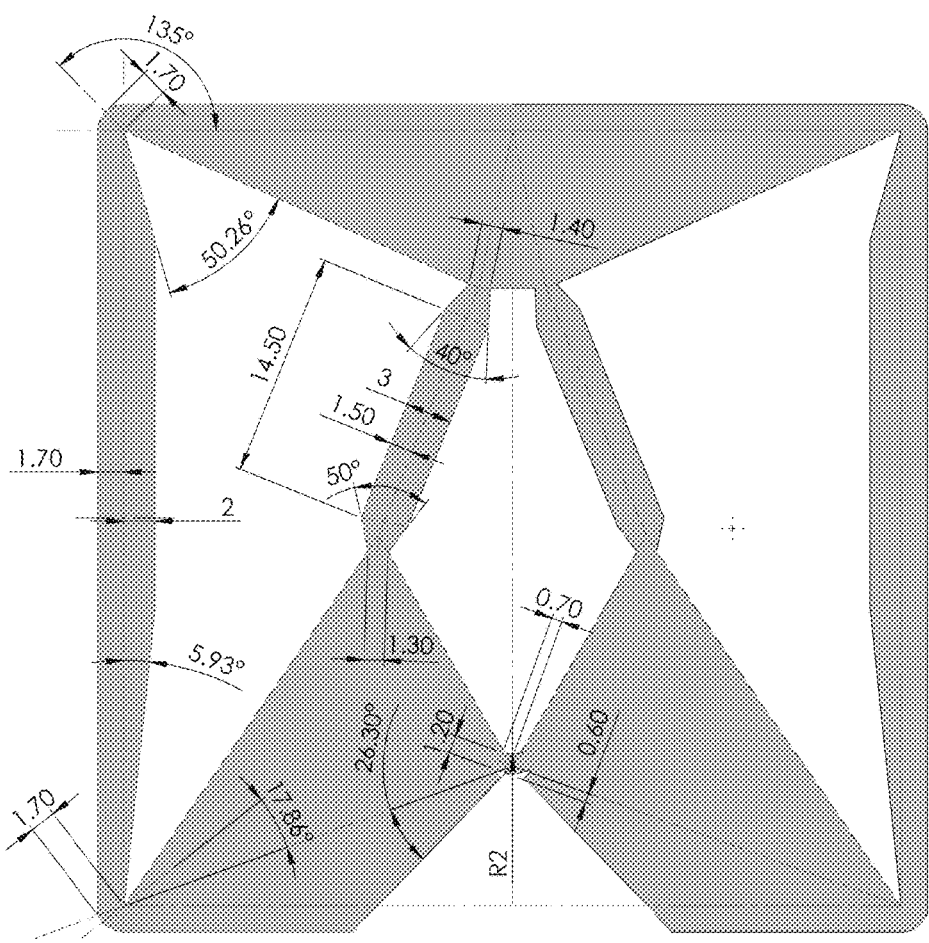
FIG. 63 depicts the $P_2$ SMSF mechanism's design dimensions.

The final stage of the design involves converting the mechanism's linkages to compliant segments. FIGS. 24A-24C show the development of the design from the outline of the mechanism in FIG. 24A to the complete design in a compliant form in FIG. 24C; the full dimension of this design can be seen in FIGS. 61-63.

TABLE 4

$P_{2S1}$ with non-limiting constraints of a seven-bar mechanism.

| Plane Location | Constraint Type | Between Entities | |
|---|---|---|---|
| $P_{1S1}$ | Equal | $l_{42}$ | $l_{52}$ |
| | Equal | $l_{41}$ | $l_{51}$ |
| | Equal | $l_6 l_7 l_{43} l_{53}$ | |
| | Equal | $l_{22}$ | $l_{23}$ |
| | Vertical | $l_1$ | |
| | Vertical | $l_3$ | |
| | Horizontal | $l_{21}$ | |
| | Angle = 24° | $l_{22}$ | $l_{21}$ |
| | Angle = 24° | $l_{23}$ | $l_{21}$ |
| | Angle = 43.96° | $l_6$ | $l_7$ |
| | Length = 25 mm | $l_{22}$ | $l_{23}$ |

IV. Design Apparatuses and Fabrication

Physically fabricating the shape-shifting space-frame apparatus was the next step after it was designed; the fabrication procedures involved are discussed herein. The process involves laser cutting the bistable unit cells from a sheet of material in two-dimensions and then constructing the three-dimensional SMSF. Any suitable material may be used to fabricate the apparatus, though it should be noted that in certain embodiments, material selection can be important for this type of design, as the compliant mechanism is based on replacing mechanical joints with living hinges that should be able to endure material deformation and fatigue during actuation. Therefore, in this embodiment, polypropylene copolymer was chosen due to its high flexural modulus of 145,000 psi and its ability to withstand up to 10% of elongation before break. However, in other embodiments and based on different designs, different types of material can be used to fabricate and construct the design.

The unit cells were modeled in SOLIDWORKS, saved in DXF format or other format suitable for laser cutting or 3D printing or other fabrication method, and imported to the laser machine for cutting. For illustration purposes, each of the mechanisms forming the planes $P_1$, $P_2$ and $P_3$, as shown in FIG. 9, are introduced separately with the actual bistable unit cell.

Figure 25A:
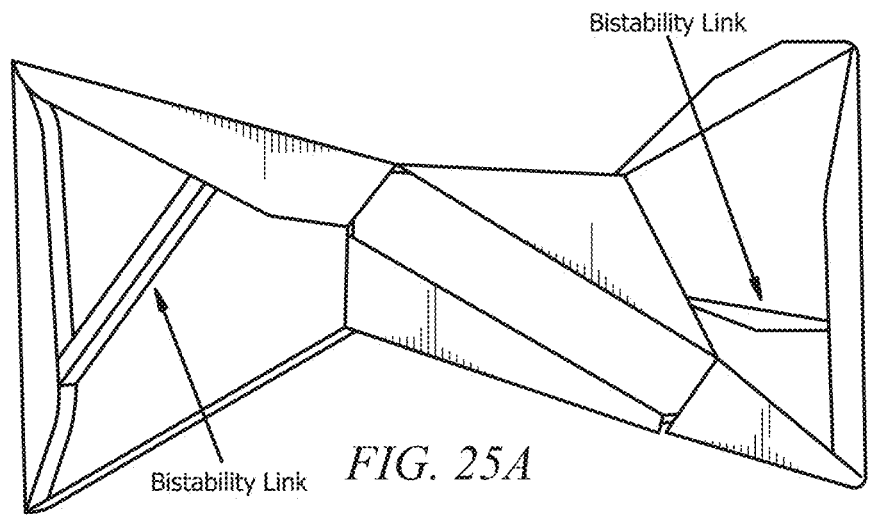
FIG. 25A depicts the $P_1$ mechanism in its first stable position.
Figure 25B:
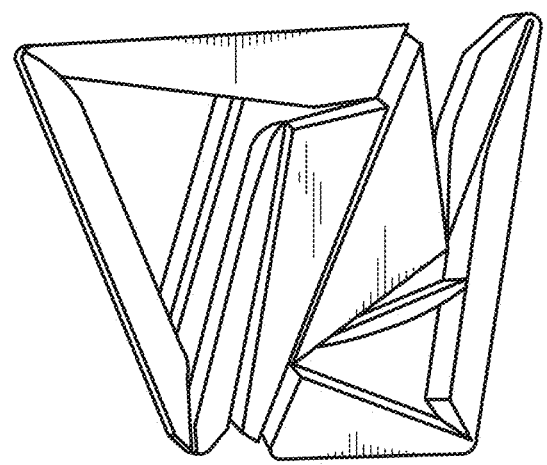
FIG. 25B depicts the $P_1$ mechanism in its second stable position.

FIG. 10A and FIG. 18C reference the mechanism required to morph the unit cell within $P_1$ from a rectangular to a trapezoidal cell element; FIGS. 25A-25B shows the actual $P_1$ component in its two states. There are two additional links added to the actual component to provide the bistability feature; the placement of those two links will be discussed as this specification continues.

Figure 26A:
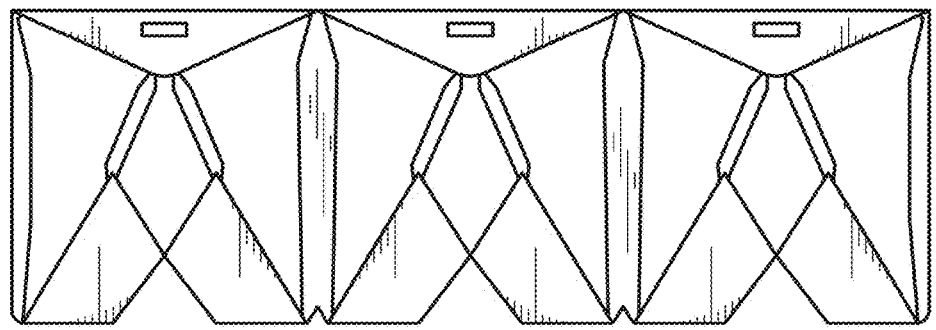
FIG. 26A depicts the $P_2$ mechanism in its first stable position.
Figure 26B:
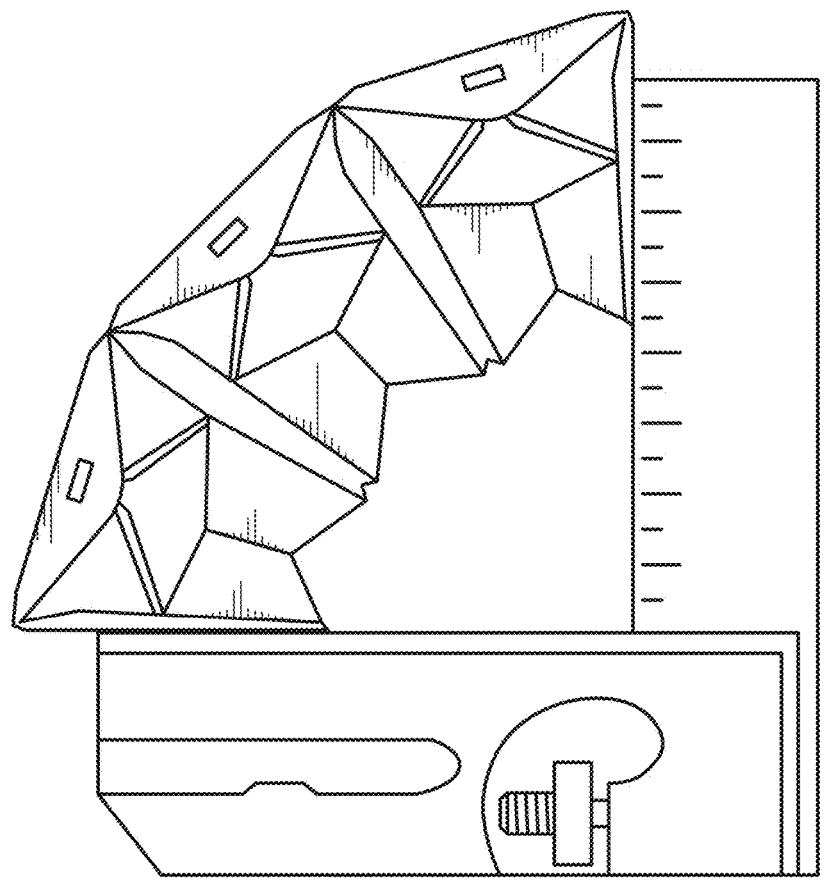
FIG. 26B depicts the $P_2$ mechanism in its second stable position.

For the plane $P_2$, in reference to FIG. 10B and FIG. 24C, the analysis of $P_{2S1}$ section is patterned into the other two sections $P_{2S2}$ and $P_{2S3}$ as shown in FIGS. 26A-26B. The apparatus demonstrates the mechanism's ability to morph the unit cell from a rectangular to an arched rectangular cell element with a substantially 90° angle or other angle dependent on the design choices previously selected. The mechanism design for $P_2$ is duplicated for the third surface $P_3$.

Figure 27A:
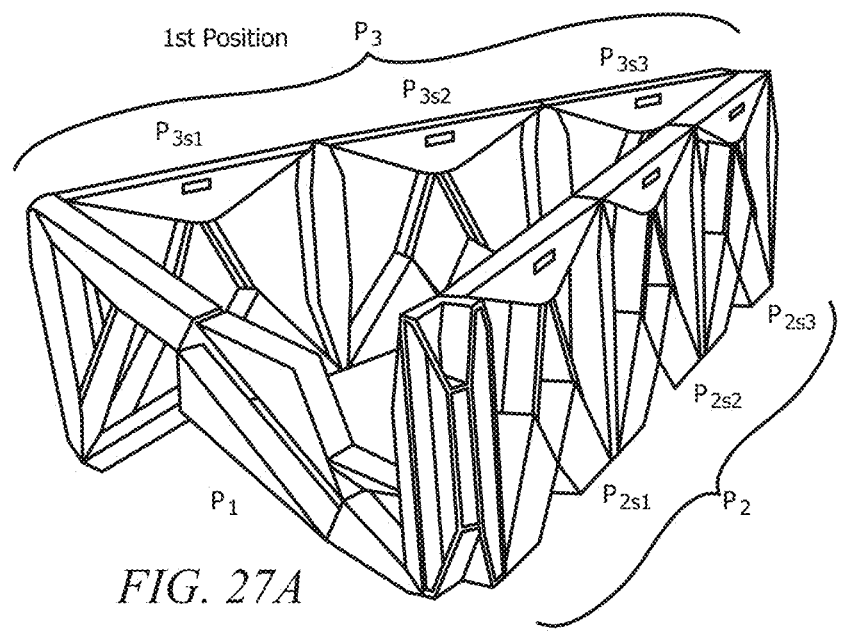
FIG. 27A depicts the sector's mechanism in initial state.
Figure 27B:
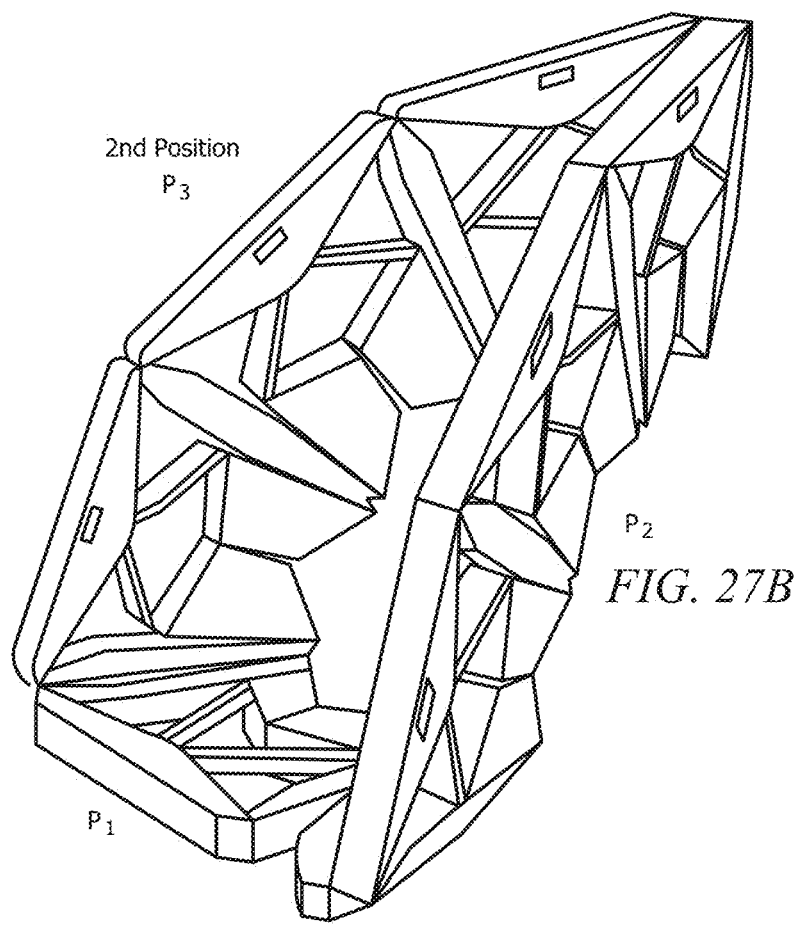
FIG. 27B depicts the sector's mechanism in final state.

The next step is constructing the sector shown in FIG. 9. It should be noted that because the disk tessellation requires ten identical sectors, the number of connections between sectors can be minimized. For this reason, each sector is flattened where the mechanism of $P_1$ is in the middle and the other two mechanisms of $P_2$ and $P_3$ are on either side. Joining the two ends of the final mechanism forms the sector shown in FIGS. 27A-27B, which also shows the isometric view of the final mechanism in its initial state as a sector to its final morphed state as a wedge with a substantially 90° arc. The designs of the bistable elements within the mechanisms will become clearer as this specification continues.

It becomes clear that if the sectors were to be arranged in a circular pattern, they would form a disk and the wedges would form a spherical shape. Two apparatuses were fabricated with two different sectors' arrangement; each arrangement will be discussed as this specification continues.

A. One Disk to Hemisphere SMSF

Figure 29:
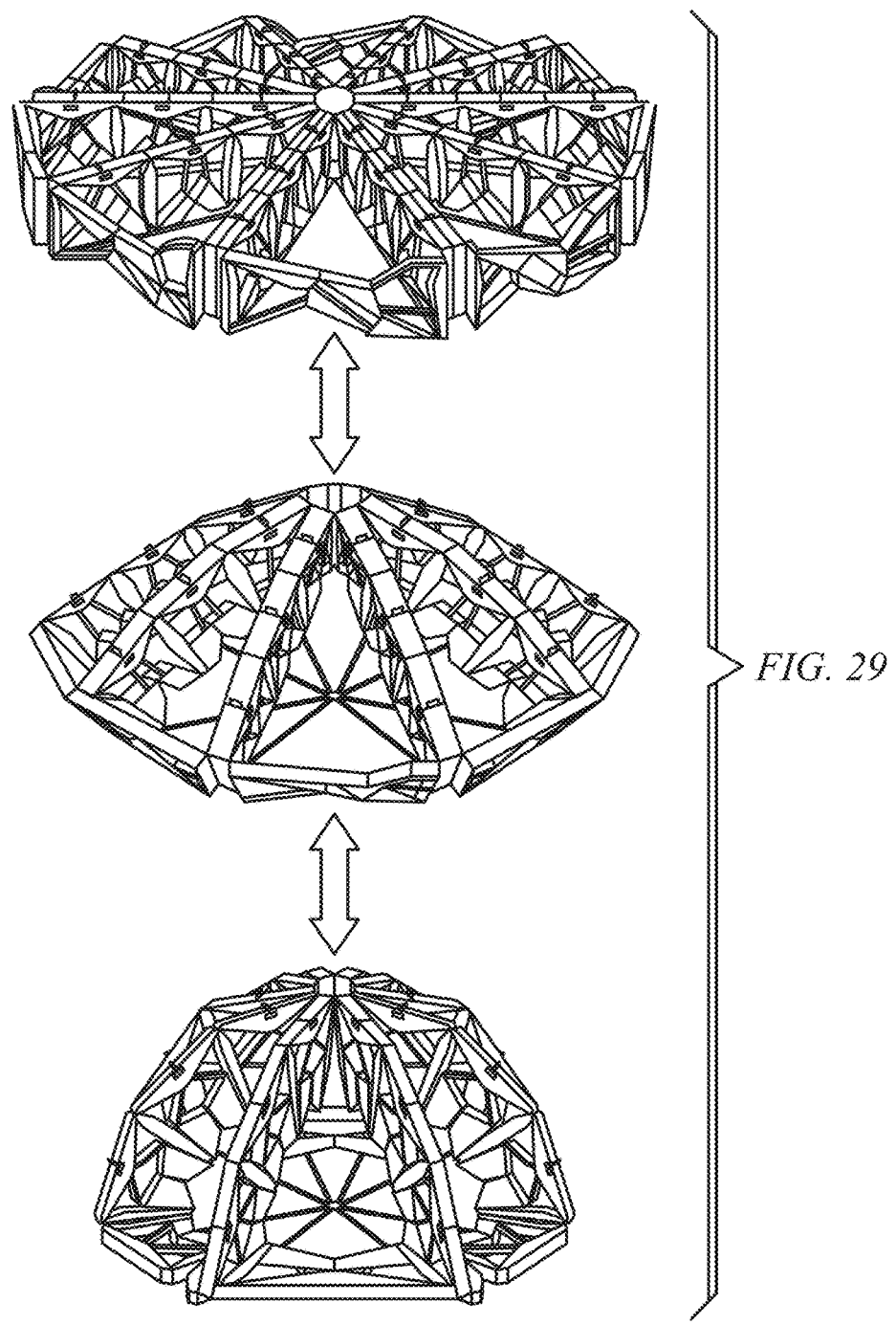
FIG. 29 depicts a one-disk SMSF apparatus actuation.

The sectors' arrangement in this apparatus involves connecting all ten together in a circular pattern as one single layer to form a disk that can morph to a hemisphere. The connections between sectors are done using zip ties through three circular cuts made at the top of each sector, though this rudimentary connection was done for illustrative purposes only. The sectors can be coupled together in any suitable manner. FIG. 29 shows the assembled apparatus as it morphs from its initial disk state to its final hemisphere shape, and vice versa, including the transition between the initial and final states. It should be noted that the middle transition figure in FIG. 29 can also be a stable position. This can be accomplished by actuating less than all of the $P_2$ and $P_3$ mechanisms. Now referring to FIGS. 26A-26B, if there are three (3) $P_2/P_3$ mechanisms present, for example, an additional stable position can be accomplished by actuating only one or two of the mechanisms, rather than all three (i.e., less than all). As such, it is contemplated herein that one stable position can be a curved state and another stable position can be another curved state, where one curved state can have greater or less curvature than the other curved state. For example, the bottom figure of FIG. 29 has a greater curvature of the $P_2/P_3$ mechanisms than the middle figure of FIG. 29. It is also contemplated herein that the current invention can have more than just two (2) stable positions. The apparatus can be stable in all three figures in FIG. 29, along with other levels of curvature between those positions (i.e., different numbers of $P_2/P_3$ mechanisms can be actuated to reach a desired level of curvature).

Figure 28A:
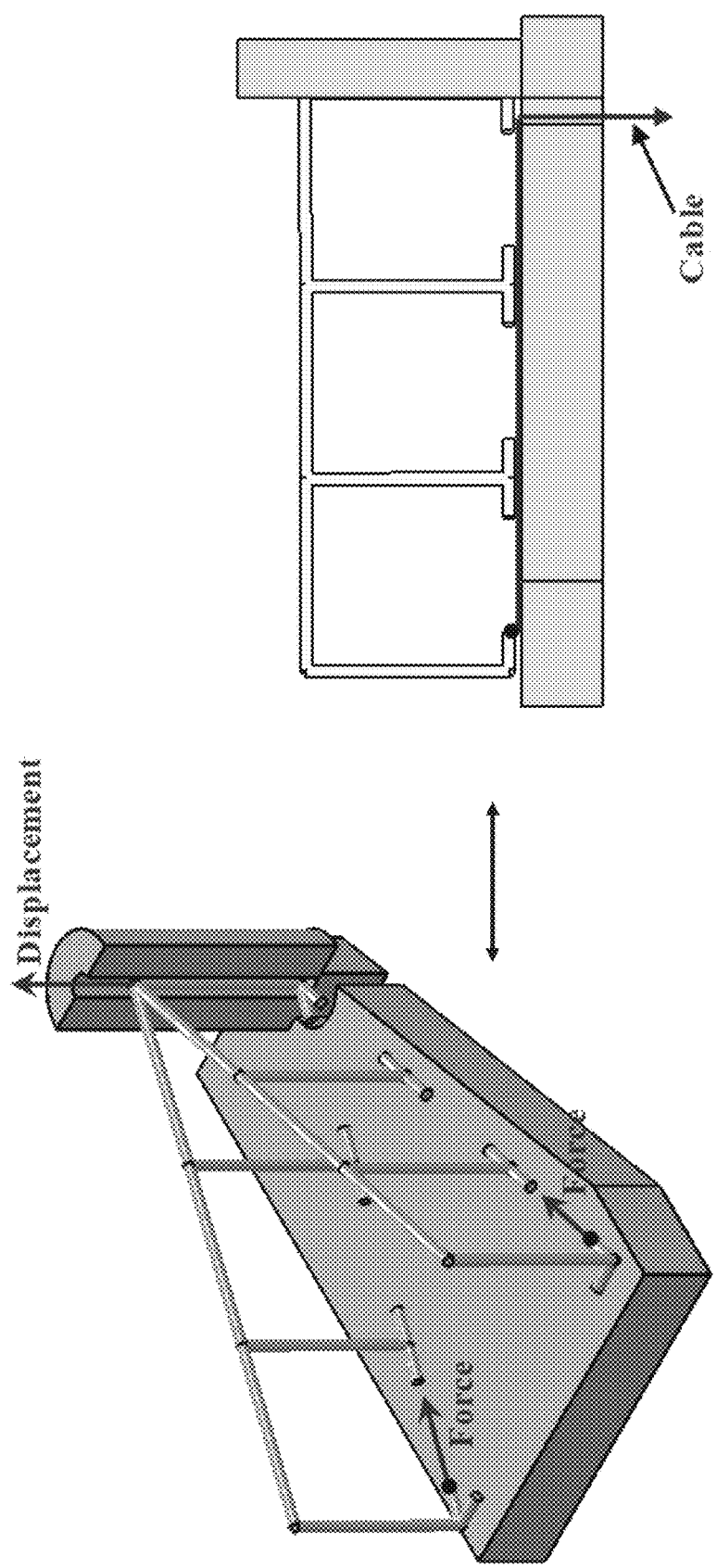
FIG. 28A depicts actuation of the sector's wireframe from the initial position.
Figure 28B:
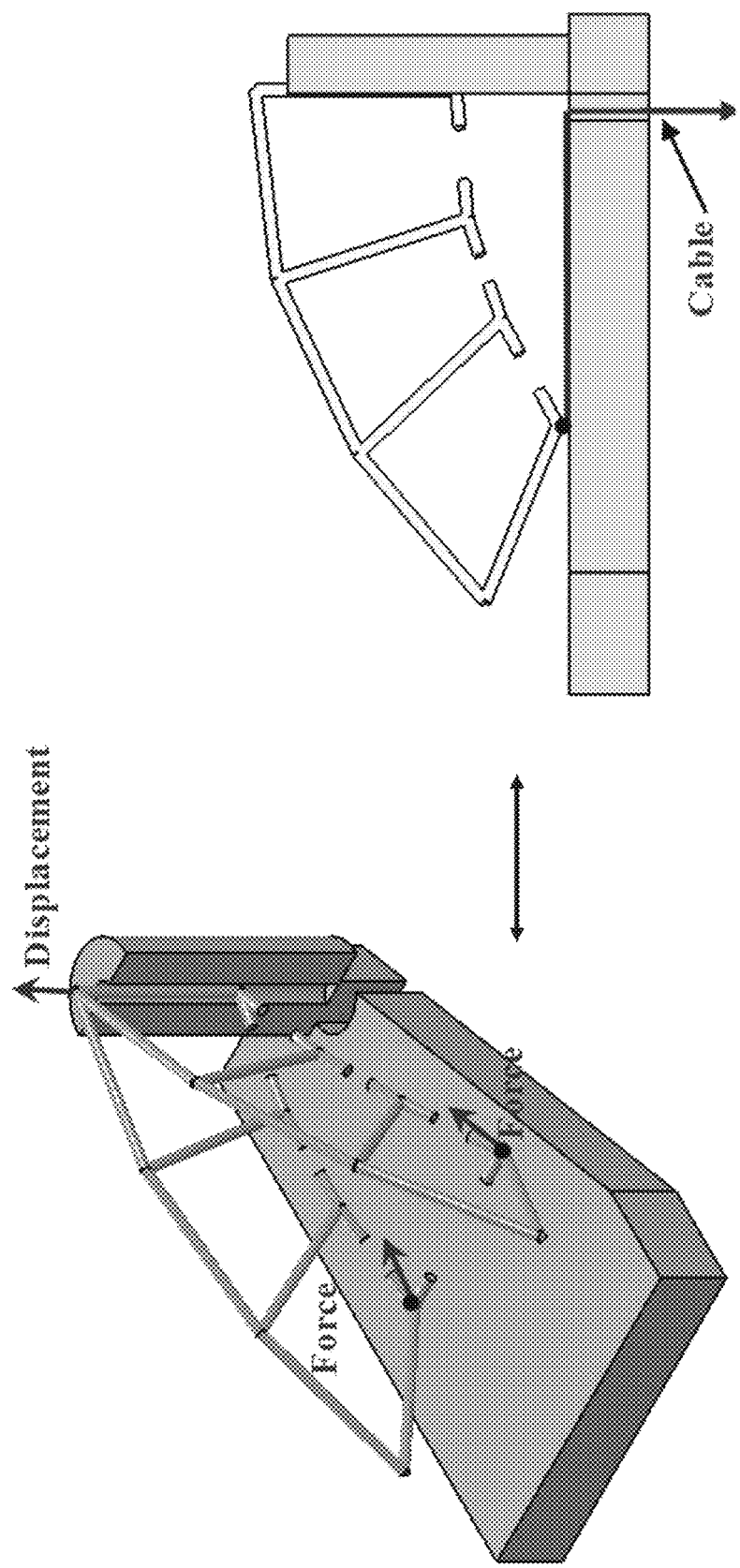
FIG. 28B depicts actuation of the sector's wireframe from during transition from the first position to the second position.
Figure 28C:
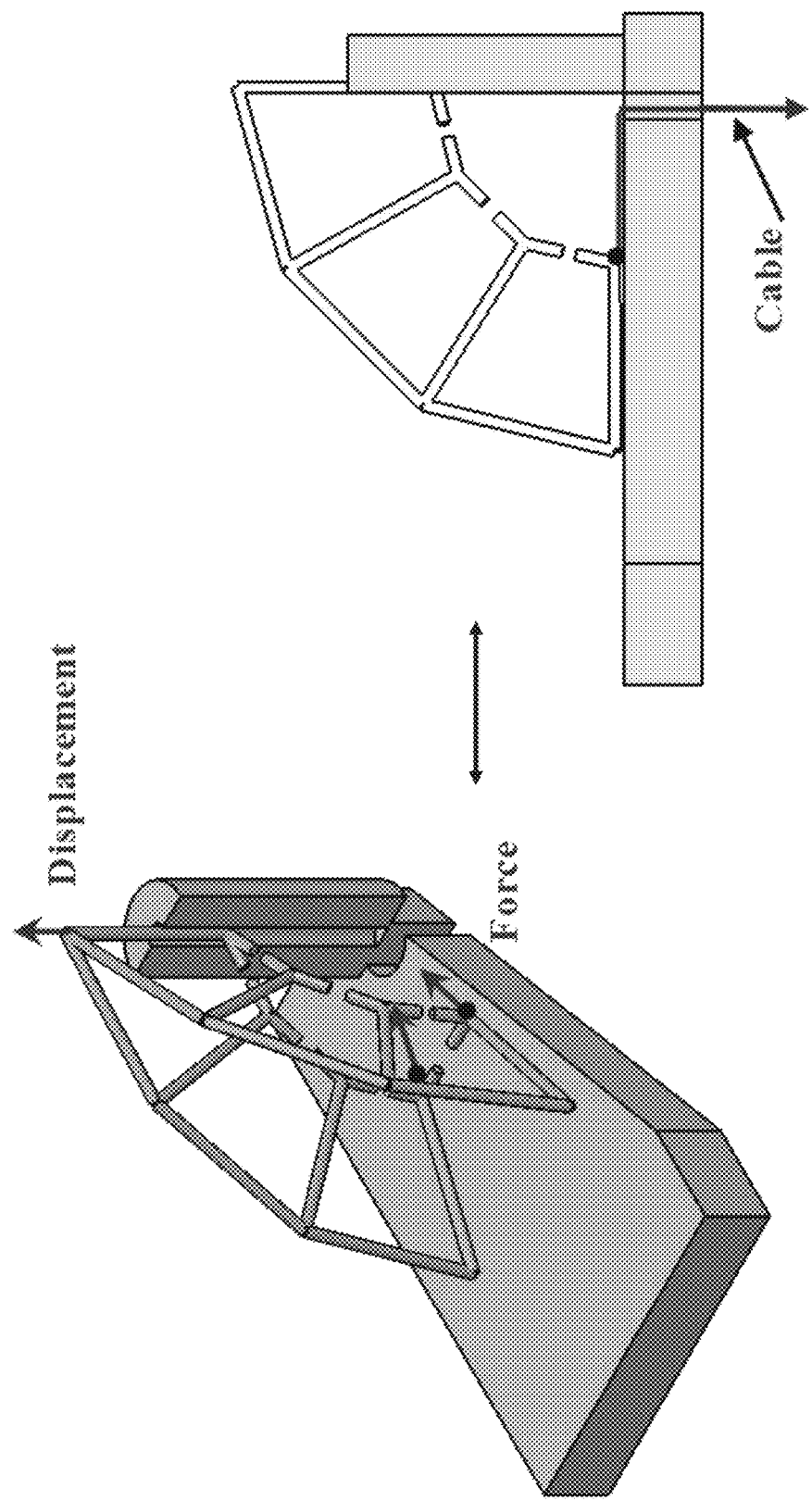
FIG. 28C depicts actuation of the sector's wireframe in a second position.

The actuation of this apparatus can be done manually, automatically, or machine-controllably by applying an inward radial force to the sector from nodes $n_1$ and $n_2$, as shown in FIG. 9, via a connected cable that runs to the center of the mechanism. Illustrations of a simplified sector frame can be seen in FIGS. 28A-28C, illustrating the directions of force and displacement involved. The horizontal support is provided by the surface on which the apparatus is laying, and the vertical support with groove represents the other nine sectors that are a connected circular pattern. The center point of the disk translates vertically due to the symmetry in both design and applied forces around the disk's vertical axis. The ten cables connected from the disk's bottom vertices are joined at the center and pass through an opening in the surface; applying a tension downward translates to an inward radial force at the bottom vertices which can slide along the surface. The foregoing is an example used to actuate the current apparatus during testing. It can be understood that actuation of this mechanism can take place using any known methodology.

Regardless of actuation methodology used, as noted, FIG. 29 depicts the apparatus' actuation, at different time frames, showing the disk SMSF morph into a hemisphere.

B. Two Disks to Sphere SMSF

Figure 30B:
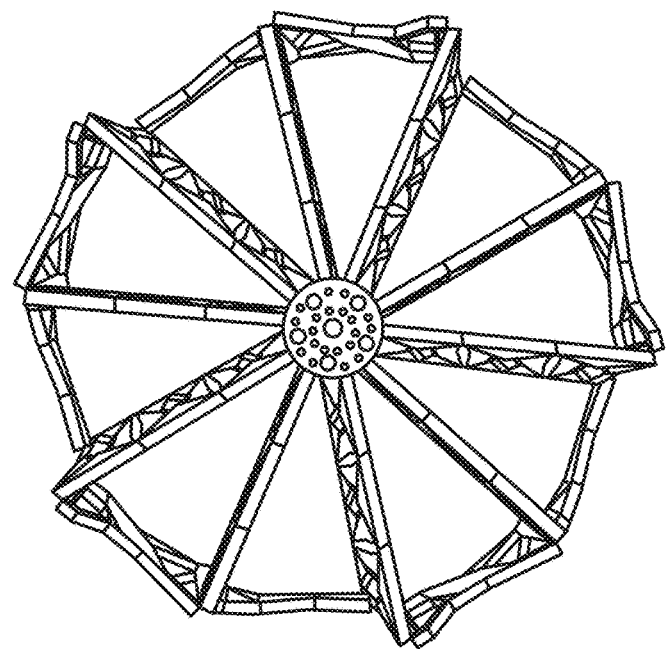
FIG. 30B is a top view of a two-disk SMSF initial state.
Figure 30A:
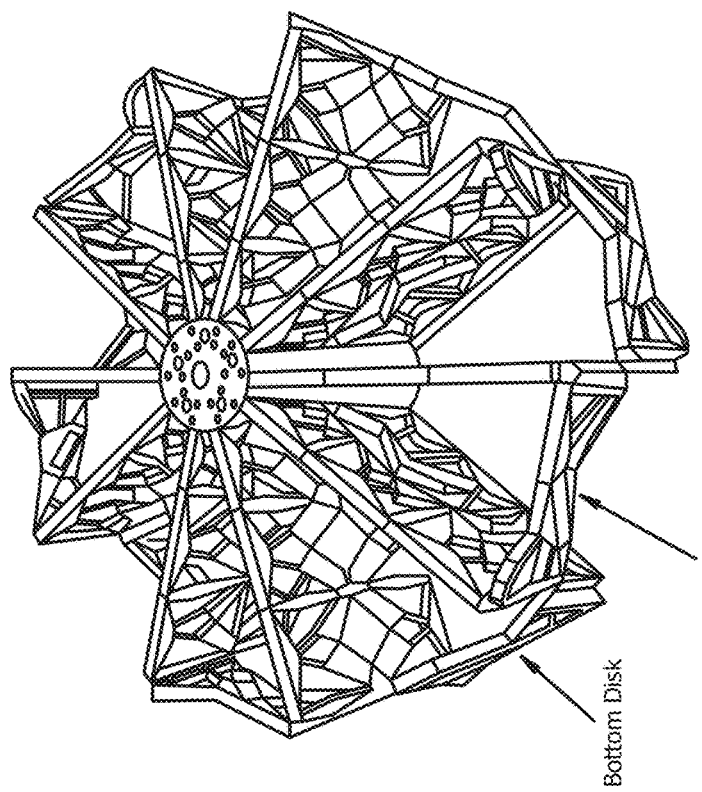
FIG. 30A is an isometric view of a two-disk SMSF initial state.
Figure 31B:
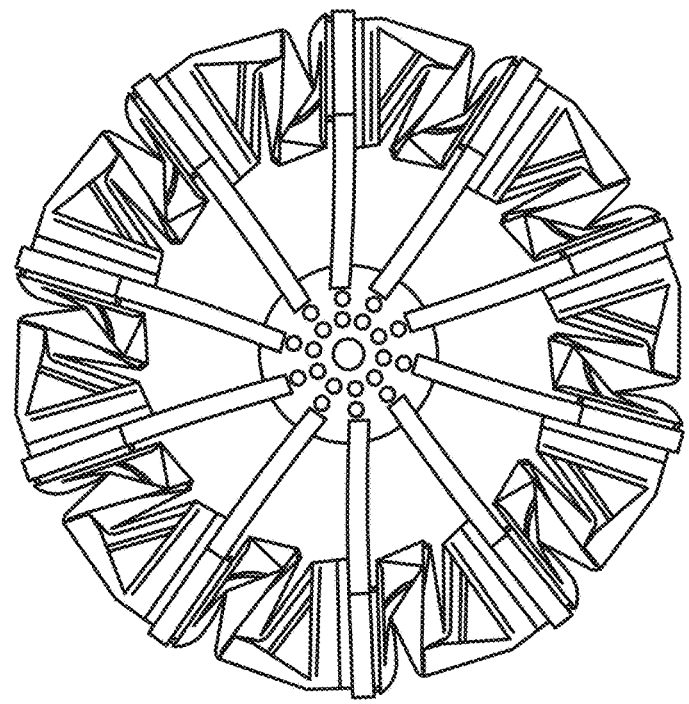
FIG. 31B is a top view of a two-disk SMSF final state.
Figure 31A:
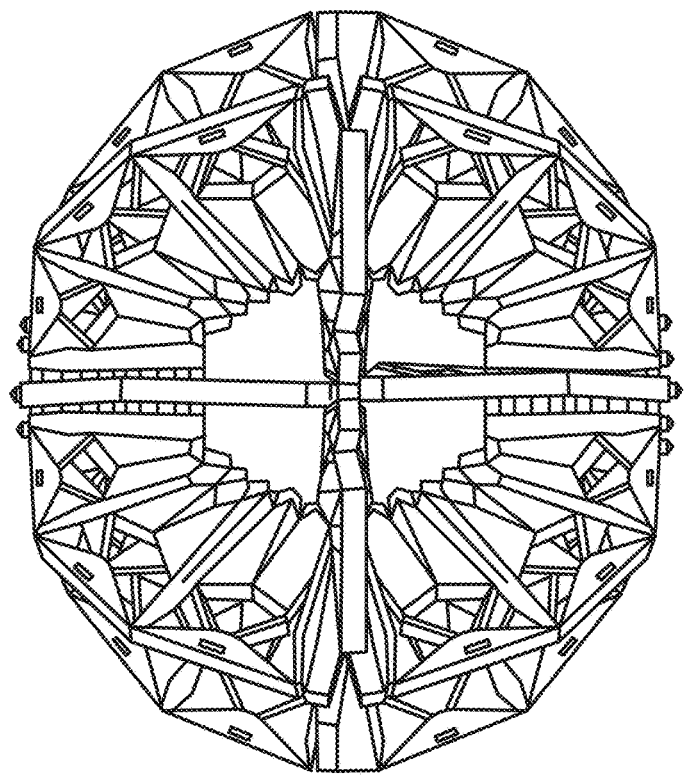
FIG. 31A is an isometric view of a two-disk SMSF final state.

Another possible arrangement of the current apparatus involves constructing a set of two disks, where each disk is composed of five sectors arranged in a circular pattern with equal spacing. Both disks are placed on top of each other as two layers with one sector rotational offset. Therefore, for each disk with five sectors equally spaced, a gap forms between every two sectors and by placing another five-sector disk in such a way that should cover the gaps in the first disk, as shown in the isometric and top views of FIGS. 30A-30B. This arrangement gives the apparatus the possibility to morph the structure from a two-layer disk configuration to a sphere configuration, as shown in FIGS. 31A-31B. The actuation for this apparatus will become clearer as this specification continues.

V. Spherical SMSF: Force-Displacement Analysis

Figure 32A:
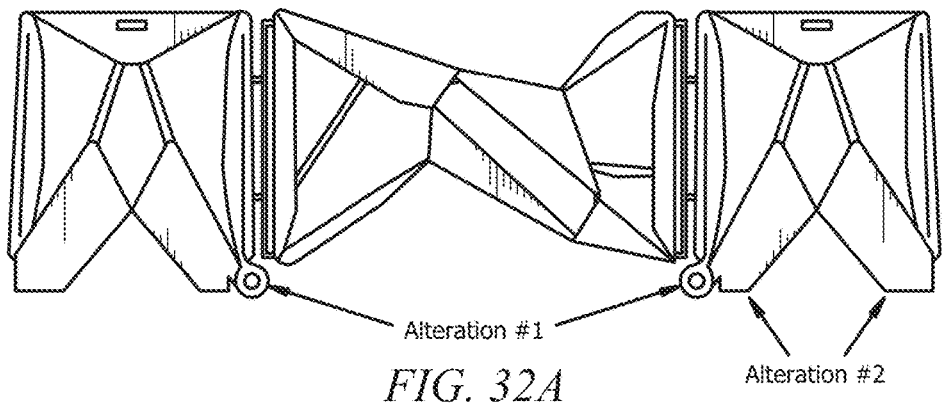
FIG. 32A is a top view of a modified sector's mechanism.
Figure 32B:
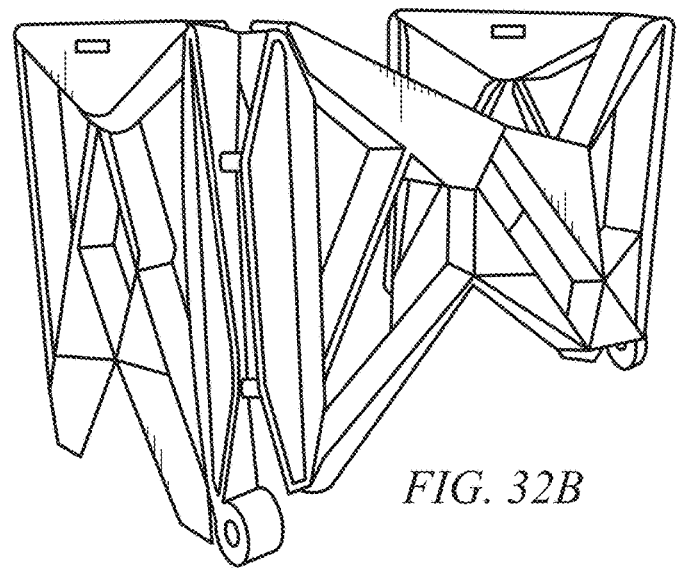
FIG. 32B is an isometric view of a modified sector's mechanism.

Actuating the spherical SMSF is similar to the hemisphere's actuation but in this case, two hemispheres are connected together symmetrically across the plane. The two disks are connected together using the sectors' vertices located mid-plane; to do that, two alterations were done on the original sector's mechanism without affecting the mechanism's dynamics. The first alteration, shown in FIGS. 32A-32B, was adding small material extension at the vertices with a circular cutout inside it to act as a hinge between the two disks and a connection point for the cables. The second alteration is extending the adjacent mechanisms' bottom section as a support and protection for the hinges.

The disks can be connected together utilizing the first alteration as hinges when the cables (if this actuation mechanism is used) are secured and passed through the center using an aluminum disk as a ground support. The cables from each vertex are passed in an alternating manner from above and below the support through an opening within it. As a result, five cables can be pulled upward that actuate half of the sectors, and the other five cables are pulled downward to actuate the remaining sectors. Again, the foregoing is an example used to actuate the current apparatus during testing. It can be understood that actuation can be performed using any known methodology.

Assembling the spherical SMSF in this manner allows the use of a tensile machine to provide tension at both ends of the cables for the apparatus' actuation. The experimental setups involved securing the SMSF's cables from both ends to the tensile machine and apply the vertical displacement.

Figure 33:
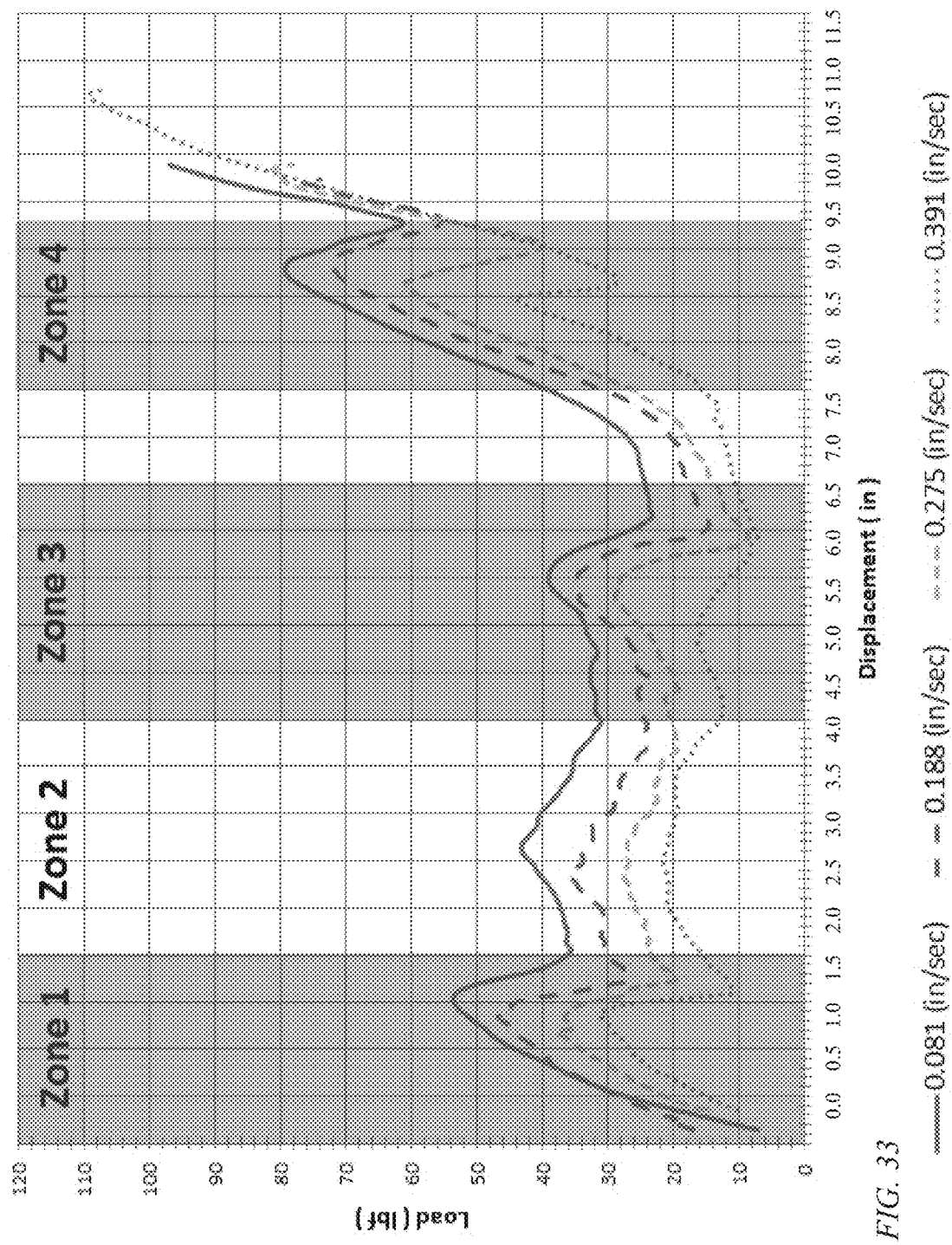
FIG. 33 depicts force-displacement curves and zone identification.

In the experiment, the actuation was carried out at four different rates of applied displacement to observe the force behavior at each rate. Experimental data and results can be different depending on the experimental setup and machine used; behavior can be force-controlled or displacement controlled. In this particular case, FIG. 33 shows the force-displacement results at each rate combined into one plot for compression; the actual experimental data is tabulated and can be found in Tables 5-8.

TABLE 5

Test data for the displacement load rate 0.081 in/sec.
0.081 (in/sec)

| FORCE LBS | DISP IN |
|---|---|
| 7.27 | 0.14 |
| 14.93 | 0.27 |
| 21.10 | 0.38 |
| 26.67 | 0.48 |
| 30.98 | 0.58 |
| 34.88 | 0.69 |
| 37.93 | 0.79 |
| 41.12 | 0.89 |
| 44.49 | 1.00 |
| 47.14 | 1.10 |
| 48.90 | 1.21 |
| 50.94 | 1.31 |
| 52.82 | 1.41 |
| 53.80 | 1.52 |
| 52.80 | 1.62 |
| 48.27 | 1.72 |
| 41.63 | 1.83 |
| 37.86 | 1.93 |
| 35.79 | 2.04 |
| 36.50 | 2.12 |
| 36.31 | 2.24 |
| 36.82 | 2.34 |
| 37.12 | 2.44 |
| 37.70 | 2.55 |
| 38.38 | 2.65 |
| 39.40 | 2.75 |
| 40.71 | 2.85 |
| 41.54 | 2.95 |
| 43.03 | 3.06 |
| 43.30 | 3.16 |
| 42.24 | 3.26 |
| 41.00 | 3.36 |
| 40.77 | 3.47 |
| 39.49 | 3.57 |
| 38.18 | 3.67 |
| 37.19 | 3.77 |
| 36.08 | 3.87 |
| 35.50 | 3.98 |
| 35.37 | 4.08 |
| 34.38 | 4.18 |
| 33.07 | 4.28 |
| 31.92 | 4.38 |
| 31.16 | 4.49 |
| 32.08 | 4.59 |
| 31.92 | 4.69 |
| 32.05 | 4.79 |
| 32.82 | 4.89 |
| 32.80 | 4.99 |
| 32.57 | 5.10 |
| 31.64 | 5.20 |
| 32.35 | 5.30 |
| 33.34 | 5.40 |
| 33.68 | 5.50 |
| 34.48 | 5.60 |
| 34.07 | 5.60 |
| 35.97 | 5.71 |
| 37.57 | 5.81 |
| 38.94 | 5.91 |
| 39.18 | 6.01 |

TABLE 5-continued

Test data for the displacement load rate 0.081 in/sec. 0.081 (in/sec)

| FORCE LBS | DISP IN |
|---|---|
| 38.67 | 6.12 |
| 37.04 | 6.22 |
| 33.99 | 6.32 |
| 29.47 | 6.42 |
| 25.95 | 6.53 |
| 23.43 | 6.64 |
| 23.83 | 6.73 |
| 23.79 | 6.83 |
| 24.28 | 6.94 |
| 24.59 | 7.04 |
| 24.99 | 7.14 |
| 25.41 | 7.24 |
| 25.57 | 7.34 |
| 26.56 | 7.45 |
| 27.76 | 7.55 |
| 29.84 | 7.65 |
| 32.15 | 7.75 |
| 35.02 | 7.85 |
| 38.03 | 7.95 |
| 41.28 | 8.06 |
| 44.65 | 8.16 |
| 48.94 | 8.26 |
| 52.92 | 8.36 |
| 56.20 | 8.46 |
| 60.00 | 8.57 |
| 63.55 | 8.67 |
| 66.74 | 8.77 |
| 69.83 | 8.87 |
| 73.29 | 8.97 |
| 76.19 | 9.07 |
| 78.59 | 9.18 |
| 79.46 | 9.28 |
| 78.41 | 9.38 |
| 73.86 | 9.48 |
| 70.48 | 9.58 |
| 64.25 | 9.68 |
| 61.43 | 9.78 |
| 66.69 | 9.89 |
| 72.59 | 9.99 |
| 81.15 | 10.09 |
| 87.49 | 10.19 |
| 92.65 | 10.29 |
| 97.06 | 10.38 |

TABLE 6

Test data for the displacement load rate 0.188 in/sec. 0.188 (in/sec)

| FORCE LBS | DISP IN |
|---|---|
| 17.11 | 0.14 |
| 17.74 | 0.16 |
| 18.36 | 0.17 |
| 18.97 | 0.18 |
| 19.57 | 0.20 |
| 20.14 | 0.21 |
| 20.69 | 0.23 |
| 21.22 | 0.24 |
| 19.77 | 0.25 |
| 20.22 | 0.27 |
| 21.01 | 0.28 |
| 21.70 | 0.29 |
| 22.30 | 0.31 |
| 22.87 | 0.32 |
| 23.32 | 0.34 |
| 23.78 | 0.35 |
| 24.22 | 0.37 |
| 24.74 | 0.38 |
| 25.29 | 0.39 |
| 25.84 | 0.41 |
| 26.30 | 0.42 |

TABLE 6-continued

Test data for the displacement load rate 0.188 in/sec. 0.188 (in/sec)

| FORCE LBS | DISP IN |
|---|---|
| 26.66 | 0.43 |
| 27.21 | 0.45 |
| 27.64 | 0.46 |
| 27.82 | 0.48 |
| 28.03 | 0.49 |
| 28.57 | 0.50 |
| 29.11 | 0.51 |
| 29.49 | 0.53 |
| 29.80 | 0.54 |
| 30.48 | 0.56 |
| 31.02 | 0.57 |
| 31.51 | 0.58 |
| 31.57 | 0.59 |
| 32.09 | 0.61 |
| 32.69 | 0.63 |
| 33.11 | 0.64 |
| 33.25 | 0.66 |
| 33.72 | 0.67 |
| 34.23 | 0.68 |
| 34.54 | 0.70 |
| 34.85 | 0.71 |
| 35.51 | 0.72 |
| 36.09 | 0.74 |
| 36.49 | 0.75 |
| 36.59 | 0.77 |
| 37.27 | 0.78 |
| 37.94 | 0.79 |
| 38.46 | 0.80 |
| 38.44 | 0.82 |
| 38.70 | 0.83 |
| 39.01 | 0.84 |
| 38.91 | 0.86 |
| 38.99 | 0.87 |
| 39.06 | 0.88 |
| 39.29 | 0.90 |
| 39.61 | 0.91 |
| 39.87 | 0.93 |
| 40.18 | 0.94 |
| 40.39 | 0.95 |
| 40.41 | 0.97 |
| 40.62 | 0.98 |
| 40.73 | 0.99 |
| 40.82 | 1.00 |
| 41.09 | 1.02 |
| 41.30 | 1.03 |
| 41.74 | 1.04 |
| 42.09 | 1.06 |
| 42.45 | 1.07 |
| 42.93 | 1.09 |
| 43.07 | 1.10 |
| 43.46 | 1.11 |
| 43.64 | 1.13 |
| 43.57 | 1.14 |
| 43.82 | 1.15 |
| 44.19 | 1.17 |
| 44.30 | 1.18 |
| 44.22 | 1.19 |
| 44.57 | 1.21 |
| 44.76 | 1.23 |
| 45.09 | 1.24 |
| 45.51 | 1.27 |
| 45.97 | 1.28 |
| 46.52 | 1.30 |
| 46.78 | 1.32 |
| 46.86 | 1.34 |
| 45.01 | 1.36 |
| 45.06 | 1.38 |
| 45.07 | 1.40 |
| 44.94 | 1.42 |
| 44.79 | 1.44 |
| 44.91 | 1.47 |
| 44.16 | 1.49 |
| 42.74 | 1.52 |
| 41.32 | 1.55 |
| 38.94 | 1.57 |

TABLE 6-continued

Test data for the displacement load rate 0.188 in/sec. 0.188 (in/sec)

| FORCE LBS | DISP IN |
|---|---|
| 36.74 | 1.59 |
| 34.27 | 1.62 |
| 32.95 | 1.64 |
| 31.15 | 1.67 |
| 28.64 | 1.70 |
| 27.16 | 1.72 |
| 26.91 | 1.73 |
| 26.97 | 1.76 |
| 26.86 | 1.79 |
| 27.17 | 1.82 |
| 27.66 | 1.85 |
| 28.19 | 1.88 |
| 28.70 | 1.90 |
| 29.35 | 1.93 |
| 29.94 | 1.96 |
| 30.09 | 2.00 |
| 29.93 | 2.02 |
| 30.36 | 2.05 |
| 30.82 | 2.09 |
| 30.53 | 2.12 |
| 30.66 | 2.15 |
| 31.08 | 2.18 |
| 31.11 | 2.22 |
| 31.04 | 2.25 |
| 31.03 | 2.29 |
| 30.70 | 2.32 |
| 30.61 | 2.35 |
| 30.49 | 2.39 |
| 30.82 | 2.42 |
| 30.91 | 2.46 |
| 31.09 | 2.49 |
| 31.53 | 2.52 |
| 32.52 | 2.56 |
| 33.07 | 2.60 |
| 33.32 | 2.63 |
| 33.98 | 2.67 |
| 34.65 | 2.70 |
| 34.81 | 2.74 |
| 35.07 | 2.77 |
| 35.62 | 2.81 |
| 35.91 | 2.84 |
| 36.28 | 2.88 |
| 35.59 | 2.91 |
| 34.47 | 2.94 |
| 33.99 | 2.98 |
| 33.96 | 3.02 |
| 34.16 | 3.05 |
| 33.86 | 3.09 |
| 33.07 | 3.12 |
| 32.76 | 3.16 |
| 32.76 | 3.19 |
| 32.37 | 3.23 |
| 32.51 | 3.27 |
| 32.45 | 3.30 |
| 32.47 | 3.33 |
| 32.53 | 3.37 |
| 31.72 | 3.40 |
| 30.84 | 3.44 |
| 30.53 | 3.48 |
| 29.66 | 3.51 |
| 29.26 | 3.54 |
| 29.20 | 3.58 |
| 29.06 | 3.62 |
| 28.86 | 3.65 |
| 28.24 | 3.68 |
| 28.32 | 3.72 |
| 27.96 | 3.75 |
| 28.32 | 3.78 |
| 28.28 | 3.82 |
| 28.05 | 3.86 |
| 27.81 | 3.89 |
| 27.47 | 3.93 |
| 27.21 | 3.96 |
| 26.78 | 4.00 |
| 26.35 | 4.04 |
| 25.74 | 4.07 |
| 25.47 | 4.10 |
| 25.09 | 4.14 |
| 24.45 | 4.17 |
| 24.25 | 4.21 |
| 24.15 | 4.25 |
| 24.47 | 4.28 |
| 24.74 | 4.32 |
| 24.60 | 4.36 |
| 24.32 | 4.39 |
| 24.09 | 4.43 |
| 24.25 | 4.46 |
| 24.66 | 4.50 |
| 24.74 | 4.54 |
| 25.06 | 4.57 |
| 25.07 | 4.61 |
| 25.45 | 4.65 |
| 25.51 | 4.69 |
| 25.26 | 4.72 |
| 25.61 | 4.76 |
| 25.48 | 4.79 |
| 25.42 | 4.83 |
| 23.74 | 4.87 |
| 23.53 | 4.90 |
| 23.86 | 4.94 |
| 24.54 | 4.98 |
| 25.31 | 5.01 |
| 25.66 | 5.05 |
| 25.48 | 5.09 |
| 25.61 | 5.13 |
| 25.49 | 5.16 |
| 25.16 | 5.19 |
| 25.90 | 5.23 |
| 26.39 | 5.27 |
| 26.79 | 5.30 |
| 26.99 | 5.34 |
| 27.77 | 5.38 |
| 28.66 | 5.42 |
| 28.74 | 5.45 |
| 29.55 | 5.49 |
| 30.43 | 5.52 |
| 30.73 | 5.56 |
| 31.61 | 5.60 |
| 31.90 | 5.63 |
| 32.51 | 5.67 |
| 33.45 | 5.71 |
| 34.34 | 5.74 |
| 34.61 | 5.77 |
| 34.51 | 5.81 |
| 34.66 | 5.85 |
| 35.07 | 5.88 |
| 34.80 | 5.92 |
| 34.95 | 5.95 |
| 34.80 | 5.99 |
| 34.82 | 6.02 |
| 34.41 | 6.06 |
| 33.52 | 6.10 |
| 32.76 | 6.13 |
| 32.15 | 6.17 |
| 31.45 | 6.20 |
| 30.26 | 6.24 |
| 29.08 | 6.28 |
| 27.11 | 6.31 |
| 24.97 | 6.35 |
| 21.44 | 6.39 |
| 17.52 | 6.42 |
| 16.59 | 6.46 |
| 15.48 | 6.49 |
| 14.93 | 6.53 |
| 14.65 | 6.56 |
| 14.93 | 6.60 |
| 15.28 | 6.64 |
| 15.68 | 6.67 |
| 16.23 | 6.71 |
| 16.51 | 6.75 |

TABLE 6-continued

Test data for the displacement load rate 0.188 in/sec. 0.188 (in/sec)

| FORCE LBS | DISP IN |
|---|---|
| 16.50 | 6.78 |
| 16.82 | 6.82 |
| 16.58 | 6.85 |
| 17.10 | 6.89 |
| 17.11 | 6.92 |
| 17.35 | 6.96 |
| 17.36 | 6.99 |
| 17.64 | 7.03 |
| 18.16 | 7.06 |
| 18.59 | 7.10 |
| 18.56 | 7.14 |
| 18.74 | 7.18 |
| 19.07 | 7.21 |
| 19.24 | 7.25 |
| 19.22 | 7.29 |
| 18.94 | 7.32 |
| 19.30 | 7.36 |
| 19.22 | 7.39 |
| 19.69 | 7.43 |
| 20.16 | 7.47 |
| 20.70 | 7.50 |
| 20.89 | 7.54 |
| 21.26 | 7.58 |
| 21.98 | 7.61 |
| 22.48 | 7.65 |
| 22.89 | 7.69 |
| 23.78 | 7.73 |
| 24.55 | 7.76 |
| 24.93 | 7.80 |
| 25.84 | 7.84 |
| 26.97 | 7.87 |
| 27.80 | 7.91 |
| 29.01 | 7.94 |
| 29.82 | 7.98 |
| 31.01 | 8.01 |
| 32.26 | 8.03 |
| 33.18 | 8.06 |
| 34.74 | 8.10 |
| 35.90 | 8.14 |
| 37.32 | 8.17 |
| 38.91 | 8.21 |
| 40.39 | 8.25 |
| 41.94 | 8.28 |
| 43.16 | 8.32 |
| 44.49 | 8.36 |
| 46.16 | 8.39 |
| 47.86 | 8.43 |
| 49.53 | 8.47 |
| 50.84 | 8.50 |
| 52.22 | 8.53 |
| 53.47 | 8.57 |
| 54.48 | 8.61 |
| 55.41 | 8.64 |
| 56.48 | 8.68 |
| 57.36 | 8.72 |
| 58.91 | 8.75 |
| 60.44 | 8.79 |
| 61.66 | 8.83 |
| 62.59 | 8.86 |
| 63.57 | 8.90 |
| 64.59 | 8.93 |
| 65.61 | 8.97 |
| 67.03 | 9.01 |
| 67.85 | 9.05 |
| 68.81 | 9.08 |
| 69.72 | 9.12 |
| 70.51 | 9.17 |
| 71.26 | 9.19 |
| 71.49 | 9.24 |
| 71.95 | 9.27 |
| 72.45 | 9.31 |
| 72.49 | 9.35 |
| 71.91 | 9.38 |
| 71.49 | 9.42 |
| 70.29 | 9.45 |
| 68.55 | 9.49 |
| 66.91 | 9.53 |
| 65.20 | 9.56 |
| 64.23 | 9.60 |
| 61.47 | 9.63 |
| 59.11 | 9.67 |
| 57.20 | 9.71 |
| 56.14 | 9.74 |
| 55.72 | 9.78 |
| 55.65 | 9.82 |
| 56.36 | 9.85 |
| 57.99 | 9.89 |
| 60.51 | 9.92 |
| 63.26 | 9.96 |
| 65.95 | 10.00 |
| 68.55 | 10.03 |
| 70.53 | 10.07 |
| 73.03 | 10.10 |
| 74.11 | 10.14 |
| 74.99 | 10.16 |
| 75.98 | 10.18 |
| 76.97 | 10.20 |
| 76.18 | 10.22 |
| 74.90 | 10.23 |
| 74.06 | 10.23 |

TABLE 7

Test data for the displacement load rate 0.275 in/sec. 0.275 (in/sec)

| FORCE LBS | DISP IN |
|---|---|
| 15.11 | 0.36 |
| 16.32 | 0.36 |
| 17.59 | 0.38 |
| 18.57 | 0.41 |
| 19.56 | 0.44 |
| 20.89 | 0.48 |
| 22.02 | 0.51 |
| 22.89 | 0.55 |
| 24.30 | 0.59 |
| 25.30 | 0.63 |
| 26.49 | 0.67 |
| 26.99 | 0.70 |
| 28.14 | 0.75 |
| 29.09 | 0.78 |
| 30.06 | 0.82 |
| 30.90 | 0.86 |
| 31.99 | 0.90 |
| 32.97 | 0.94 |
| 33.80 | 0.97 |
| 34.76 | 1.01 |
| 35.30 | 1.05 |
| 36.16 | 1.09 |
| 37.15 | 1.13 |
| 37.97 | 1.17 |
| 35.70 | 1.21 |
| 36.22 | 1.25 |
| 36.40 | 1.29 |
| 36.82 | 1.33 |
| 36.36 | 1.37 |
| 36.20 | 1.41 |
| 34.90 | 1.45 |
| 32.98 | 1.49 |
| 29.97 | 1.53 |
| 27.87 | 1.57 |
| 27.44 | 1.60 |
| 26.29 | 1.64 |
| 23.30 | 1.68 |
| 19.84 | 1.72 |
| 20.11 | 1.76 |

TABLE 7-continued

Test data for the displacement load rate 0.275 in/sec.
0.275 (in/sec)

| FORCE LBS | DISP IN |
|---|---|
| 20.24 | 1.80 |
| 20.82 | 1.84 |
| 22.17 | 1.87 |
| 22.51 | 1.91 |
| 22.91 | 1.95 |
| 23.72 | 1.99 |
| 23.43 | 2.03 |
| 23.57 | 2.07 |
| 24.18 | 2.11 |
| 23.72 | 2.15 |
| 24.17 | 2.19 |
| 24.52 | 2.23 |
| 24.37 | 2.27 |
| 24.66 | 2.31 |
| 24.37 | 2.34 |
| 24.59 | 2.39 |
| 25.16 | 2.42 |
| 25.69 | 2.46 |
| 26.25 | 2.50 |
| 25.40 | 2.54 |
| 26.11 | 2.58 |
| 26.77 | 2.62 |
| 26.93 | 2.66 |
| 27.39 | 2.70 |
| 26.97 | 2.74 |
| 27.23 | 2.78 |
| 27.70 | 2.82 |
| 27.45 | 2.86 |
| 27.45 | 2.90 |
| 27.24 | 2.93 |
| 26.92 | 2.98 |
| 27.31 | 3.02 |
| 27.45 | 3.06 |
| 27.06 | 3.10 |
| 27.18 | 3.14 |
| 27.18 | 3.18 |
| 26.95 | 3.22 |
| 26.14 | 3.26 |
| 26.12 | 3.30 |
| 25.99 | 3.34 |
| 25.77 | 3.38 |
| 25.23 | 3.42 |
| 24.52 | 3.46 |
| 23.56 | 3.50 |
| 23.40 | 3.53 |
| 23.44 | 3.58 |
| 22.66 | 3.62 |
| 22.56 | 3.66 |
| 22.76 | 3.69 |
| 22.64 | 3.73 |
| 22.86 | 3.77 |
| 22.89 | 3.81 |
| 22.45 | 3.85 |
| 22.61 | 3.89 |
| 22.55 | 3.93 |
| 22.20 | 3.97 |
| 21.94 | 4.01 |
| 21.98 | 4.05 |
| 20.97 | 4.09 |
| 20.32 | 4.13 |
| 19.57 | 4.17 |
| 19.81 | 4.21 |
| 19.57 | 4.25 |
| 19.66 | 4.29 |
| 19.78 | 4.33 |
| 19.91 | 4.37 |
| 20.44 | 4.41 |
| 20.48 | 4.45 |
| 20.32 | 4.49 |
| 20.80 | 4.53 |
| 20.86 | 4.57 |
| 20.94 | 4.61 |
| 21.26 | 4.65 |
| 21.30 | 4.69 |
| 21.54 | 4.73 |
| 20.14 | 4.77 |
| 19.41 | 4.81 |
| 19.59 | 4.85 |
| 19.91 | 4.90 |
| 20.18 | 4.93 |
| 19.97 | 4.97 |
| 20.53 | 5.02 |
| 20.99 | 5.05 |
| 21.30 | 5.09 |
| 21.85 | 5.14 |
| 22.32 | 5.17 |
| 22.49 | 5.21 |
| 22.48 | 5.25 |
| 22.74 | 5.29 |
| 23.15 | 5.33 |
| 23.59 | 5.38 |
| 24.27 | 5.42 |
| 24.61 | 5.45 |
| 25.35 | 5.49 |
| 26.01 | 5.53 |
| 26.47 | 5.58 |
| 26.89 | 5.61 |
| 27.68 | 5.65 |
| 27.82 | 5.70 |
| 28.25 | 5.73 |
| 28.94 | 5.77 |
| 29.03 | 5.81 |
| 28.73 | 5.85 |
| 28.24 | 5.89 |
| 28.39 | 5.93 |
| 28.21 | 5.97 |
| 28.06 | 6.01 |
| 26.89 | 6.05 |
| 26.32 | 6.09 |
| 24.85 | 6.13 |
| 23.51 | 6.17 |
| 21.56 | 6.21 |
| 18.86 | 6.25 |
| 14.57 | 6.29 |
| 10.86 | 6.33 |
| 9.91 | 6.37 |
| 9.09 | 6.41 |
| 8.59 | 6.45 |
| 8.85 | 6.48 |
| 9.28 | 6.53 |
| 9.99 | 6.56 |
| 10.74 | 6.60 |
| 11.59 | 6.64 |
| 11.97 | 6.68 |
| 12.45 | 6.72 |
| 12.59 | 6.76 |
| 12.62 | 6.80 |
| 12.68 | 6.84 |
| 12.97 | 6.88 |
| 13.07 | 6.92 |
| 13.45 | 6.96 |
| 13.74 | 7.00 |
| 14.28 | 7.04 |
| 14.74 | 7.08 |
| 14.91 | 7.12 |
| 14.99 | 7.17 |
| 15.31 | 7.20 |
| 15.44 | 7.24 |
| 16.20 | 7.29 |
| 16.78 | 7.33 |
| 16.85 | 7.37 |
| 17.12 | 7.41 |
| 17.57 | 7.45 |
| 17.98 | 7.49 |
| 18.27 | 7.53 |
| 18.43 | 7.57 |
| 18.91 | 7.61 |
| 19.42 | 7.65 |
| 20.09 | 7.69 |
| 20.80 | 7.73 |

TABLE 7-continued

Test data for the displacement load rate 0.275 in/sec. 0.275 (in/sec)

| FORCE LBS | DISP IN |
|---|---|
| 21.74 | 7.77 |
| 22.66 | 7.81 |
| 23.24 | 7.85 |
| 24.07 | 7.89 |
| 25.14 | 7.93 |
| 25.61 | 7.97 |
| 26.82 | 8.01 |
| 28.36 | 8.05 |
| 29.64 | 8.10 |
| 31.11 | 8.13 |
| 32.15 | 8.17 |
| 33.76 | 8.21 |
| 35.08 | 8.26 |
| 36.59 | 8.30 |
| 38.03 | 8.34 |
| 39.26 | 8.38 |
| 40.51 | 8.42 |
| 42.19 | 8.46 |
| 43.91 | 8.50 |
| 45.28 | 8.54 |
| 46.84 | 8.57 |
| 48.27 | 8.62 |
| 49.95 | 8.66 |
| 51.40 | 8.70 |
| 52.66 | 8.74 |
| 53.43 | 8.78 |
| 54.74 | 8.82 |
| 55.78 | 8.86 |
| 57.07 | 8.90 |
| 58.28 | 8.94 |
| 58.99 | 8.99 |
| 59.61 | 9.03 |
| 60.11 | 9.07 |
| 60.99 | 9.11 |
| 60.66 | 9.15 |
| 58.60 | 9.19 |
| 56.78 | 9.23 |
| 54.73 | 9.27 |
| 51.11 | 9.32 |
| 48.07 | 9.36 |
| 46.01 | 9.39 |
| 42.72 | 9.43 |
| 40.98 | 9.48 |
| 39.82 | 9.52 |
| 40.34 | 9.56 |
| 41.74 | 9.60 |
| 43.91 | 9.64 |
| 46.24 | 9.68 |
| 49.29 | 9.72 |
| 52.32 | 9.76 |
| 55.28 | 9.80 |
| 58.32 | 9.84 |
| 61.28 | 9.88 |
| 64.17 | 9.92 |
| 66.70 | 9.96 |
| 69.28 | 10.00 |
| 71.61 | 10.04 |
| 73.93 | 10.08 |
| 76.18 | 10.12 |
| 78.29 | 10.17 |
| 79.48 | 10.20 |
| 79.47 | 10.24 |
| 80.28 | 10.28 |
| 81.22 | 10.32 |
| 81.27 | 10.35 |
| 79.56 | 10.37 |
| 78.32 | 10.39 |

TABLE 8

Test data for the displacement load rate 0.391 in/sec. 0.391 (in/sec)

| FORCE LBS | DISP IN |
|---|---|
| 10.35 | 0.35 |
| 12.32 | 0.40 |
| 14.27 | 0.46 |
| 16.34 | 0.54 |
| 18.81 | 0.62 |
| 20.56 | 0.70 |
| 23.09 | 0.78 |
| 25.04 | 0.87 |
| 26.73 | 0.97 |
| 27.46 | 1.07 |
| 29.19 | 1.17 |
| 30.23 | 1.27 |
| 31.17 | 1.38 |
| 26.44 | 1.48 |
| 11.33 | 1.59 |
| 11.50 | 1.69 |
| 12.77 | 1.80 |
| 14.85 | 1.90 |
| 15.58 | 2.01 |
| 17.19 | 2.11 |
| 18.41 | 2.22 |
| 19.15 | 2.32 |
| 20.31 | 2.42 |
| 21.05 | 2.53 |
| 21.02 | 2.64 |
| 20.90 | 2.74 |
| 21.10 | 2.85 |
| 21.70 | 2.96 |
| 21.40 | 3.07 |
| 21.00 | 3.17 |
| 20.70 | 3.28 |
| 20.00 | 3.39 |
| 19.80 | 3.48 |
| 19.48 | 3.59 |
| 19.91 | 3.69 |
| 19.83 | 3.80 |
| 19.69 | 3.90 |
| 19.00 | 4.01 |
| 17.52 | 4.11 |
| 16.85 | 4.22 |
| 15.43 | 4.33 |
| 13.58 | 4.44 |
| 12.73 | 4.54 |
| 12.59 | 4.65 |
| 12.89 | 4.75 |
| 13.42 | 4.86 |
| 14.10 | 4.97 |
| 15.04 | 5.07 |
| 15.67 | 5.18 |
| 16.50 | 5.28 |
| 16.01 | 5.39 |
| 16.23 | 5.50 |
| 15.90 | 5.60 |
| 14.65 | 5.71 |
| 13.98 | 5.81 |
| 12.65 | 5.91 |
| 11.55 | 6.02 |
| 9.79 | 6.12 |
| 8.51 | 6.23 |
| 8.45 | 6.33 |
| 7.31 | 6.44 |
| 8.02 | 6.54 |
| 8.60 | 6.64 |
| 9.31 | 6.75 |
| 9.81 | 6.85 |
| 10.46 | 6.96 |
| 11.08 | 7.07 |
| 11.30 | 7.17 |
| 11.73 | 7.28 |
| 11.98 | 7.38 |
| 12.83 | 7.50 |
| 12.85 | 7.60 |
| 13.94 | 7.71 |
| 13.19 | 7.82 |
| 14.59 | 7.92 |

TABLE 8-continued

Test data for the displacement load rate 0.391 in/sec.
0.391 (in/sec)

| FORCE LBS | DISP IN |
|---|---|
| 16.34 | 8.03 |
| 17.35 | 8.14 |
| 20.70 | 8.24 |
| 23.94 | 8.35 |
| 26.51 | 8.45 |
| 28.73 | 8.55 |
| 33.00 | 8.66 |
| 38.00 | 8.77 |
| 42.00 | 8.87 |
| 44.00 | 8.98 |
| 29.37 | 9.09 |
| 28.85 | 9.20 |
| 32.02 | 9.30 |
| 36.02 | 9.41 |
| 39.73 | 9.52 |
| 45.34 | 9.62 |
| 50.83 | 9.73 |
| 56.19 | 9.83 |
| 62.00 | 9.94 |
| 67.52 | 10.04 |
| 72.65 | 10.13 |
| 77.85 | 10.23 |
| 82.58 | 10.33 |
| 87.43 | 10.42 |
| 91.96 | 10.52 |
| 94.33 | 10.60 |
| 96.62 | 10.66 |
| 98.42 | 10.73 |
| 99.64 | 10.79 |
| 101.33 | 10.84 |
| 103.17 | 10.89 |
| 105.35 | 10.94 |
| 106.35 | 10.99 |
| 107.62 | 11.04 |
| 108.84 | 11.08 |
| 108.96 | 11.12 |
| 109.19 | 11.14 |
| 107.23 | 11.18 |
| 106.76 | 11.21 |

The plot can be divided into four main stages in terms of behavior; those behaviors correspond to the apparatus' intermediate actuation. As actuation begins, the tension applied is translated into radial forces that increase gradually, storing strain energy within the compliant mechanism. Due to the mechanism's bistability feature and after it reaches the unstable equilibrium position, the energy stored can be released in the form of negative force applied within the mechanism causing the sudden drop. This corresponds to $P_{2S3}$ mechanism being actuated to its second stable position in all sectors. Next, the $P_{2S2}$ mechanisms are actuated to their second stable position. The force required for those mechanisms is less due to some energy stored within them during the loading accorded previously. The $P_{2S1}$ mechanisms are then actuated to their second stable position, and the $P_1$ mechanisms are finally actuated to their second stable position.

After morphing the SMSF apparatus to its second stable position as a sphere, the increasing load beyond zone 4 is converted to strain energy stored within the compliant mechanisms. Because the tests were done using displacement loading, it can be observed that the reaction forces throughout the curves are inversely proportional to the displacement rate. At low displacement rate, the potential energy gradually builds up within the compliant links showing more identifying features on its the curve than that of higher displacement rate result curve.

EXAMPLE 2

Design of Mechanism Stability Using Over-Constraint

Generally, described herein is the kinematic analysis involved in transforming regular mechanisms into bistable mechanisms using compliant segments. To aid this transformation, SOLIDWORKS was used to graphically represent the relation between links' rotation and coupler curves at a point on the mechanism. The methods followed are more effective when the initial and final states of the mechanism are given. The methodology described herein is for the fabrication of bistable mechanisms, including that discussed in Example 1.

An extensive analysis, identifying bistability behavior in four-bar compliant mechanisms, was done in [Jensen, B. D. and Howell, L. L., "Identification of Compliant Pseudo-Rigid-Body Four-Link Mechanism Configurations Resulting in Bistable Behavior", ASME. J. Mech. Des. 2004; 125(4):701-708. doi:10.1115/1.1625399], which resulted in calculating the required torsional stiffness in each joint and the modification of the links' geometry to achieve the bistability behavior. The toggle positions are also set by the configuration of the mechanism links, i.e., elbow up or down; an effective manner of having a specific intermediate stable position along the movement of the linkages is by designing a hard-stop. A different approach to achieve this behavior was done in [Jensen, B. and Howell, L. L., "Bistable Configurations of Compliant Mechanisms Modeled Using Four Link and Translational Joints" Journal of Mechanical Design, Vol. 126, Issue 4, pp. 657-666] by utilizing translational joints and springs in the studied models. Those approaches require extensive formulation by solving the kinematic and energy equations for each specific design. With advanced software solutions such as SOLIDWORKS, simulating the kinematics can be used to design bistable behavior in a compliant mechanism with four-bar PRBM.

The following presents the steps involved using SOLIDWORKS to synthesize a mechanism's geometry in order to achieve a design's specific bistability requirement. This method will ensure a stable position without the need of a hard stop as in [Jensen, B. D. and Howell, L. L., "Identification of Compliant Pseudo-Rigid-Body Four-Link Mechanism Configurations Resulting in Bistable Behavior", ASME. J. Mech. Des. 2004; 125(4):701-708. doi:10.1115/1.1625399]. There are two main initial design considerations that should be met before considering this analysis. First, both (first and second) states of the mechanism should be chosen and should represent the mechanism's desired stable positions. The first state is the position in which the mechanism was manufactured or assembled, and the second state is the position to which the mechanism is toggled. The second consideration is the assumption that the magnitude of the joints' torsional spring stiffness is small, i.e., living hinges [Howell L. L., 2001, "Compliant Mechanisms", Wiley, New York, ISBN 978-0471384786].

I. Bistability in a Four-Bar Compliant Mechanism Using SOLIDWORKS

Described herein is use of the SOLIDWORKS software following a step-by-step procedure to construct a four-bar compliant mechanism with any two desired stable positions. The bistability is found by utilizing the perpendicular bisector from Burmester's theory [Ceccarelli M, Koetsier T. Burmester and Allievi A., "Theory and Its Application for Mechanism Design at the End of 19th Century", ASME. J.

Mech. Des. 2008; 130(7):072301-072301-16. doi:10.1115/1.2918911; Waldron, K. J. and Kinzel, G. L., "Kinematics, Dynamics, and Design of Machinery", Wiley, New York, 2 ed. 2003, ISBN 978-0471244172] along with the coupler curve concept in a graphical representation. Those steps can be applied to any two positions of four-bar mechanism to find a solution to its bistability; further design constraints might be implemented to ensure the ability to fabricate the mechanism. Additional, optional design constraints are discussed at the end of the procedure to fine tune the final mechanism's solution.

An objective is to attach a potential energy element (PEE), such as a spring or a compliant link or any element to the mechanism, thus generating an energy curve upon actuation. This new element has two points of attachment—one of those points is attached on the mechanism itself whereas the other point is attached to the ground link or, in other embodiments, to the mechanism itself. The design steps are shown with an illustrative example, which was chosen arbitrarily, to support the generality of this method.

A. Design Stage One: Kinematic Analysis Using SOLIDWORKS

At this stage of the design, the kinematic requirements to achieve the bistability behavior in the mechanism are established using SOLIDWORKS rather than the traditional methods by solving for the kinematic coefficient through a system of equations analysis. This use of SOLIDWORKS reduces the computational time needed and gives the designer more visual understanding of the problem as well as the ability to verify the mechanism's behavior real time. For comparison, if the four-bar linkages shown in FIG. 34 were to be analyzed for bistability using the method in [Jensen, B. D. and Howell, L. L., "Identification of Compliant Pseudo-Rigid-Body Four-Link Mechanism Configurations Resulting in Bistable Behavior", ASME. J. Mech. Des. 2004; 125(4):701-708. doi:10.1115/1.1625399], the second stable position would be predefined by the mechanism itself, as shown depending on the location of the torsional spring (K).

Figure 34:
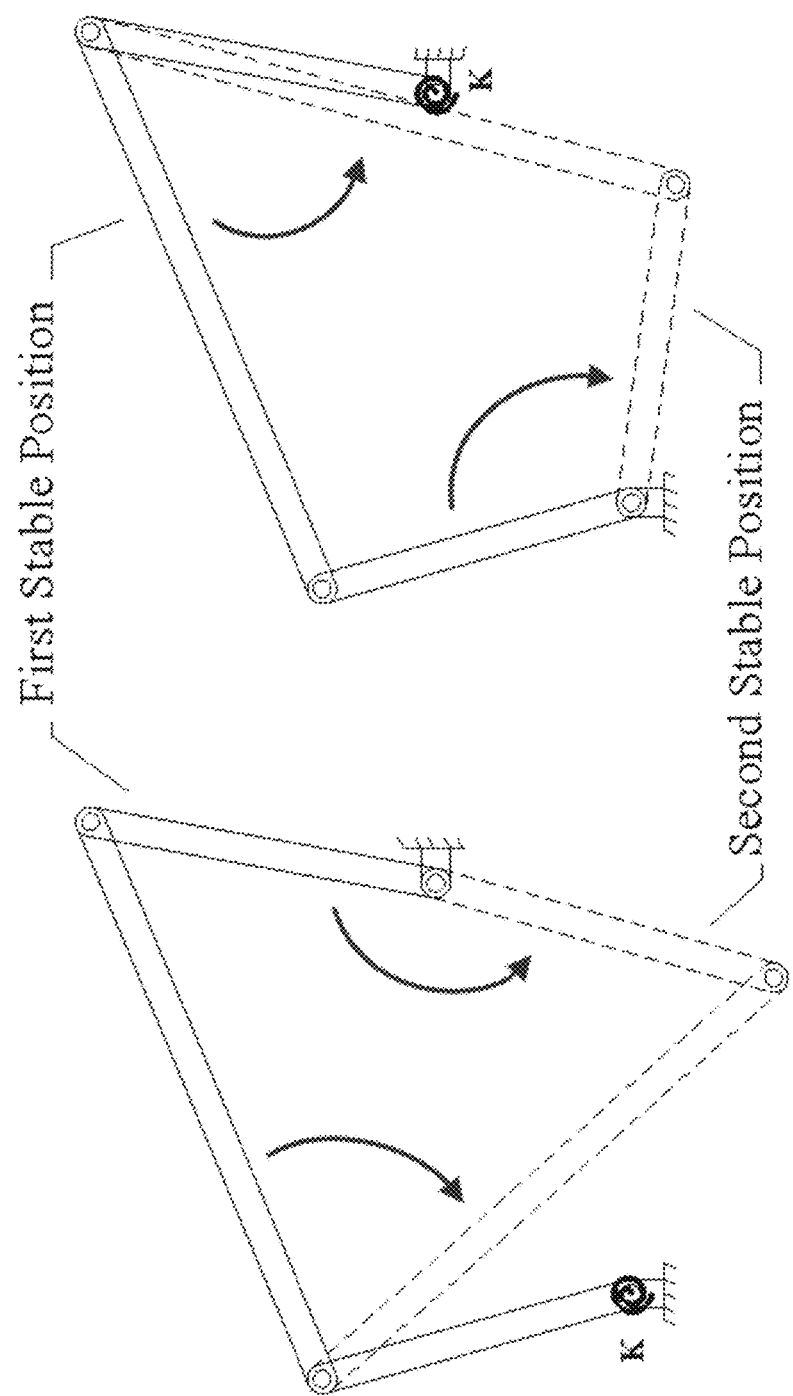
FIG. 34 depicts the second stable position depends on spring location and first position.
Figure 35B:
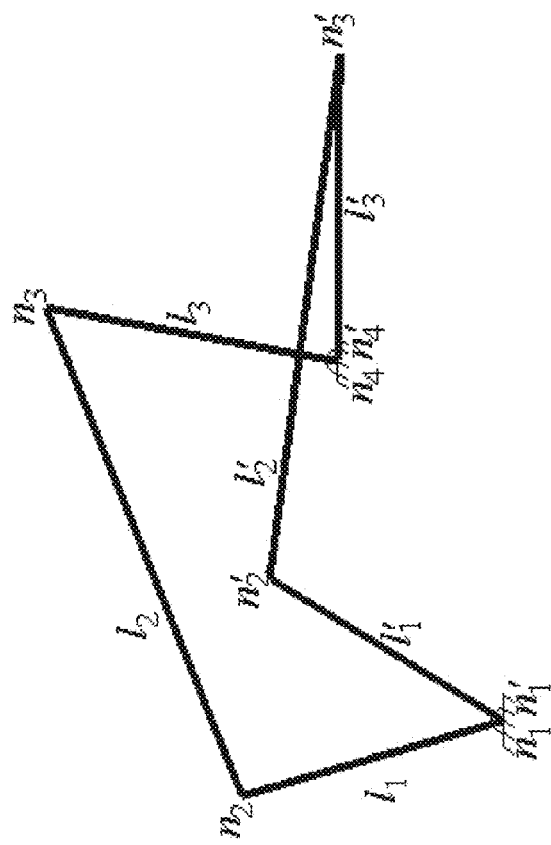
FIG. 35B depicts the mechanism's two stable position as design input.
Figure 35A:
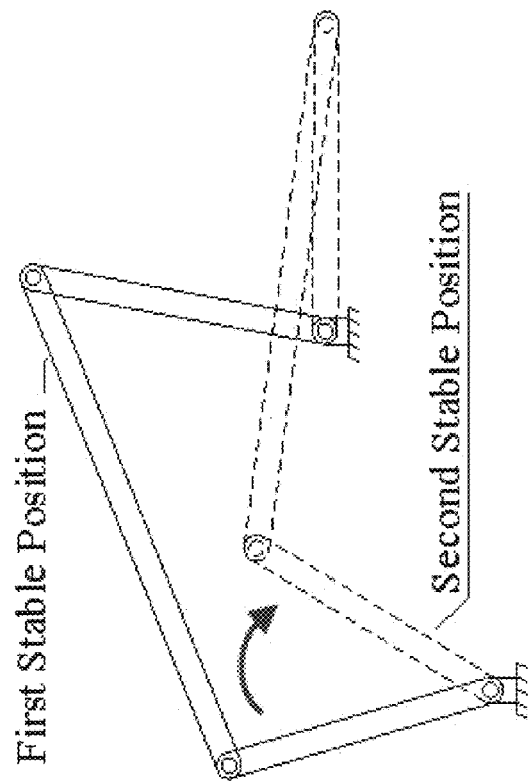
FIG. 35A depicts the mechanism's two stable position as design input.

FIG. 34 is an example where the unique second stable position for the given four-bar depends on the mechanism's first position and the spring location. Below are the steps to follow to specify an intermediate stable position without the use of hard-stop:

Step 1: Identify the two desired stable states of the mechanism and sketch the links as lines connecting pin joints in both states, as shown in FIG. 35B as derived from FIG. 35A. The lengths of the links do not change between its initial and final positions; in SOLIDWORKS, this is implemented with equality constraints. The links are numbered clockwise with the ground being link ($l_4$). The center points (fixed ground pivots) of the mechanism are identified as ($n_1$) and ($n_4$) where the circle points (moving pivots) are ($n_2$) and ($n_3$); this leads to ($l_2$) being the targeted link for the analysis.

Figure 36:
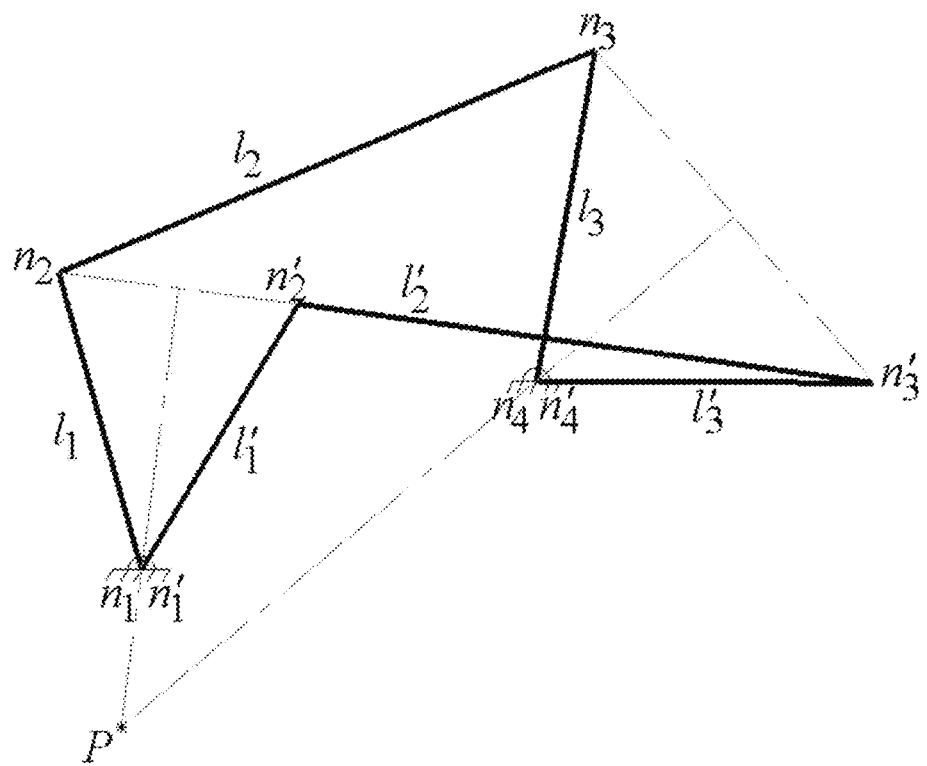
FIG. 36 depicts the mechanism's pole point for ($l_2$).

Step 2: Construct the perpendicular bisectors of lines ($n_2$ and $n'_2$) and ($n_3$ and $n'_3$) segments. The intersection of these perpendicular bisectors is pole point (P), as shown in FIG. 36. The second link need not necessarily be a straight link connecting between joints ($n_2$) and ($n_3$); it could be in any geometrical shape as long as it is rigid and it contains points ($n_2$ and $n_3$). Therefore, a point on the second link, which connects to one end of the PEE, should be selected.

Figure 37:
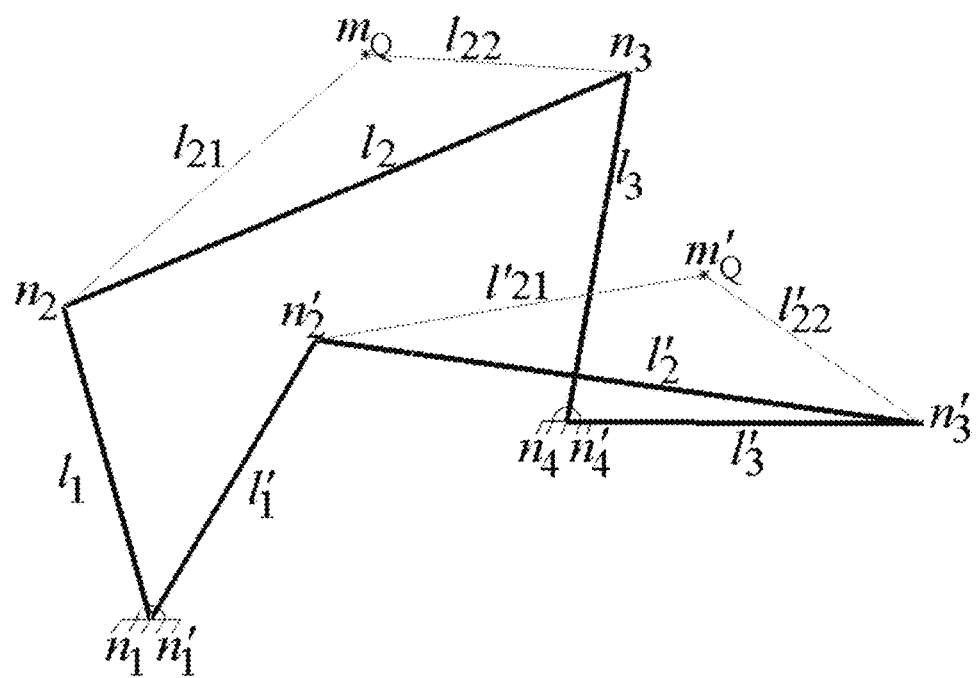
FIG. 37 depicts ternary link representation of the coupler link to place the point ($m_Q$).

Step 3: To give an extra DOF for the PEE placement point, a ternary link representation of ($l_2$) is sketched out, as shown in FIG. 37. The lines ($l_{21}$) and ($l_{22}$) do not change length and so $|l_{21}|=|l'_{21}|$ and $|l_{22}|=|l'_{22}|$. The points ($m_Q$) and ($m'_Q$) are on the mechanism itself and represent the one attachment point of the PEE at its initial and final state, respectively.

Figure 38:
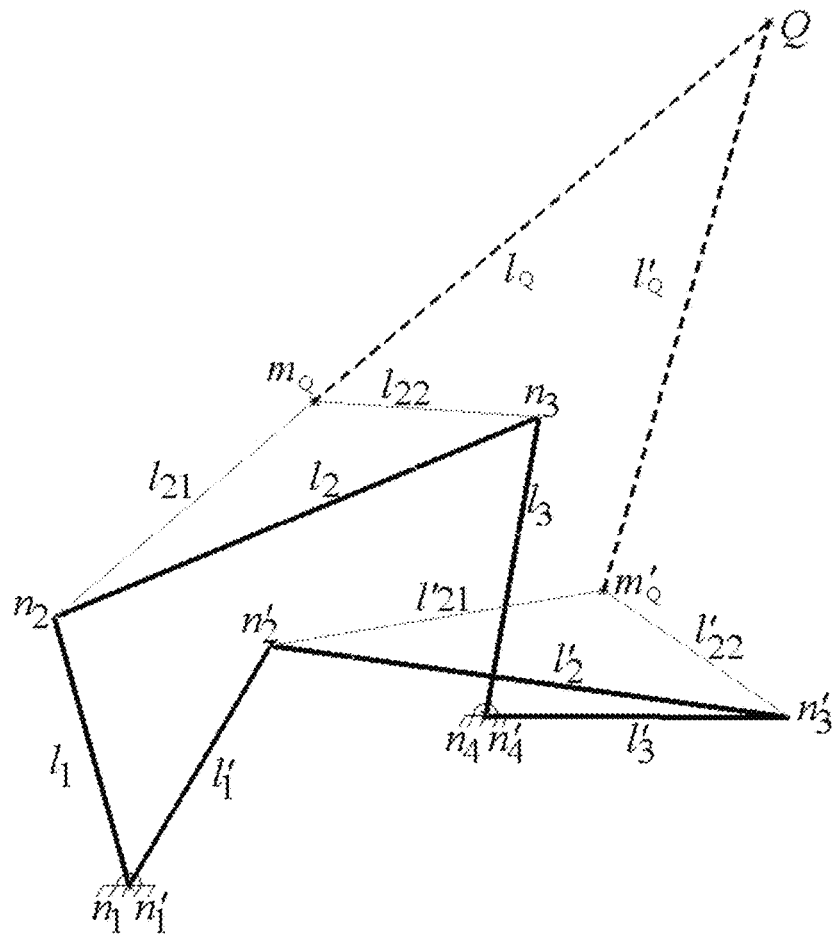
FIG. 38 shows the PEE representation as ($l_Q$) with the point (Q).

Step 4: As shown in FIG. 38, two individual lines ($l_Q$) and ($l'_Q$) from the points ($m_Q$) and ($m'_Q$) are drawn to a point (Q); those lines represent the PEE at its initial and final state, respectively. Considering those two lines as a source for potential energy requires them to be un-deformed at both states (initial and final), thus an equality constraint is added to them. Both lines are attached to a single point (Q) that represents the second attachment point for the PEE. Additional constraints on the location of this point are described at a later design stage. Knowing that the point (P) represents the finite rotation pole of the second link between initial and final states, every point on that link would have the same pole while the mechanism moves between the predefined initial and final position.

Figure 39:
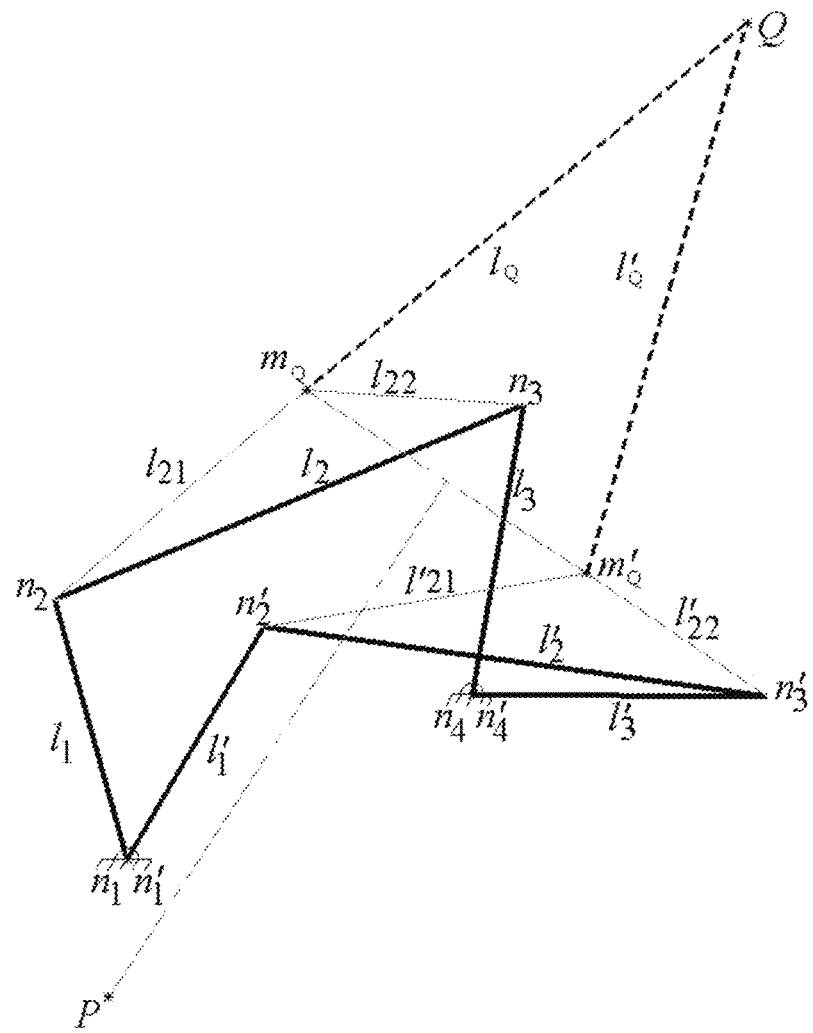
FIG. 39 depicts the perpendicular bisector the point ($m_Q$) connected to the pole point (P).

Step 5: Construct the perpendicular bisector line between the points ($m_Q$) and ($m'_Q$) where it must pass through point (P), and every point on that line is a possible location for point (Q) generated in step 2, as shown in FIG. 39.

B. Design Stage Two: Potential Energy Analysis Using SOLIDWORKS

After establishing the mechanism's kinematics, this stage will analyze potential energy aspect to the design in order to achieve bistability through the PEE. Referencing FIG. 39, extra constraint imposed on the mechanism is adding the PEE, with points (Q) and ($m_Q$) being its center point and circle point, respectively. The effect of that is the point ($m_Q$) has two incompatible zero-stress paths while the mechanism is in motion. The first path is defined by the coupler curve generated from the mechanism's original center points ($n_1$) and ($n_2$), while the second path is a circular arc centered at (Q). The actual path the point ($m_Q$) follows is a stressed path, which depends on the relative flexibility (or stiffness) of the four-bar versus the PEE.

Using SOLIDWORKS, the following sequence of steps identify the two paths, providing an in-depth analysis of the PEE. For steps 6 and 7, either step can be followed first before the other, with the steps pertaining to defining the location of the two points (Q) and ($m_Q$). This is an under-specify problem and leaves room to add constraints specific to the mechanism's application, for example the force required to toggle the mechanism and the stiffness of the links required by design.

Step 6: The placement of the attachment point (Q) should be decided; different designs require different locations depending on the space limitation of the mechanism. The only condition is that point (Q) cannot be placed on a moving link; consequently, it can be only placed on the ground link. Moreover, fixing the point (Q) first partially restrict the location of the point ($m_Q$) by only allowing it to move at an equal distance apart; meaning only the angle between the lines ($l_Q$) and ($l'_Q$) will vary but the lines have to remains equal in length. For the purpose of illustration, the center point (Q) is placed above the mechanism, as shown in FIG. 39. Its position can be fine-tuned in a later stage of the design to satisfy the stress limits of the PEE.

Step 7: Next, the location of the point ($m_Q$) is selected by the second link's geometrical design and limitation. In the case of this step precedes step 6, the fixing of point ($m_Q$) defines the pole line between points (P) and (Q), in turn making point (Q) only valid across that line. Because what is currently being described herein is a general step-by-step design procedure, the location of this point can be selected as shown in FIG. 39. The exact location can be considered as a design input for a specific application. The subsequent steps can remain the same regardless of the position chosen.

Figure 40A:
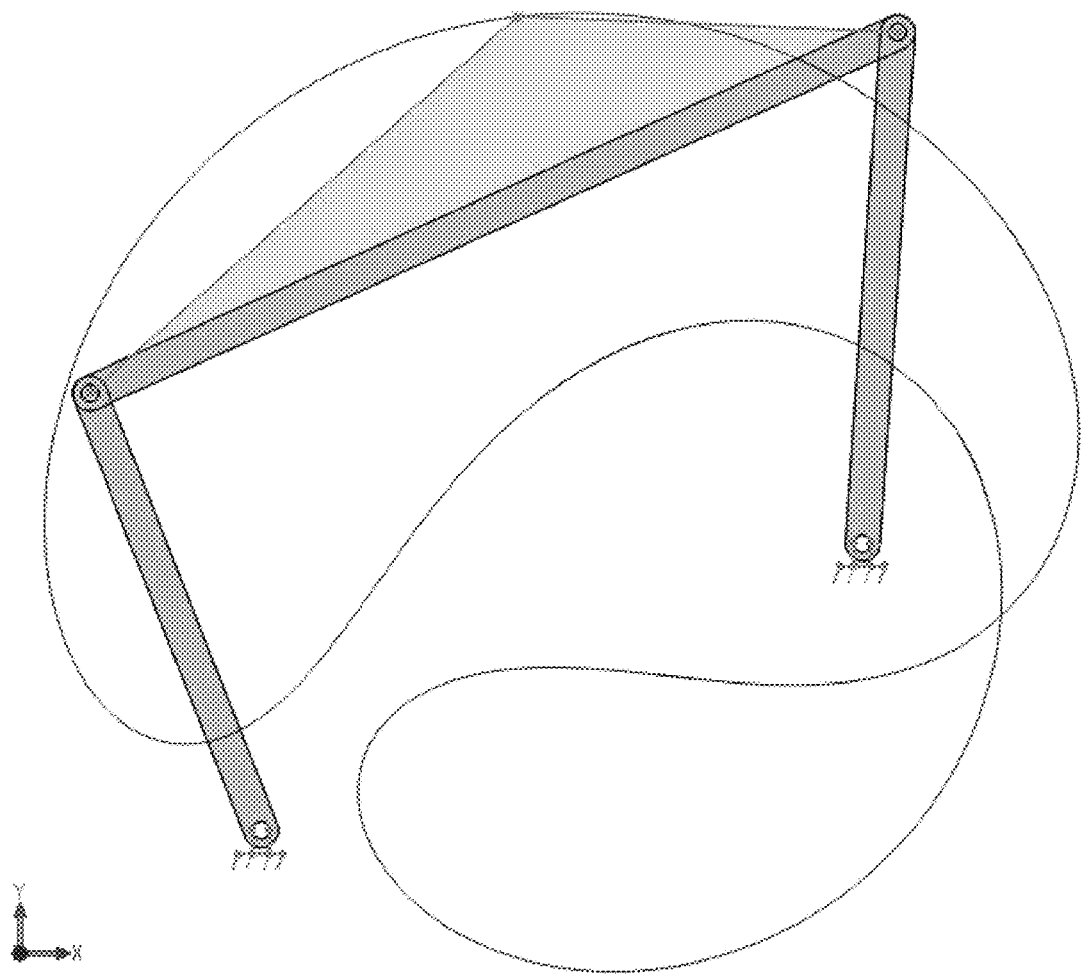
FIG. 40A is a links display depicting the first zero-stress path of the point ($m_Q$) following the coupler curve.
Figure 40B:
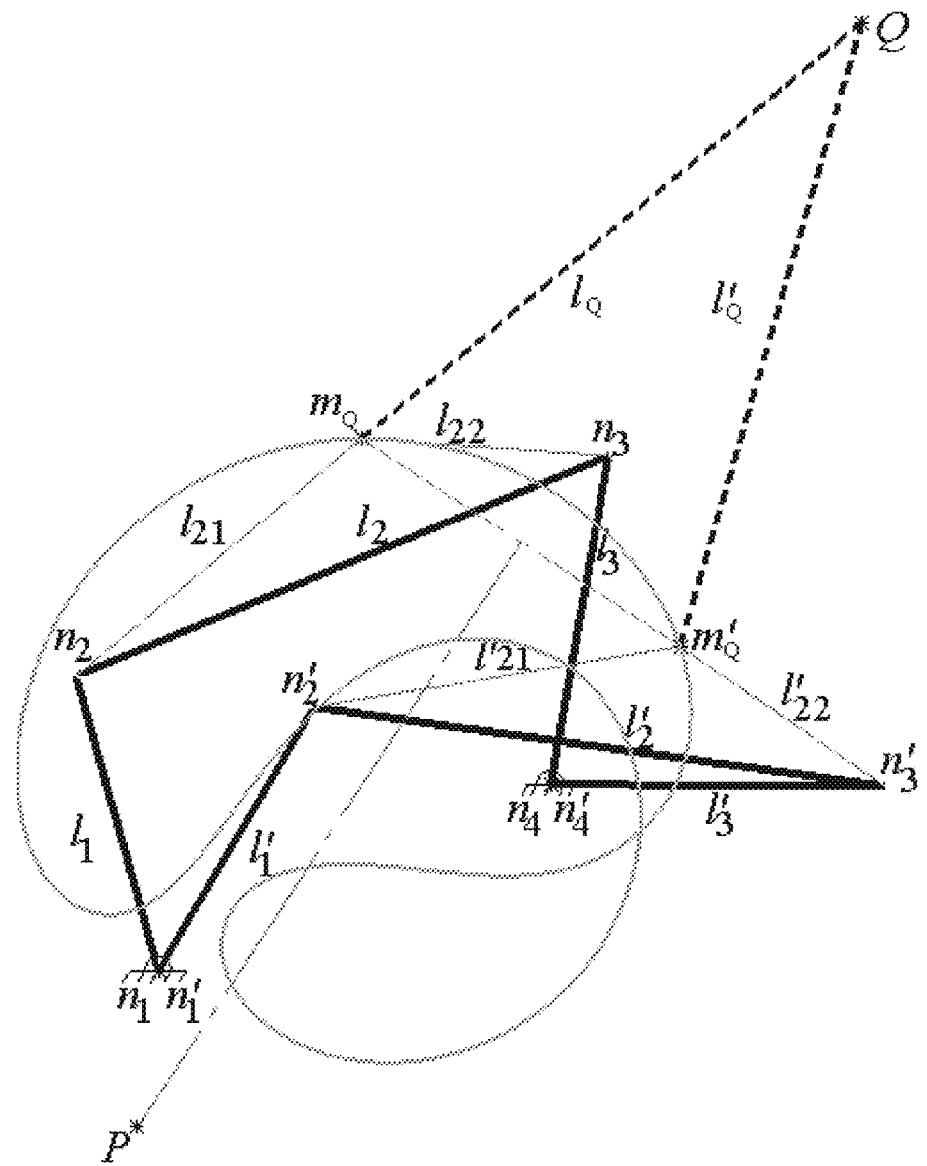
FIG. 40B is a line representation depicting the first zero-stress path of thy:point ($m_Q$) following the coupler curve.

Step 8: The first zero-stress for path point ($m_Q$) is found using the coupler curve generated from the mechanism's original center points. Using the motion analysis within SOLIDWORKS, the path of point ($m_Q$) is traced throughout the rotational cycle of the mechanism. FIGS. 40A-40B respectively show the traced path in links display and in line representation.

Figure 41:
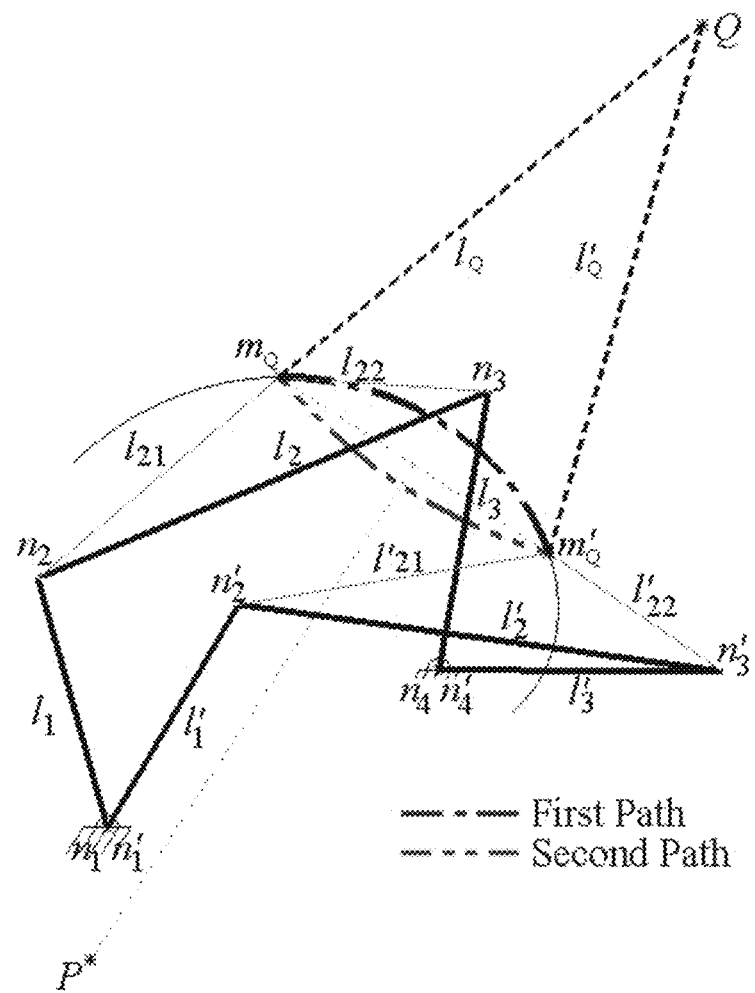
FIG. 41 depicts the second path of the point ($m_Q$) as an arc.

Step 9: Finding the second path that point ($m_Q$) follows by being a circle point for the center point (Q). This path is a circular arc connecting both the points' two stable positions with a radius of ($l_Q$) and its center being point (Q), as shown in FIG. 41.

Figure 42:
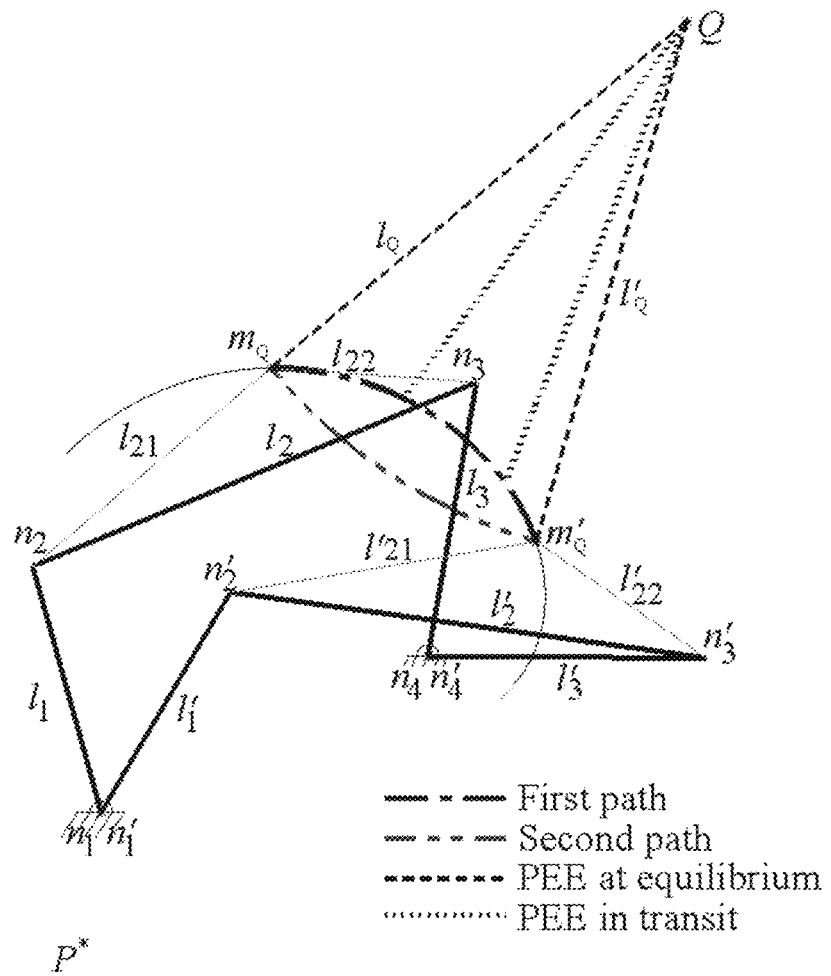
FIG. 42 depicts the PEE in a compressed deformation.

Step 10: Superimposing both paths of the point ($m_Q$) reveals the type of deformation that the PEE experiences. In this example, and assuming the four-bar mechanism's links ($l_1$-$l_4$) are rigid, the link ($l_Q$) should be compressed to be able to toggle between both stable positions, as shown in FIG. 42.

Knowing that a stable equilibrium point is a minimum potential energy and that an unstable equilibrium point is a maximum potential energy is the key idea behind the bistability of such a mechanism. The points of intersection between the two curves (first and second) are going to be a minimum potential energy, as the link ($l_Q$) is not being compressed or stretched when the two curves intersect. Everywhere else, the difference between these two curves results in tension or compression, and the unstable equilibrium point occurs when the difference between the two curves become the maximum. A reason this concept is effective is because the path generated by the point (Q) and the path generated by the coupler curves are different.

Figure 43:
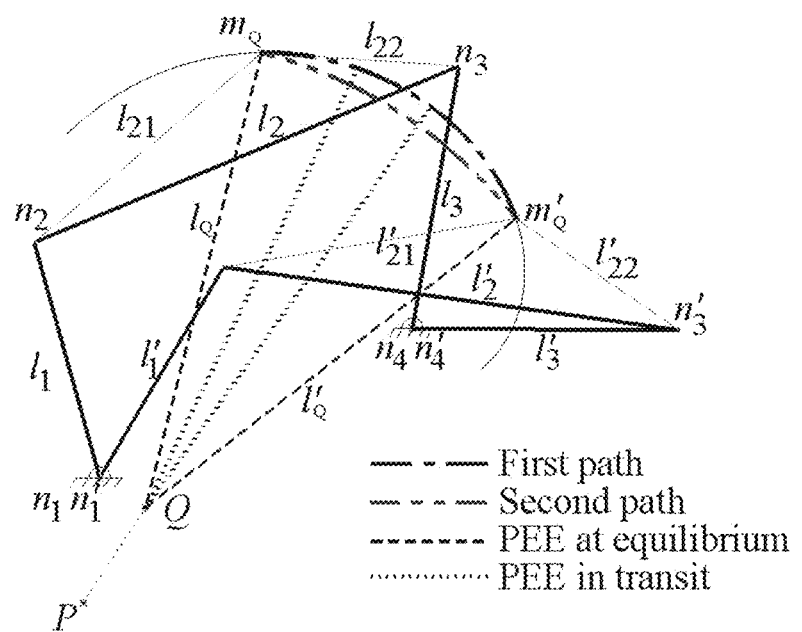
FIG. 43 depicts the PEE in an elongated deformation.

The foregoing describes general step-by-step design procedures to establish bistability behavior in a four-bar mechanism with any two desired positions. The analysis of the two paths is specific to each design; from the example used, the PEE will experience a compressive load to follow the coupler curve path. The same example can be re-designed if a tensional load on the PEE is required; the position of the point (Q) can act as a knob to control the magnitude and direction of deflection on the element. FIG. 43 shows the result if the center point (Q) was placed at the opposite side from what is in FIG. 39; the coupler curve remains the same because the mechanism did not change but the path of the circle point ($m_Q$) changes. The result is that the PEE experiences elongation along the path between the two stable positions.

The specific analysis of the PEE and the two paths will be discussed further for a specific problem in this research. The general approach to the problem can remain the same for any mechanism but differ in the actual data.

II. Bistability by Over-Constraint

The idea behind bistability by over-constraining the mechanism is introducing a compliant link that represents the PEE as discussed previously. Because this research is targeting one DOF mechanisms, adding an extra link with two joints would result in zero DOF transforming the mechanism into a structure. At each stable position the mechanism will remain a structure; however, while it is in actuation, the flexibility of the compliant link permits the mechanism to toggle between its stable positions.

Discussed herein is an analysis in converting the unit cell element in the $P_1$ SMSF, from Example 1, into a bistable element using the foregoing step-by-step design procedure. Further described herein is how to transform parallel four-bar linkages, which is a special case of linkages, into a mechanism with two stable positions using the over-constraint by compliant link.

A. SMSF: Unit Cell Bistability Synthesis

Figure 44:
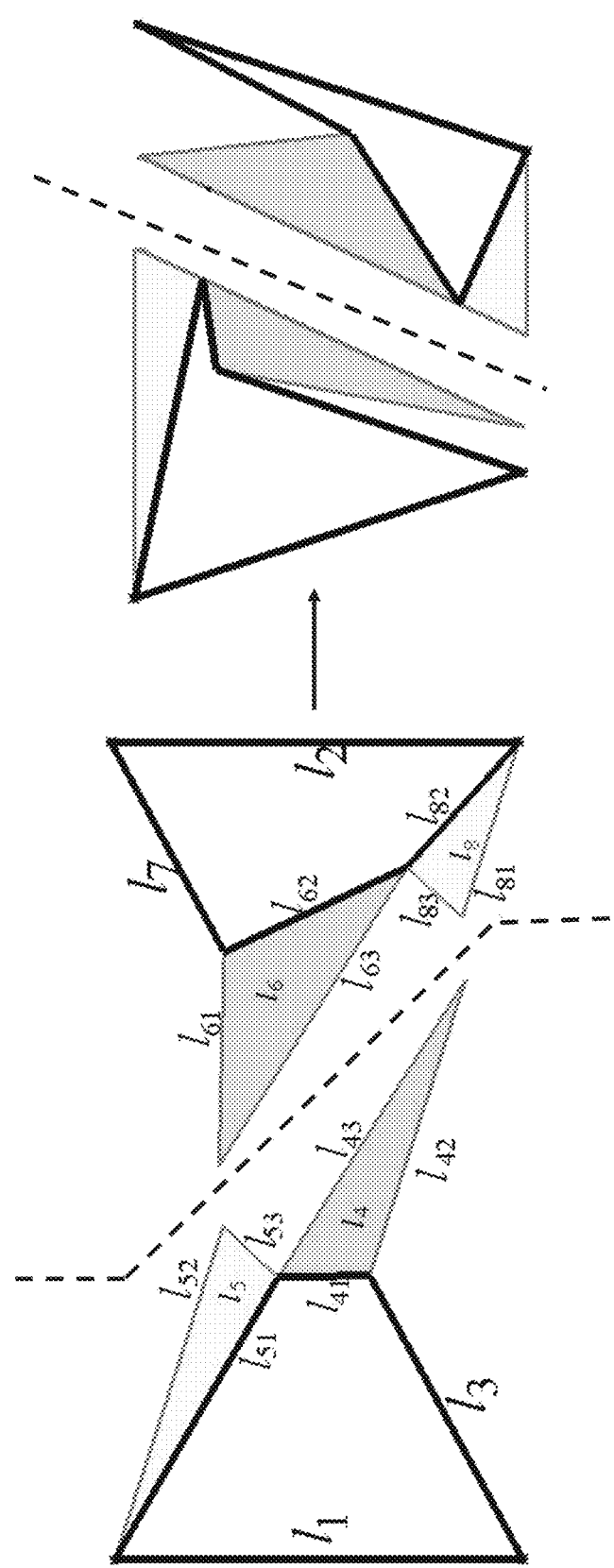
FIG. 44 depicts $P_1$'s mechanism splits into two four-bar mechanism.

The unit cell element used in Example 1 for the $P_1$ design was based on an eight-bar mechanism with one DOF; because one of the design's requirements is bistability, the unit cell should behave like a structure at each stable position. Further observation on that selected design, shown in FIG. 17, reveals that the mechanism can be split into two four-bar mechanisms attached at the center, as shown in FIG. 44.

For the left half of the mechanism, the angle between links ($l_1$) and ($l_{52}$) remains constant at about 60° from the design constraints in Table 3. Thus, the bistability of the left part can be achieved by following the methods proposed in [Jensen, B. D. and Howell, L. L., "Identification of Compliant Pseudo-Rigid-Body Four-Link Mechanism Configurations Resulting in Bistable Behavior", ASME. J. Mech. Des, 2004; 125(4):701-708. doi:10.1115/1.1625399], by increasing the magnitude of the torsional spring constant at the joint between the two links. This was done be connecting a rigid link between links ($l_1$) and ($l_5$), essentially eliminating the joint between them. This reduces the mechanism to three links and three joints, converting to a structure with zero DOF. As a result, the mechanism, shown in the structure on the left of the broken lines in FIG. 45, will toggle between the two stable positions by bucking link ($l_3$) due to being thinner than link ($l_4$) (reference FIG. 44 as well thus making it sufficiently flexible to toggle.

In the right half of the mechanism, the angle between links ($l_8$) and ($l_2$) increases when the mechanism is in actuation to produce the final trapezoidal shape. Consequently, the joint between both links needs to be small and act as a living hinge with very low stiffness, eliminating the possibility to use the method utilized in the left half. The alternative solution is introducing a compliant link (PEE) following the method described previously; adding a link and two joints normally turns the mechanism into a structure with zero DOF. Specifically, the compliance of the PEE permits the toggling of the mechanism; thus the placement of the compliant link can be important.

The steps previously described were used to design a solution that satisfies the following constraints:

1) The mechanism should be contained within a specified area without interference, though, as discussed, certain multi-layered applications may permit some interference;

2) The ability to laser cut the design from a thin sheet of polymer (any material and thickness is contemplated herein);

3) The stresses on the compliant link or PEE should be within the material's limits; and 4) The PEE's ability to generate enough potential energy to overcome the (small but non-zero) restoring torques within the mechanism's living hinge joints while moving from first to second position and back.

Figure 46:
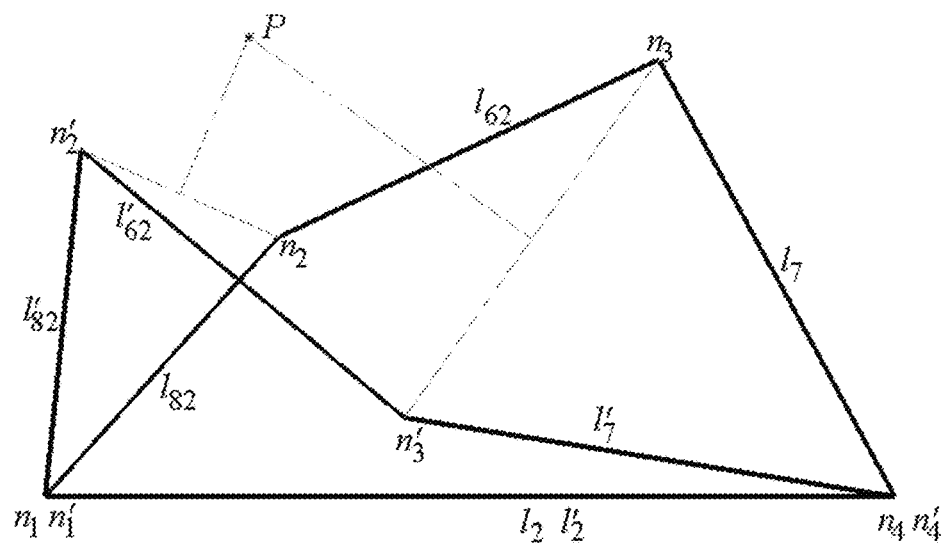
FIG. 46 depicts $P_1$'s right half at both state with the pole point (P) identified

For steps 1 and 2: From the analysis of $P_1$ described previously, the initial and final state of the mechanism is known with its dimensions. FIG. 46 shows both states with the perpendicular bisectors drawn for the end points of ($l_{62}$) to identify its pole point (P).

Figure 47:
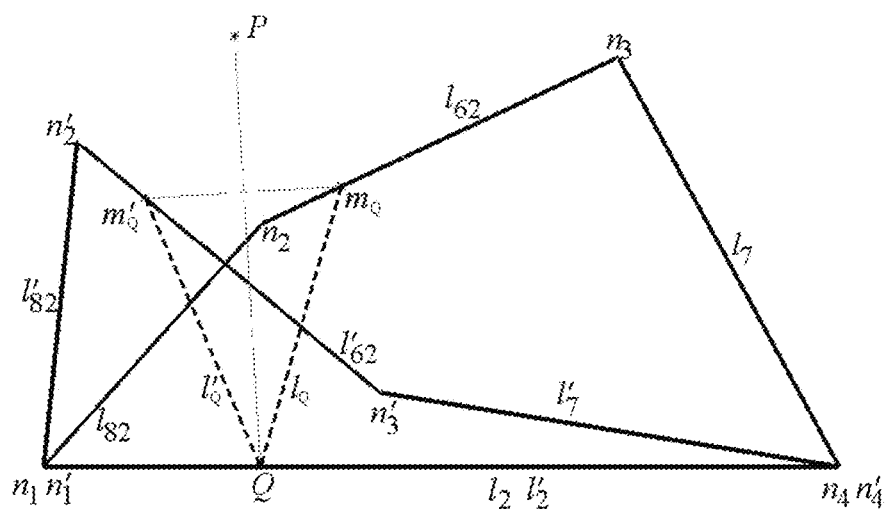
FIG. 47 depicts PEE placement with its point (Q) placed on the ground link ($l_2$).

For steps 3 to 7: Given the geometrical constraint of the mechanism, the attachment point ($m_Q$) of the compliant link (PEE) has to be on link ($l_{62}$). The lines ($l_Q$) and ($l'_Q$) are sketched out representing the PEE at its initial and final state respectively, along with its perpendicular bisector connecting its point (Q) to the pole point (P). Point (Q) is attached to link ($l_2$) to satisfy the constraint of the mechanism being contained within the specified area, as shown in FIG. 47.

Figure 48:
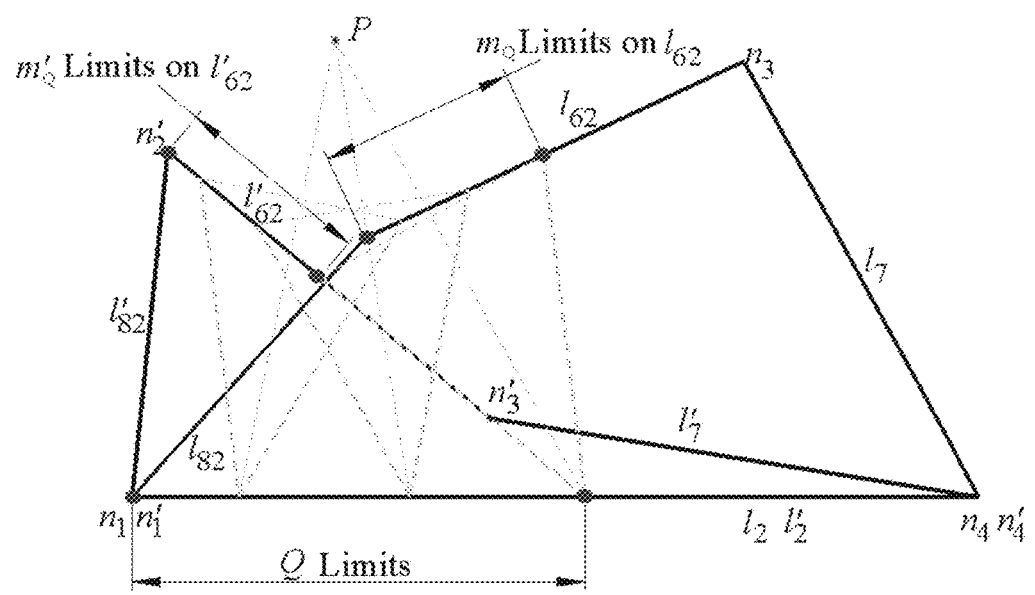
FIG. 48 depicts the limits of points ($m_Q$), ($m'_Q$) and (Q) on the mechanism.

Given the fact that both attachment points ($m_Q$) and (Q) are on the mechanism's link ($l_{62}$) and ($l_2$), respectively, limits their position in order to satisfy the non-interference within the mechanism. The restriction is caused by the PEE at its second stable position represented in link ($l'_Q$); both of its end points ($m'_Q$) and (Q) can only slide over the links ($l'_{62}$) and ($l_2$), respectively. Assuming point (Q) is the control, its position is limited to the distance between the joint ($n_1$) up to where the links ($l'_2$) and ($l'_{62}$) are parallel and collinear, as shown in FIG. 48.

Figure 49:
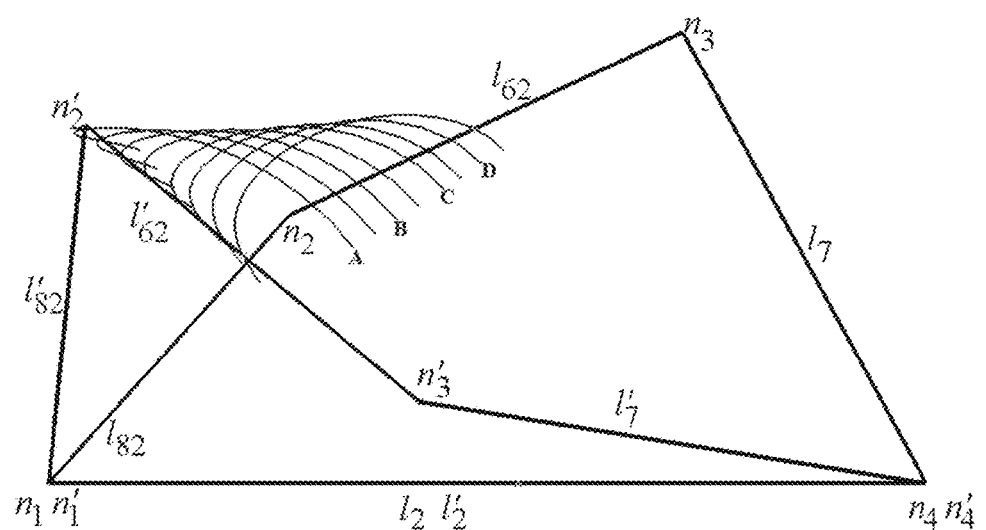
FIG. 49 depicts eight different coupler curves generated for ($m_Q$) within its limits.

For step 8: Knowing that the positions of the point ($m_Q$) along the limits within ($l_{62}$), shown in FIG. 48, are infinite in theory, eight different coupler curves generated using SOLIDWORKS at different intervals across the link ($l_{62}$) to visualize the change in the curves' behavior, as shown in FIG. 49. Those curves and any intermediate ones represent different solutions to the bistability behavior and are considered to be the first path that point ($m_Q$) traces.

For steps 9 and 10: Four coupler curves of point ($m_Q$) are selected and superimposed on the second arc path associated with the position of the ($m_Q$) being the circle point to the center point (Q). Each coupler curve is considered a configuration and named (A, B, C and D) for later reference, as shown in FIG. 49.

The selection process for the solution was done upon visual observation (or use of algorithms and/or selection process) of each configuration, and the satisfaction of the design constraints and the ability to produce the apparatus, in this example, is as follows:

Configuration A: It was disqualified due to the maximum distance between the two paths measured to be 0.8 mm compared to the PEE's length of 19.5 mm, which may not provide enough potential energy to overcome the shiftiness within the mechanism. Furthermore, the trace of point ($m_Q$) has to pass the second stable position to follow the coupler curve which might introduce an unwanted intermediate position, as shown in FIG. 50A.

Configuration B: It was also disqualified due to the same reason as Configuration A from the trace point of view, as shown in FIG. 50B.

Configuration C: It qualifies to be a solution due to there being enough paths suppuration and the absence of intermediate position caused by the associated coupler curve; the PEE would experience elongation to follow the coupler curve, as shown in FIG. 50C.

Configuration D: It was disqualified due to the large angle difference that the PEE undergoes between the initial and final state (about 107 degrees), which might cause high stress at the joints. Furthermore, the close proximity between the PEE and link ($l_{62}$) as the final state might cause issues in designing the PEE when thickness is added, as shown in FIG. 50D.

Figure 45:
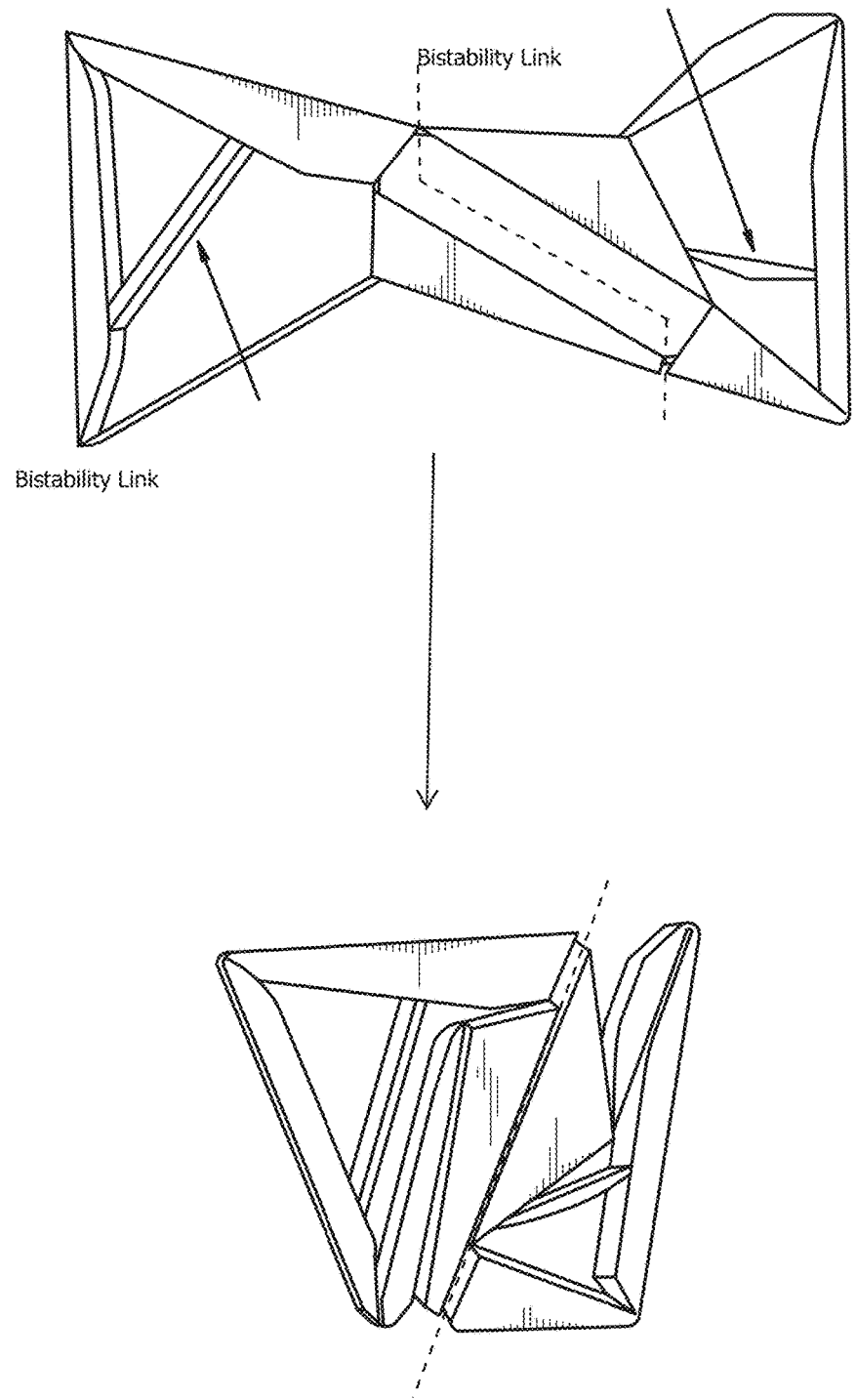
FIG. 45 depicts the mechanism of $P_1$'s left and right halves at both stable positions.
Figure 64:
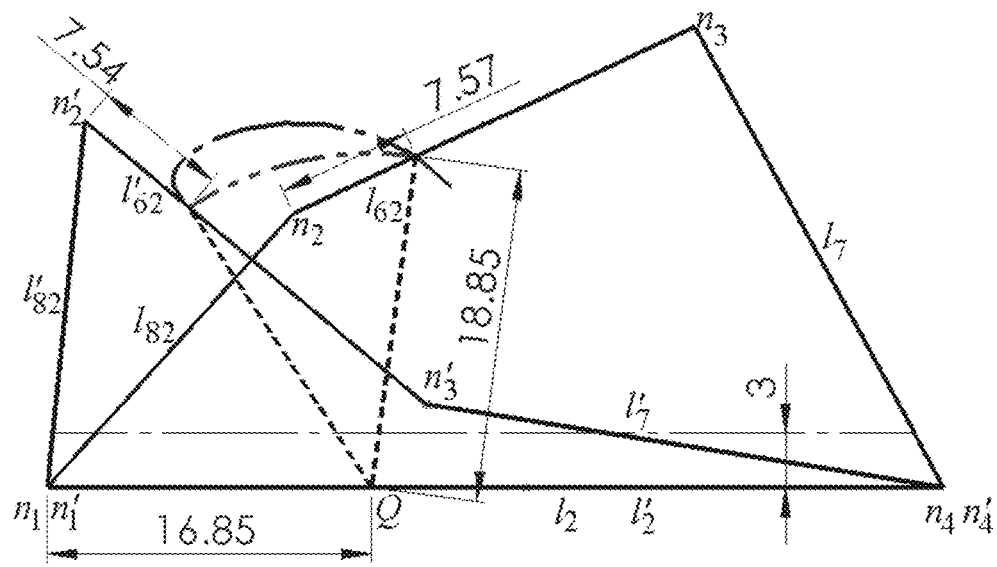
FIG. 64 depicts the left half PEE design dimensions of $P_1$ SMSF.
Figure 65:
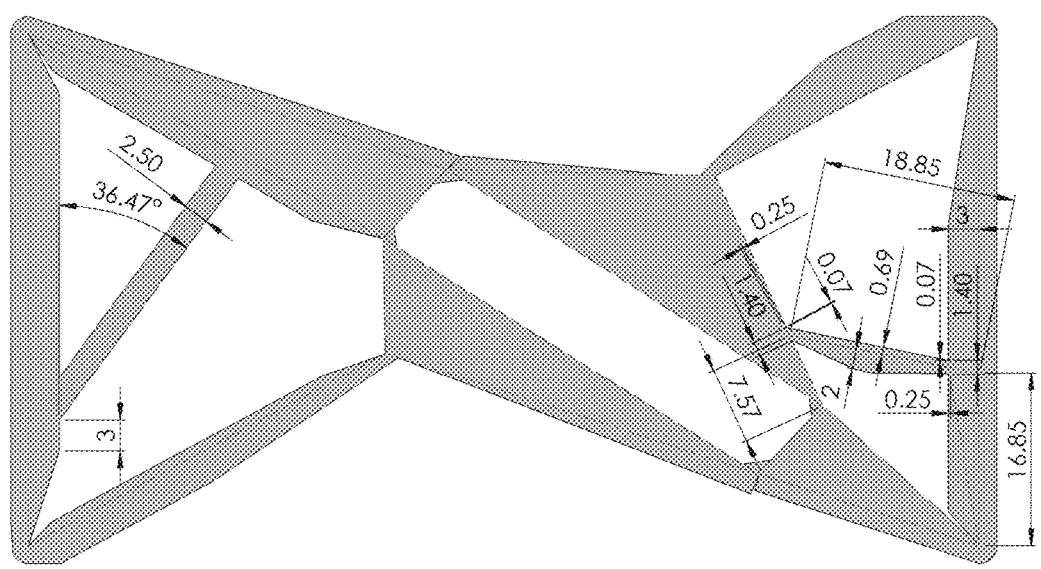
FIG. 65 depicts the $P_1$ SMSF mechanism's design dimensions (with bistability).

For a proof of concept in the SMSF design, Configuration C was selected to be the design choice, without claiming it is the only solution to the mechanism's bistability. The structure to the right of the broken lines in FIG. 45 depicts the right half of the mechanism, described previously, with the compliant link added for bistability; the detailed dimensions of the PEE can be found in FIGS. 64-65. Adding the PEE elements leads to adding a link and two joints to the four-bar mechanism for a total of five links and six joints converting it to a structure with zero DOF. As a result, the mechanism will toggle between two stable positions by elongating the PEE, allowing for one DOF during actuation.

Figure 51B:
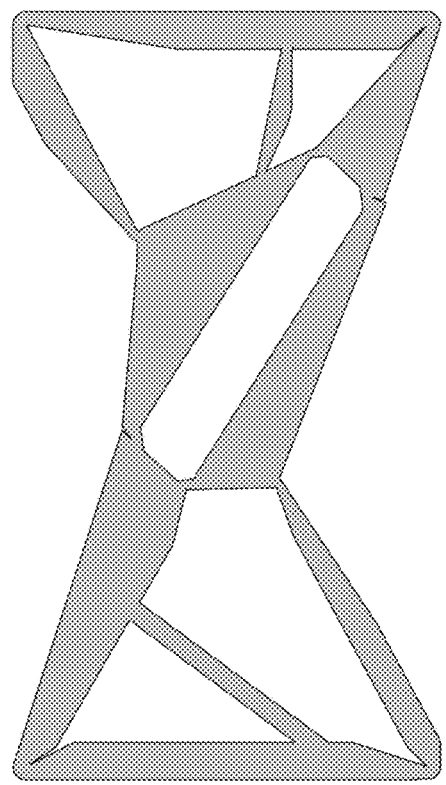
FIG. 51B depicts the $P_1$ mechanism with mobility of (−1).
Figure 51A:
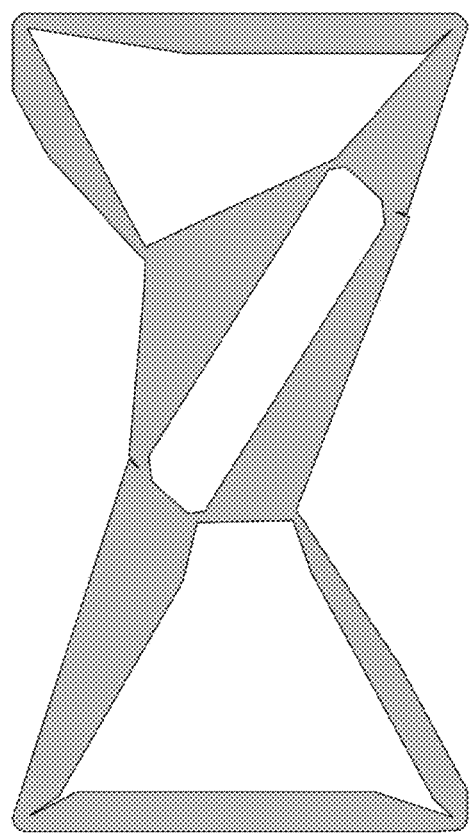
FIG. 51A depicts the $P_1$ mechanism with mobility of one.

Looking at the final $P_1$ mechanism, the left half combined two links as one, thus eliminating one link and one joint, but the right half added one link and two joints as shown in FIG. 51B (FIG. 51A shows the $P_1$ mechanism without compliant links for comparison). The total mobility is (−1) using eight links and eleven joint; this over-constrained mechanism behaves as a structure in both stable positions with enough flexibility within its compliant links to toggle between them.

B. Parallel Four-Far Compliant Mechanism Bistability

The parallelogram linkage is one of the classical four-bar mechanisms with one DOF. It is considered to be a change point mechanism, and according to the work done in [Jensen, B. D. and Howell, L. L., "Identification of Compliant Pseudo-Rigid-Body Four-Link Mechanism Configurations Resulting in Bistable Behavior", ASME. J. Mech. Des. 2004; 125(4):701-708. doi:10.1115/1.1625399], it can achieve bistability by placing the torsional spring at any joint location. The second stable position is considered to be predefined according to the mechanism's initial state and dimensions; any alternative second stable position can occur by a designed hard-stop. As an example, FIGS. 52A-52B show the two stable positions in which the mechanism can toggle between by placing the spring (K) at the bottom left and right joints, respectively, taking the bottom link as the ground. The method discussed herein allows the mechanism to have a second stable position by design via over-constraining it using compliant link as PEE. Illustrated herein is the design example using the step-by-step procedure to convert a parallelogram linkage into a mechanism with two bistable positions as shown in FIG. 52C, along with a produced working apparatus for behavior demonstration.

Figure 53A:
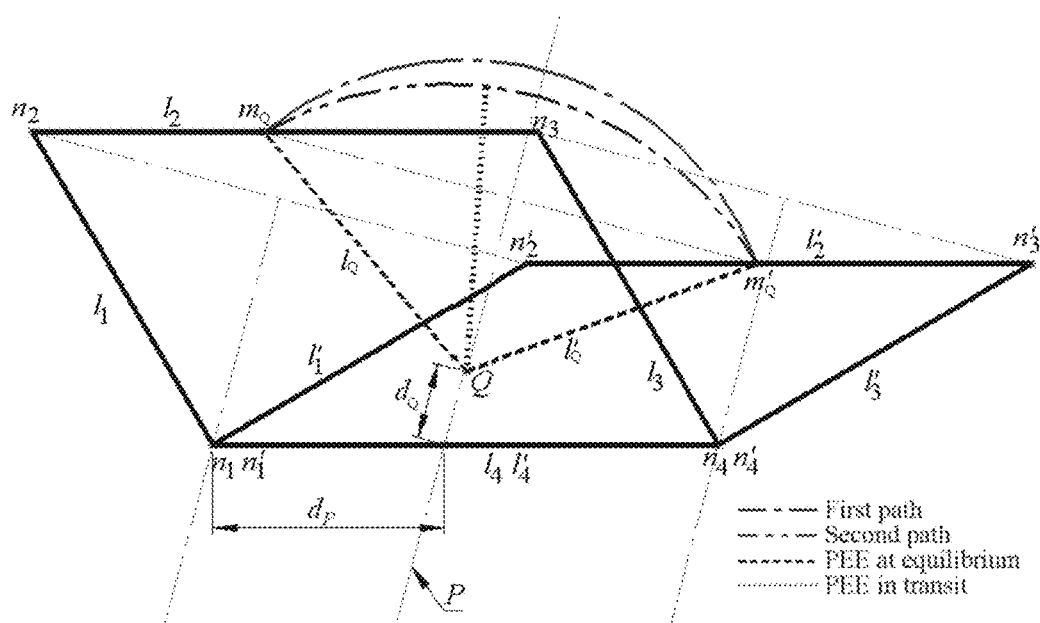
FIG. 53A depicts the mechanism where the PEE experiences tension.
Figure 53B:
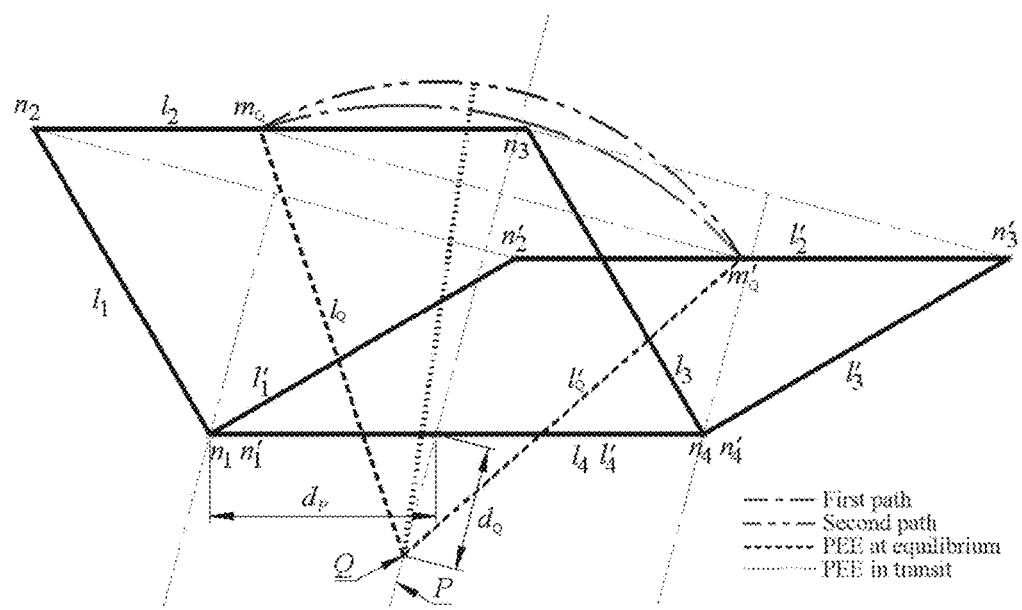
FIG. 53B depicts the mechanism where the PEE experiences compression.
Figure 54:
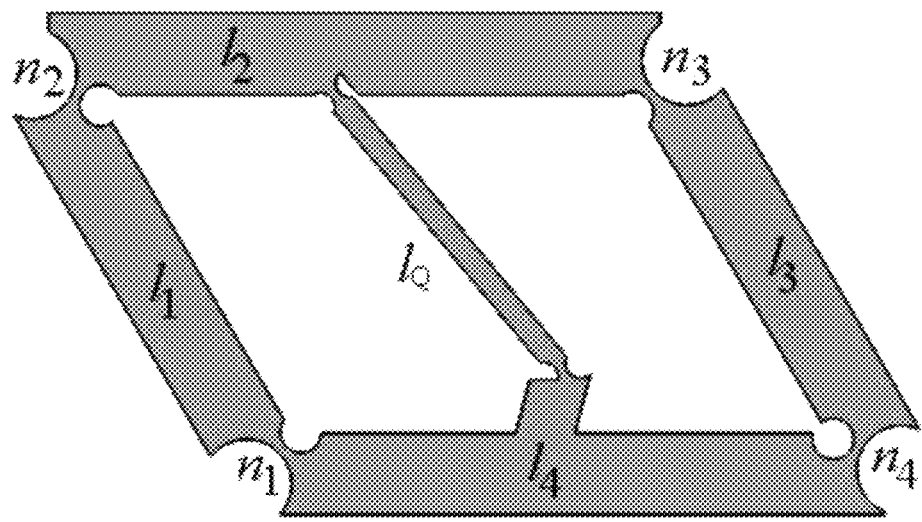
FIG. 54 depicts a finalized mechanism, according to an embodiment of the current invention or using an embodiment of the current invention.

Considering the same $P_1$ SMSF's design constraint, FIGS. 53A-53B illustrate the entire step-by-step procedure. The perpendicular bisectors of the link ($l_2$) at both ends are parallel unlike other mechanisms, where the intersection of the bisectors represents the pole point (P). For this reason, the pole of ($l_2$) is considered to be any line between both bisectors that is parallel to them. The two attachment points of the PEE (Q) and ($m_Q$) are placed on the pole line and link ($l_2$), respectively. The dimension ($d_P$) represents the distance of the pole line from the left bisector and ($d_Q$) controls the distance of point (Q) from ($l_4$) along the pole line in either direction.

The first path of the point ($m_Q$) is along the coupler curve that is an arc in which its center is the intersection point between the link ($l_4$) and the pole line. The second path is also an arc with point (Q) as its center; depending on the location of (Q) being above or below the ground link ($l_4$) translates to what type of loading the PEE experiences (either compression or tension, respectively). Assuming the mechanism's links are rigid and with low torsional stiffness at the joints, FIG. 53A shows when the PEE experiences compression by being forced to follow the first path when absent the PEE, it would follow the second path instead. Furthermore, FIG. 53B shows the tension loading on the PEE when point (Q) is below ($l_4$).

Figure 66:
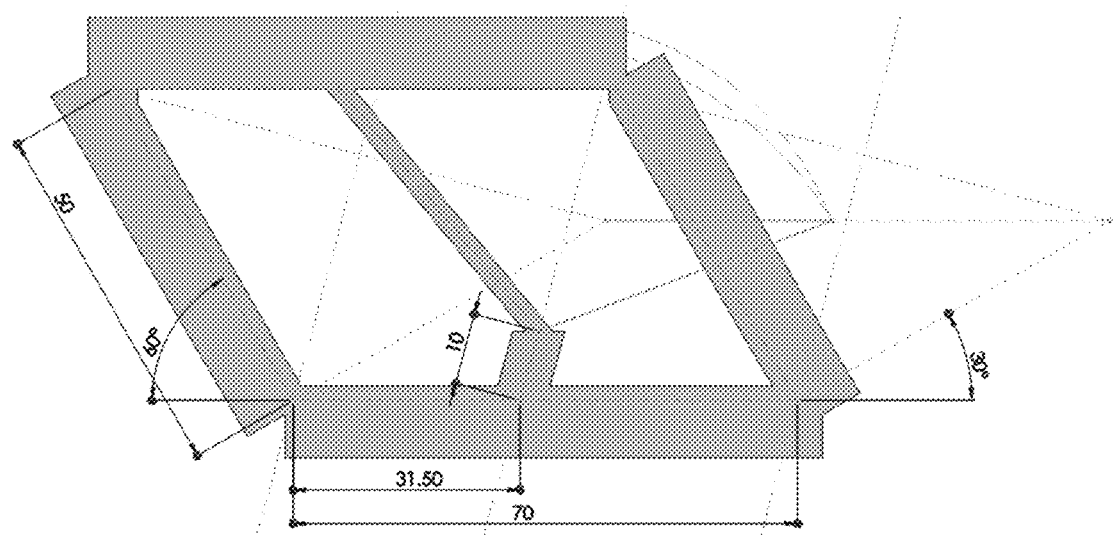
FIG. 66 depicts the parallel four-bar bistable mechanism's initial layout dimensions.
Figure 67:
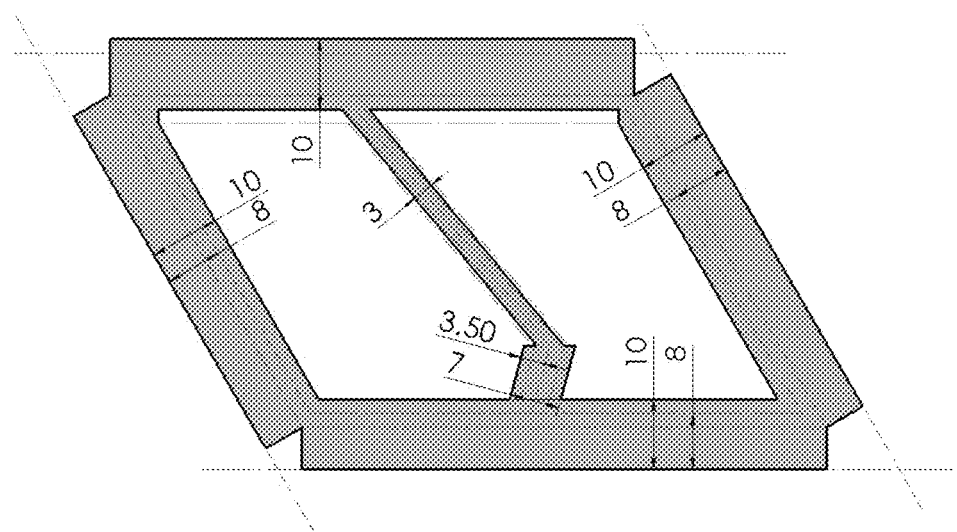
FIG. 67 depicts the parallel four-bar bistable mechanism's intermediate dimensions.
Figure 68:
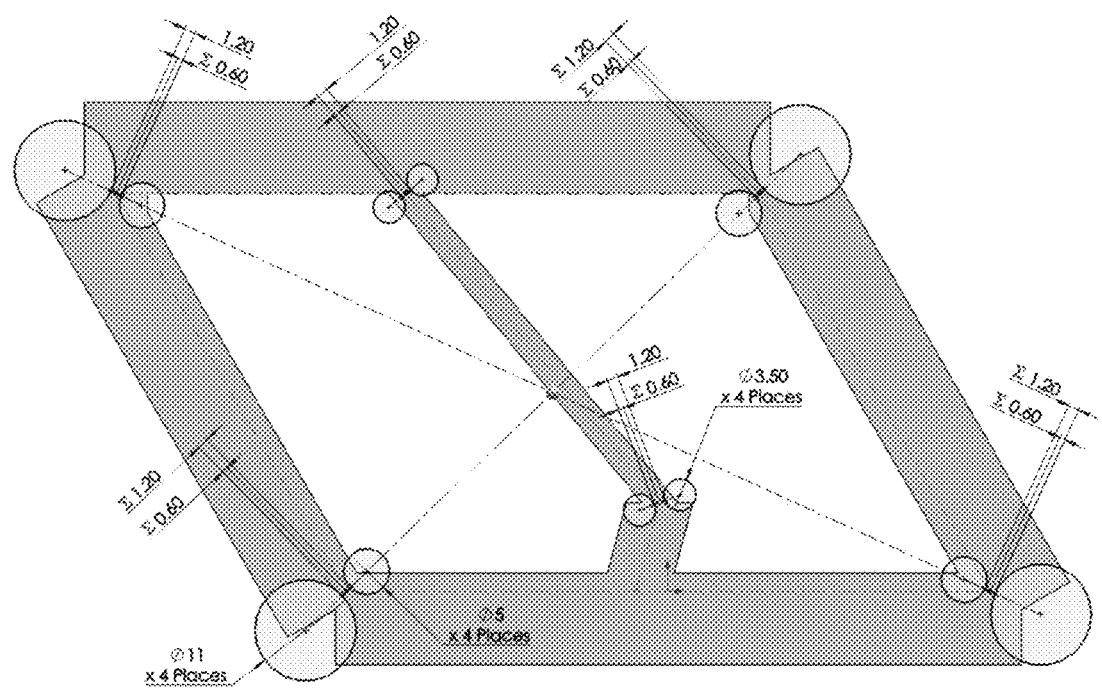
FIG. 68 depicts the parallel four-bar bistable mechanism's living hinges dimensions.

For illustration and example purposes only, the mechanism shown in FIG. 53A is considered where the PEE or ($l_Q$) undergo compressive loading. The mechanism was laser cut as a single piece, shown in FIG. 64, and the detailed dimensions of the mechanism can be found FIGS. 66-68.

This example mechanism was designed to toggle between two stable positions. The first stable position is when the angle between the two links ($l_4$) and ($l_1$) is about 120° counter-clockwise, and the second stable position is about 30° counter-clockwise for the same links.

Figure 55A:
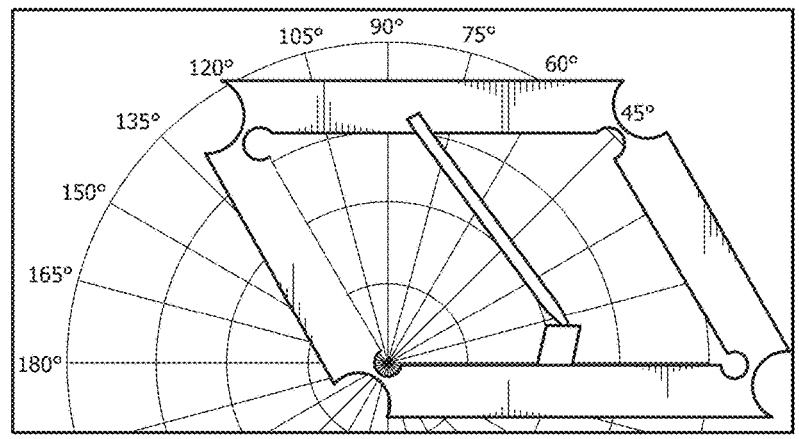
FIG. 55A depicts an apparatus at its initial state.
Figure 55B:
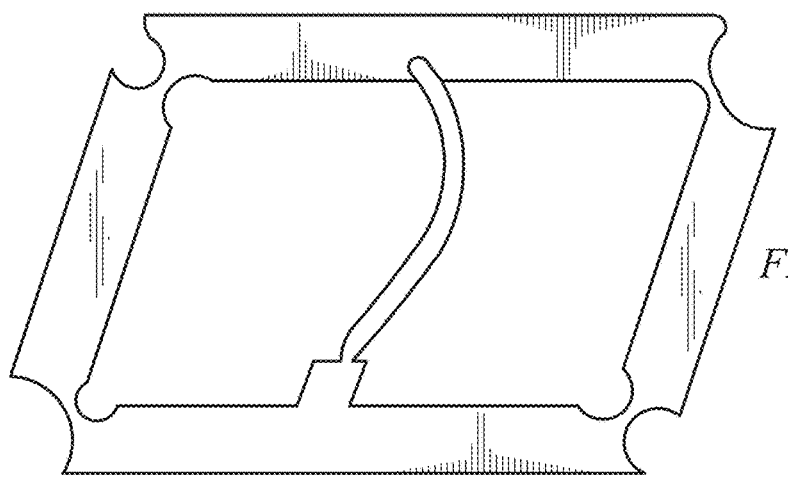
FIG. 55B depicts an apparatus at its intermediate state.
Figure 55C:
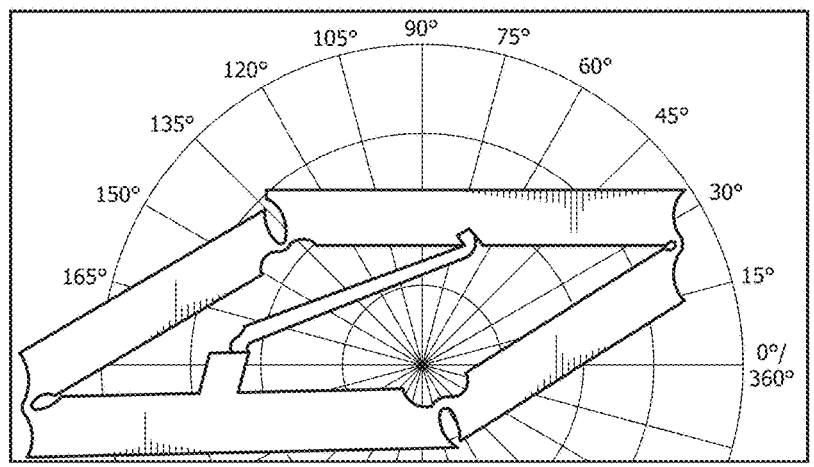
FIG. 55C depicts an apparatus at its final state.

FIGS. 55A-55C show the individual stable positions (FIGS. 55A-55B) on a polar grid to illustrate their perspective angles, as well as the intermediate unstable position (FIG. 55C) showing the bucking of the PEE due to the difference in paths that point ($m_Q$) traces, as shown in FIG. 53A.

Figure 56:
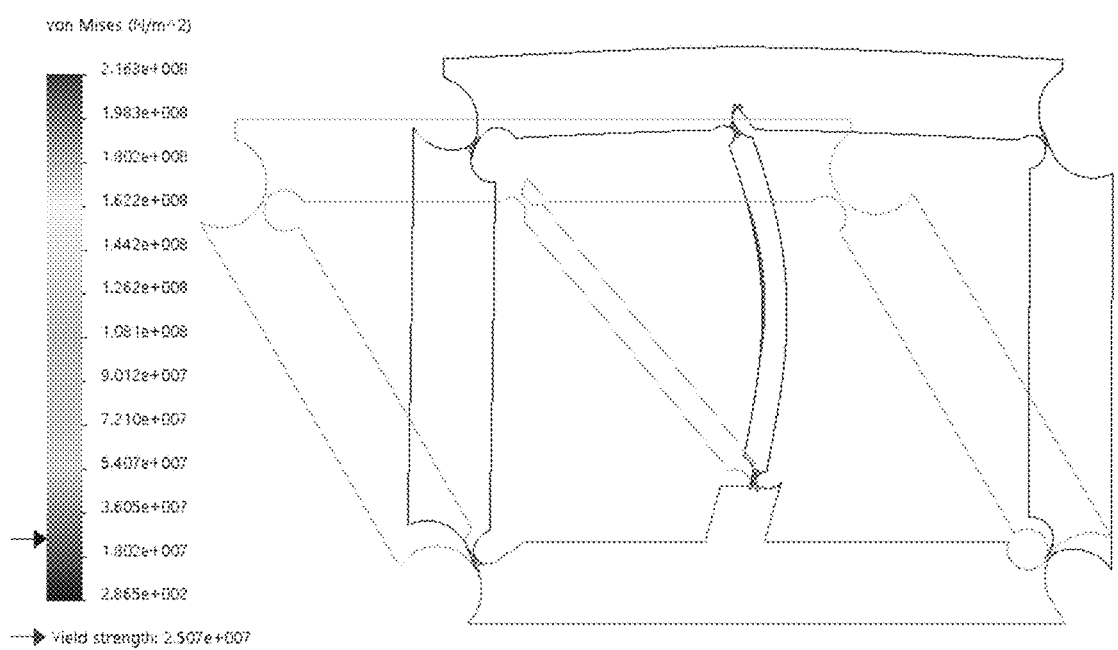
FIG. 56 depicts FEA analysis of the mechanism at the unstable position.
Figure 57:
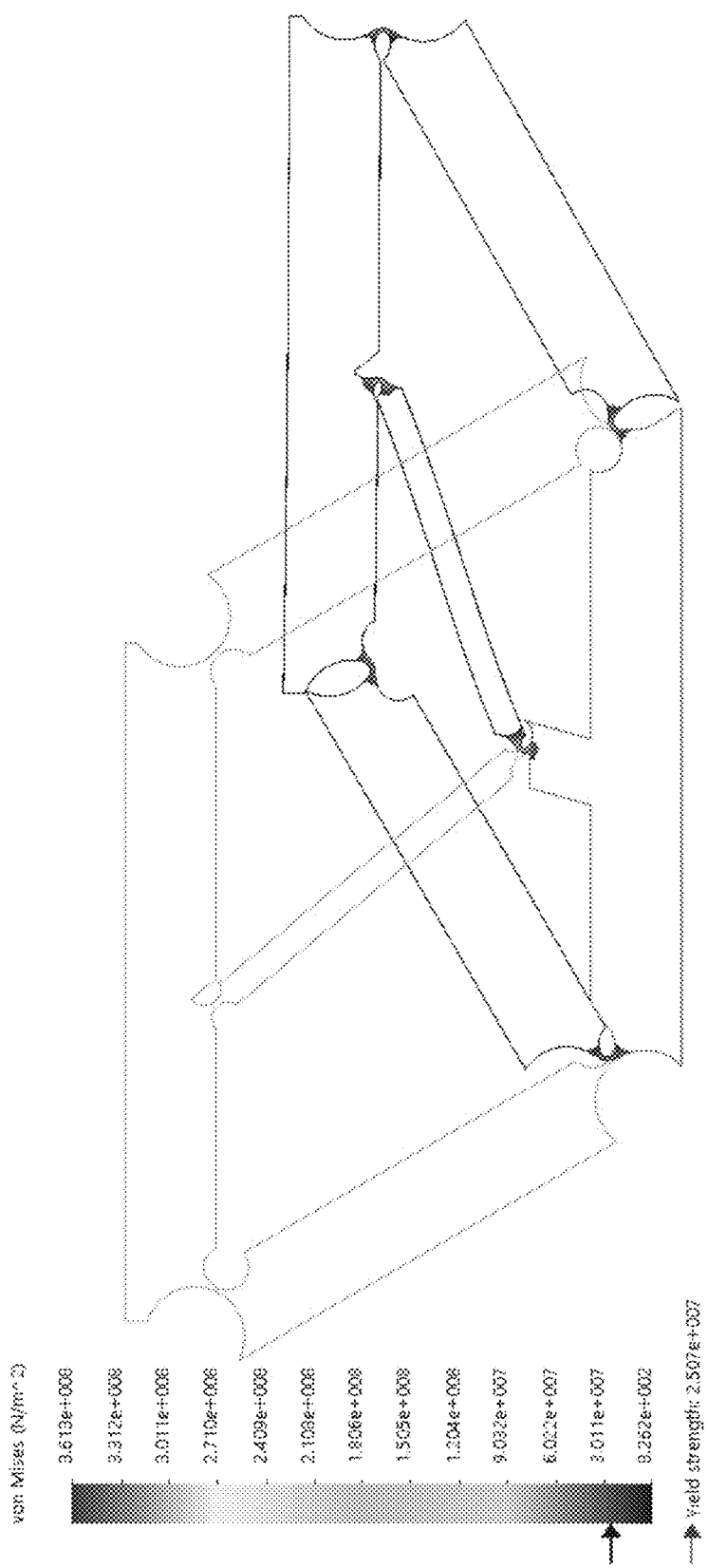
FIG. 57 depicts FEA analysis of the mechanism at the second stable position.
Figure 58:
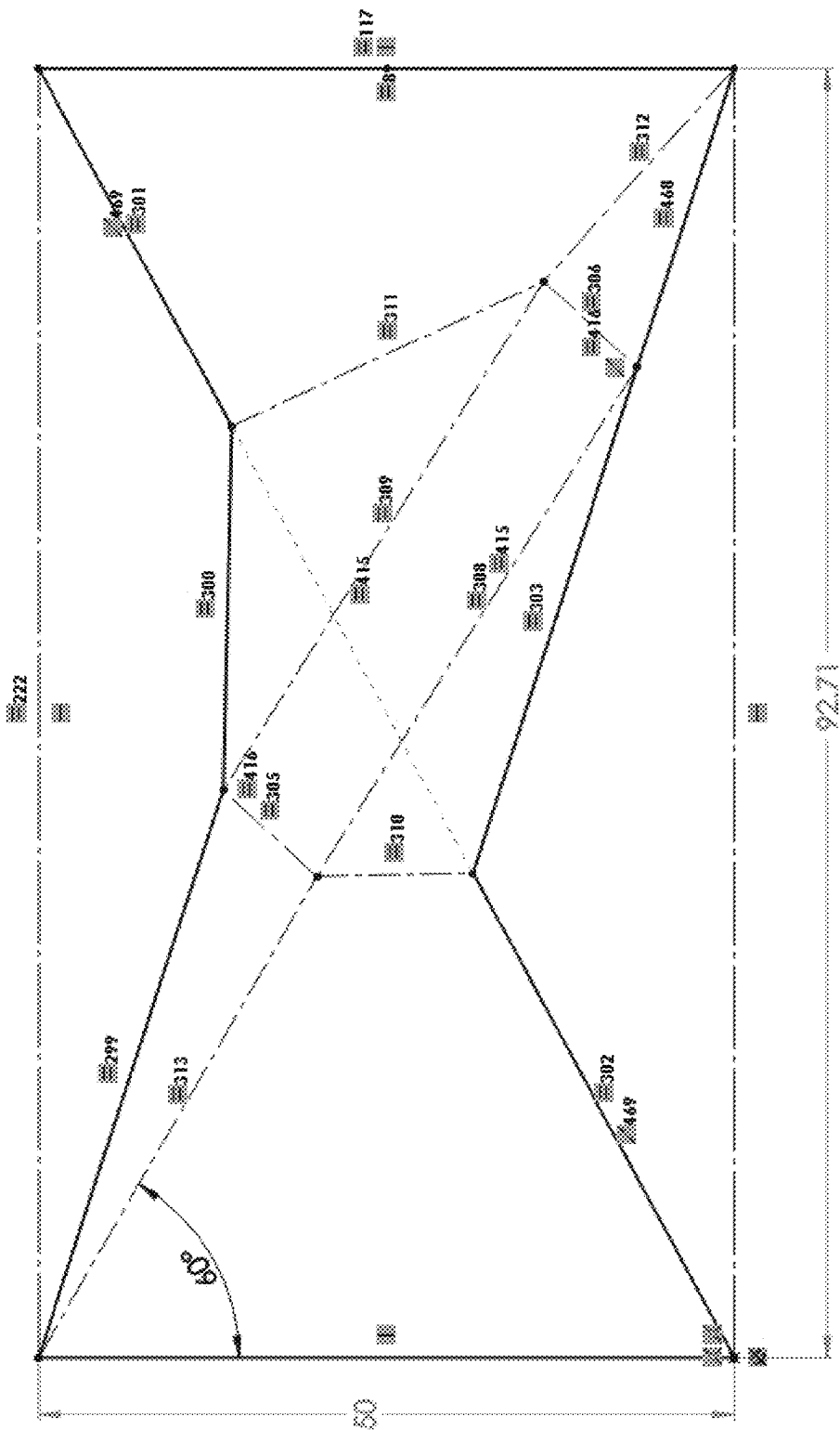
FIG. 58 depicts the initial state mechanism's constraints of $P_1$ SMSF.
Figure 59:
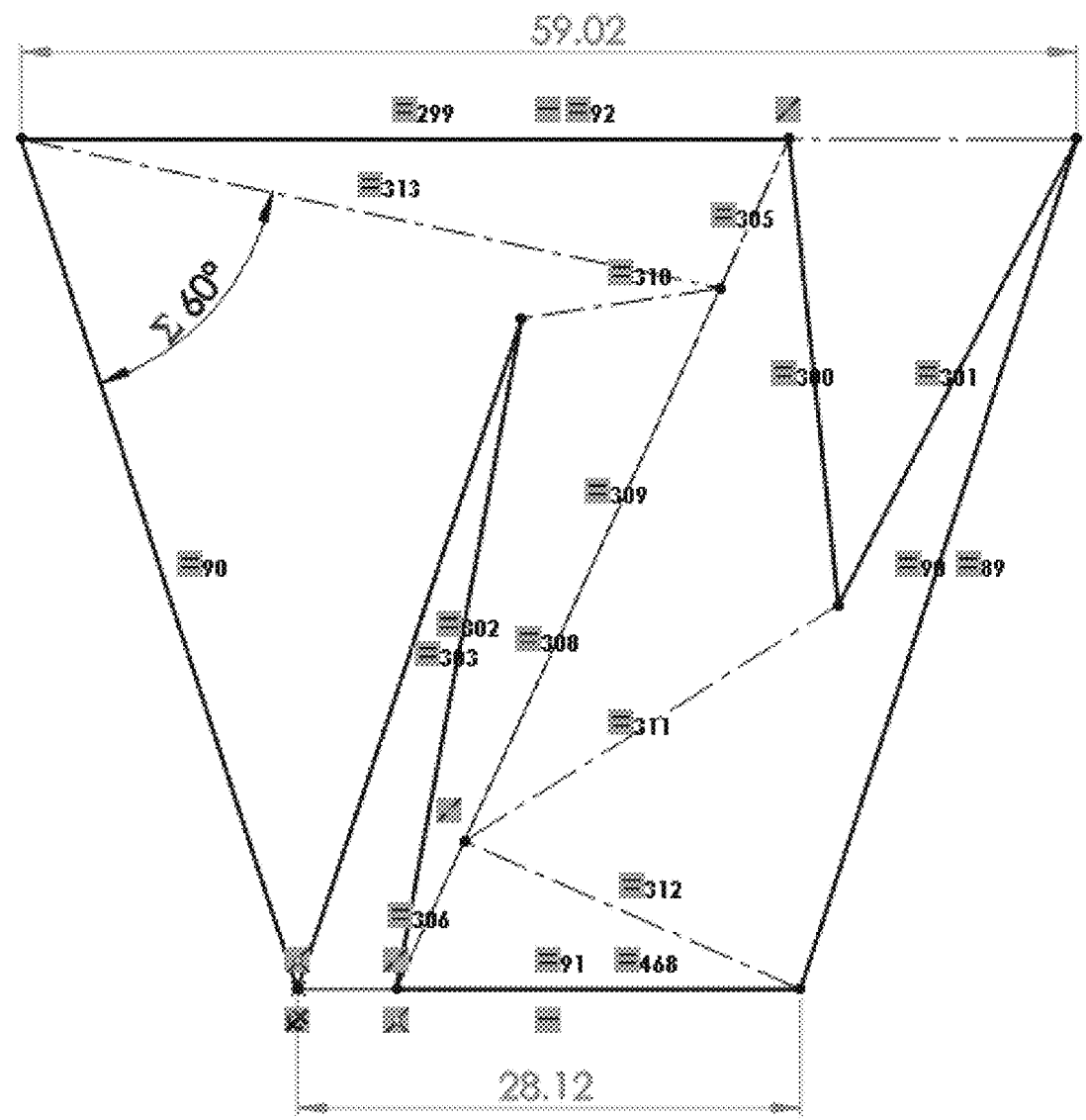
FIG. 59 depicts the final state mechanism's constraints of $P_1$ SMSF.
Figure 60:
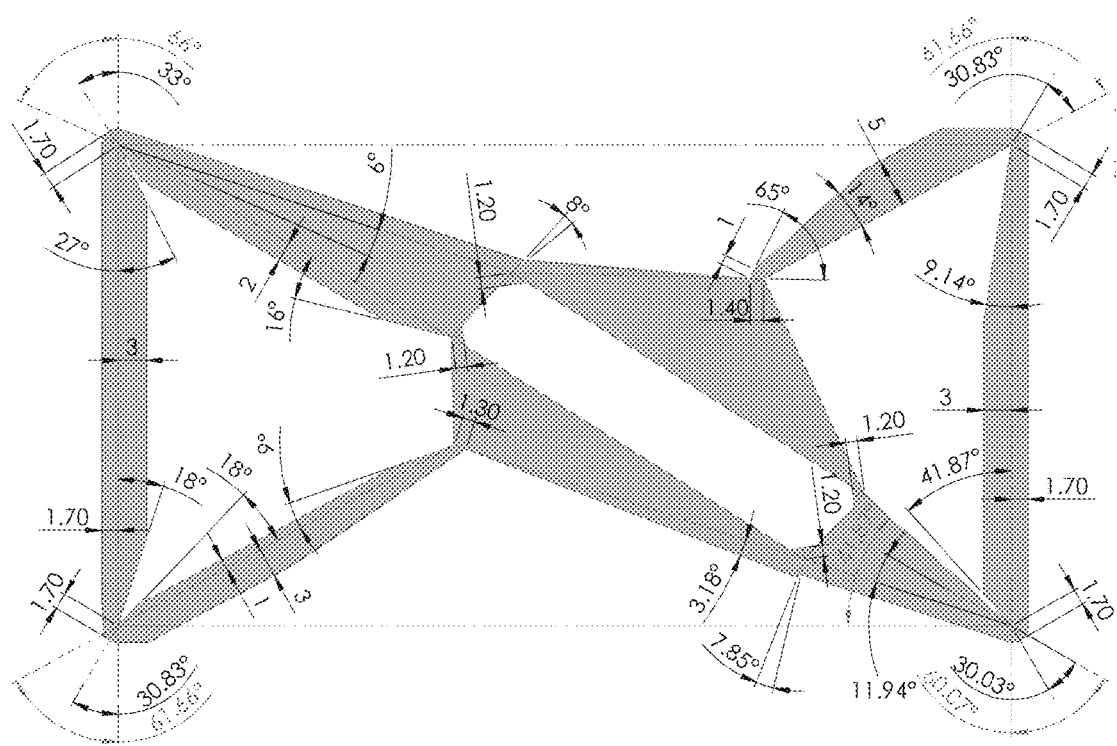
FIG. 60 depicts the $P_1$ SMSF mechanism's design dimensions (without bistability).

The FEA analysis preformed on the model shows high stress concentration at the joints exceeding the yield point of the material, which corresponds to the material deformation observed on the apparatus. FIG. 56 shows the stresses in the PEE when buckling at the mechanism unstable position, whereas FIG. 57 shows the stress concentration at the joints when the mechanism at the second stable position.

All referenced publications are incorporated herein by reference in their entirety. Furthermore, where a definition or use of a term in a reference, which is incorporated by reference herein, is inconsistent or contrary to the definition of that term provided herein, the definition of that tern) provided herein applies and the definition of that term in the reference does not apply.

GLOSSARY OF CLAIM TERMS

Behavior as a structure: This term is used herein to refer to the way an apparatus operates, specifically as a whole formed of multiple distinct components organized and arranged in a particular manner, and having a particular shape or state.

Bistable link: This term is used herein to refer to a component that facilitates stability of the overall apparatus in two (2) different positions.

Circumferential line: This term is used herein to refer to a relative or virtual line directed along e outer boundary of a circle, cylinder, or sphere.

Collinear relative displacement: This term is used herein to refer to a change of positioning of a structure along a straight line.

Constraint: This term is used herein to refer to a restriction on the outer boundaries (typically virtual or unstructured) within which a structure should be contained.

Curved triangular prism: This term is used herein to refer to a polyhedron formed of a triangular base, a translated copy, and three faces joining corresponding sides, where the polyhedron as a whole has an appearance of being curved in a direction. The right side of FIG. 9 depicts this configuration.

Fixed ground pivot: This term is used herein to refer to a node that may not move during transition between stable positions.

Fixed link: This term is used herein to refer to an elongate component (such as a rigid rod) of a mechanism that may not move during transition between stable positions.

Latitude line: This term is used herein to refer to a relative or virtual line directed toward the left or right sides of a hemisphere or sphere.

Link: This term is used herein to refer to an elongate component (such as a rigid rod) of a mechanism for transmitting a force or motion, or by which relative motion of other components is produced and constrained.

Longitude line: This term is used herein to refer to a relative or virtual line directed toward the top or bottom of a hemisphere or sphere.

Moving link: This term is used herein to refer to an elongate component (such as a rigid rod) of a mechanism that may be displaced during transition between stable positions.

Moving pivot: This term is used herein to refer to a node that may be displaced during transition between stable positions.

Node: This term is used herein to refer to a joint, connection point between two links, or attachment point of one link.

Non-interfering potential energy element: This term is used herein to refer to a structural component, such as a spring or a compliant link, disposed on the mechanism, generating an energy curve upon actuation for transition between two stable positions. The component facilitates stability of the overall apparatus in two (2) different positions, while also remaining contained and not obstructing or otherwise altering the natural displacement or position of other links.

Over-constraining: This term is used herein to refer to application of excessive conditions on the mechanism, such as inclusion of the potential energy element, to facilitate stability of the mechanism in multiple positions.

Radial line: This term is used herein to refer to a relative or virtual line passing through or otherwise directed toward the center of a circle, cylinder, or sphere from a point along the circumference.

Sector vertex: This term is used herein to refer to the ending point of a sector or triangular prism, where this point is typically located near the center (or "mid-plane") of the circle formed of the sectors.

Sector: This term is used herein to refer to a component or part of a circle that extends toward the center of that circle.

Stable position: This term is used herein to refer to a relative location of the apparatus as a whole, along with its individual components, where the location of the structure remains consistent or relatively unchanging until an outside force is applied to the structure in a manner to change the stable position.

Straight triangular prism: This term is used herein to refer to a polyhedron formed of a triangular base, a translated copy, and three faces joining corresponding sides, where the polyhedron as a whole has no appearance of being curved in any direction. The left side of FIG. 9 depicts this configuration.

Structural framework: This term is used herein to refer to a plurality of components that are fitted, united, or other organized/arranged together to form a cohesive whole or greater component of the cohesive whole.

Window: This term is used herein to refer to positioning a structure within a gap of another structure to cover that gap, where the structures are in different planes. This can be seen clearly in FIGS. 30A-30B.

Without use of a hard stop: This term is used herein to refer to the absence of a structural component that physically limits the travel of a mechanism. There is no structure that, if removed, would cause the mechanism's links/nodes to continue traveling. A hard stop can be contrasted with a bistable link or a potential energy element that facilitates stability of a mechanism in multiple positions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A shape-morphing space frame apparatus using unit cell bistable elements, comprising:
    a first structural framework formed of a plurality of nodes and a plurality of links, including at least one bistable link,
    said first structural framework having a first stable position and a second stable position, said first structural framework further having a first quadrilateral-shaped constraint in said first stable position and a second quadrilateral constraint in said second stable position, said first quadrilateral-shaped constraint being different from said second quadrilateral-shaped constraint for said first structural framework,
    said first structural framework having a first end and a second end;
    a first plurality of second structural frameworks each formed of a plurality of nodes and a plurality of links, including at least one bistable link,
    said each second structural framework of said first plurality of second structural frameworks having a first stable position and a second stable position, said each second structural framework further having a first quadrilateral-shaped constraint in said first stable position and a second quadrilateral constraint in said second stable position, said first quadrilateral-shaped constraint being different from said second quadrilateral-shaped constraint for said each second structural framework of said first plurality of second structural frameworks,
    wherein said first plurality of second structural frameworks are adjacent to each other, are straight in said first stable position, and are curved in said second stable position,
    said first plurality of second structural frameworks collectively having a first end and a second end;
    a second plurality of second structural frameworks each formed of a plurality of nodes and a plurality of links, including at least one bistable link,
    said each second structural framework of said second plurality of second structural frameworks having a first stable position and a second stable position, said each second structural framework further having a first quadrilateral-shaped constraint in said first stable position and a second quadrilateral constraint in said second stable position, said first quadrilateral-shaped constraint being different from said second quadrilateral-shaped constraint for said each second structural framework of said second plurality of second structural frameworks,
    wherein said second plurality of second structural frameworks are adjacent to each other, are straight in said first stable position, and are curved in said second stable position,
    said second plurality of second structural frameworks collectively having a first end and a second end,
    said first end of said first plurality of second structural frameworks coupled to said first end of said first structural framework, said first end of said second plurality of second structural frameworks coupled to said second end of said first structural framework, and said second end of said first plurality of second structural frameworks coupled to said second end of said second plurality of second structural frameworks,
    such that said apparatus is a straight triangular prism in a first stable position and is a curved triangular prism in a second stable position, wherein a bistability of said apparatus is achieved by said at least one bistable link in each framework of said first structural framework, said each second structural framework of said first plurality of structural frameworks, and said each second structural framework of said second plurality of structural frameworks.

2. A shape-morphing space frame as in claim 1, wherein said first quadrilateral-shaped constraint of said each second structural framework of said first and second pluralities of second structural frameworks is a square-shaped constraint, and wherein said first quadrilateral-shaped constraint of said first structural framework is a rectangular constraint.

3. A shape-morphing space frame apparatus as in claim 2, wherein said second quadrilateral-shaped constraint of said each framework is a trapezoidal constraint.

4. A shape-morphing space frame apparatus as in claim 1, further comprising:
    a single rigid link positioned between two nodes if a relative displacement between said two nodes is zero, and
    two or more rigid links positioned between said two nodes if said relative displacement between said two nodes is collinear, wherein a node disposed between said two or more rigid links is a revolute joint.

5. A shape-morphing space frame apparatus as in claim 1, wherein said plurality of links in said each framework remain in a single plane, such that none of said plurality of links interfere with each other within said each framework.

6. A shape-morphing space frame apparatus as in claim 1, wherein a first stable position of said apparatus is a disk and a second stable position of said apparatus is a hemisphere.

7. A shape-morphing space frame apparatus as in claim 6, wherein:
    radial lines on a surface of said disk bend but do not stretch, said radial lines becoming longitude lines on said hemisphere, and
    circumferential lines on said surface of said disk compress, said circumferential lines becoming latitude lines on said hemisphere.

8. A shape-morphing space frame apparatus as in claim 7, wherein transition between said first stable position and said second stable position is accomplished by applying an inward radial force on said first and second pluralities of second structural frameworks.

9. A shape-morphing space frame apparatus as in claim 6, wherein:
    said disk is formed of at least three (3) sectors, such that said at least three (3) sectors are connected together in a circular pattern as one layer to form said disk that can morph into said hemisphere, and
    said plurality of links does not include any curved links.

10. A shape-morphing space frame apparatus as in claim 1, wherein a first stable position of said apparatus is a two-layered disk and a second stable position of said apparatus is a sphere, wherein said two-layered disk is formed of an upper layer that forms an upper hemisphere and a lower layer that forms a lower hemisphere.

11. A shape-morphing space frame apparatus as in claim 10, wherein said upper layer is formed of an odd number of evenly-spaced sectors with a gap formed between each sector, said lower layer is formed of an equal number of evenly-spaced sectors with a gap formed between each sector, and said sectors of upper and lower layers are configured to window each other's gaps in said two-layered disk.

12. A shape-morphing space frame apparatus as in claim 11, wherein said upper layer and lower layer are connected using the sectors' vertices located mid-plane, the apparatus further comprising a flange disposed at each vertex with an aperture disposed therein to function as a hinge between said upper layer and said lower layer.

13. A shape-morphing space frame apparatus as in claim 12, wherein no curved links are used in said apparatus.

14. A shape-morphing space frame apparatus as in claim 13, wherein said sphere is approximated as a polyhedron.

15. A shape-morphing space frame apparatus as in claim 1, wherein bistability of said apparatus is achieved without use of a hard stop.

16. A method of fabricating predictable and controllable length or shape changes in a bistable, shape-morphing mechanism, allowing the morphing from an initial specific shape into a resulting specific shape that is different from said initial specific shape, without use of a hard stop, said method comprising:
   identifying said initial specific shape and said resulting specific shape;
   providing a plurality of nodes and a plurality of links, said plurality of nodes interconnecting said plurality of links in said initial specific shape, wherein said plurality of links do not change length between said initial specific shape and said resulting specific shape, said plurality of nodes including fixed ground pivots and moving pivots, said plurality of links including fixed links and moving links;
   identifying a first attachment point of a non-interfering potential energy element to be positioned on a fixed link;
   identifying a second attachment point of said potential energy to be positioned on a moving link;
   said first and second attachment points based on a path of travel of said potential energy element between said initial and resulting specific shapes;
   positioning said potential energy element between two moving pivots to provide a degree-of-freedom during actuation of said bistable mechanism between said initial specific shape and said resulting specific shape, wherein a potential energy of said potential energy element is minimized in said initial and resulting specific shapes and increases during transition between said initial and resulting specific shapes, wherein said potential energy element is capable of generating sufficient potential energy to overcome any restoring torques within said moving pivots when transitioning between said initial specific shape and said resulting specific shape; and
   fabricating said bistable, shape-morphing mechanism based on the foregoing steps.

17. A method as in claim 16, further comprising positioning a torsional spring at each of said moving pivots.

18. A method as in claim 16, further comprising over-constraining said bistable mechanism to facilitate behavior of said mechanism as a structure in said initial specific shape and said resulting specific shape with flexibility within said potential energy element to toggle between said initial specific shape and said resulting specific shape.

19. A method as in claim 16, further comprising creating a pole point at an intersection between a first perpendicular bisector of a first line disposed between a first moving pivot in said initial specific shape and said first moving pivot in said resulting specific shape and a second perpendicular bisector of a second line disposed between a second moving pivot in said initial specific shape and said second moving pivot in said resulting specific shape, wherein said pole point bisects a path of travel of said potential energy element.

20. A method as in claim 16, wherein said potential energy element is a compliant link.

21. A shape-morphing space frame apparatus using unit cell bistable elements, comprising:
   a first structural framework formed of a plurality of nodes and a plurality of links, including at least one bistable link,
   said first structural framework having a first stable position and a second stable position, said first structural framework further having a first quadrilateral-shaped constraint in said first stable position and a second quadrilateral constraint in said second stable position, said first quadrilateral-shaped constraint being different from said second quadrilateral-shaped constraint for said first structural framework,
   said first structural framework having a first end and a second end;
   a first plurality of second structural frameworks each formed of a plurality of nodes and a plurality of links, including at least one bistable link,
   said each second structural framework of said first plurality of second structural frameworks having a first stable position and a second stable position, said each second structural framework further having a first quadrilateral-shaped constraint in said first stable position and a second quadrilateral constraint in said second stable position, said first quadrilateral-shaped constraint being different from said second quadrilateral-shaped constraint for said each second structural framework of said first plurality of second structural frameworks,
   wherein said first plurality of second structural frameworks are adjacent to each other, collectively have a first curvature in said first stable position, and collectively have a second curvature in said second stable position, such that said second curvature is greater or less than said first curvature,
   said first plurality of second structural frameworks collectively having a first end and a second end;
   a second plurality of second structural frameworks each formed of a plurality of nodes and a plurality of links, including at least one bistable link,
   said each second structural framework of said second plurality of second structural frameworks having a first stable position and a second stable position, said each second structural framework further having a first quadrilateral-shaped constraint in said first stable position and a second quadrilateral constraint in said second stable position, said first quadrilateral-shaped constraint being different from said second quadrilateral-shaped constraint for said each second structural framework of said second plurality of second structural frameworks,
   wherein said second plurality of second structural frameworks are adjacent to each other, collectively have a first curvature in said first stable position, and collectively have a second curvature in said second stable position, such that said second curvature is greater or less than said first curvature,
   said second plurality of second structural frameworks collectively having a first end and a second end, said first end of said first plurality of second structural frameworks coupled to said first end of said first structural framework, said first end of said second plurality of second structural frameworks coupled to said second end of said first structural framework, and said second end of said first plurality of second structural frameworks coupled to said second end of said second plurality of second structural frameworks, such that said apparatus is a curved triangular prism in a first stable position and also is a curved triangular prism in a second stable position, wherein a bistability of said apparatus is achieved by said at least one bistable link in each framework of said first structural framework, said each second structural framework of said first plurality of structural frameworks, and said each second structural framework of said second plurality of structural frameworks.

22. A shape-morphing space frame as in claim 21, wherein said first quadrilateral-shaped constraint of said each second structural framework of said first and second pluralities of second structural frameworks is a square-shaped constraint, and wherein said first quadrilateral-shaped constraint of said first structural framework is a rectangular constraint.

23. A shape-morphing space frame apparatus as in claim 22, wherein said second quadrilateral-shaped constraint of said each framework is a trapezoidal constraint.

24. A shape-morphing space frame apparatus as in claim 21, further comprising:
a single rigid link positioned between two nodes if a relative displacement between said two nodes is zero, and
two or more rigid links positioned between said two nodes if said relative displacement between said two nodes is collinear, wherein a node disposed between said two or more rigid links is a revolute joint.

25. A shape-morphing space frame apparatus as in claim 21, wherein said plurality of links in said each framework remain in a single plane, such that none of said plurality of links interfere with each other within said each framework.

26. A shape-morphing space frame apparatus as in claim 21, wherein bistability of said apparatus is achieved without use of a hard stop.

* * * * *